US 6,733,732 B2

(12) United States Patent
Ohmi et al.

(10) Patent No.: US 6,733,732 B2
(45) Date of Patent: May 11, 2004

(54) REACTOR FOR GENERATING MOISTURE

(75) Inventors: Tadahiro Ohmi, 1-17-301, Komegahukuro 2-Chome, Aoba-ku, Sendai-shi, Miyagi (JP), 980-0813; Koji Kawada, Osaka (JP); Yoshikazu Tanabe, Oume (JP); Takahisa Nitta, Oume (JP); Nobukazu Ikeda, Osaka (JP); Akihiro Morimoto, Osaka (JP); Keiji Hirao, Osaka (JP); Hiroshi Morokoshi, Osaka (JP); Yukio Minami, Osaka (JP)

(73) Assignees: Fujikin Incorporated, Osaka (JP); Tadahiro Ohmi, Miyagi (JP)

( * ) Notice: Subject to any disclaimer, the term of this patent is extended or adjusted under 35 U.S.C. 154(b) by 0 days.

(21) Appl. No.: 09/783,287

(22) Filed: Feb. 15, 2001

(65) Prior Publication Data

US 2001/0042344 A1 Nov. 22, 2001

Related U.S. Application Data

(62) Division of application No. 09/117,350, filed as application No. PCT/JP97/00188 on Jan. 27, 1997, now abandoned.

(30) Foreign Application Priority Data

Jan. 29, 1996 (JP) .................................................. 8-12413
Sep. 12, 1996 (JP) .................................................. 8-242246
Dec. 6, 1996 (JP) .................................................. 8-327296

(51) Int. Cl.[7] .................................................. B01J 8/02
(52) U.S. Cl. .................. 422/211; 422/214; 422/222; 422/240; 422/177; 422/180; 423/219; 423/248; 423/645; 423/580.1; 252/372; 502/439; 502/527.12

(58) Field of Search ............................. 422/211, 214, 422/220, 240, 177, 180; 423/219, 248, 645, 580.1; 252/372; 502/439, 527.12

(56) References Cited

FOREIGN PATENT DOCUMENTS

| JP | 52111891 A | * | 9/1977 |
| JP | 04054184 A | * | 2/1992 |
| JP | 06122580 A | * | 5/1994 |

* cited by examiner

Primary Examiner—Jerry D. Johnson
Assistant Examiner—Basia Ridley
(74) Attorney, Agent, or Firm—Griffin & Szipl, PC

(57) ABSTRACT

A reactor comprising a body made of a heat-resistant material and having an inlet and an outlet for water/moisture gas, having a gas-diffusing member provided in an internal space of the body, and having a platinum coating on an internal wall surface of the body. Hydrogen and oxygen fed from the inlet are diffused by the gas-diffusing member and then come into contact with the platinum coating to enhance reactivity, thereby producing water. A temperature of the reactor is held to be below an ignition temperature of hydrogen or a hydrogen-containing gas. The platinum-coated catalyst layer on the internal wall of the reactor body is formed by treating the surface of the internal wall of the body, cleaning the treated surface, forming a barrier coating of a nonmetallic material of an oxide or nitride on the wall surface, and forming the platinum coating on the barrier coating.

23 Claims, 35 Drawing Sheets

PRIOR ART

REACTOR FOR GENERATING MOISTURE

This application is a divisional of U.S. patent application Ser. No. 09/117,350, filed Jun. 9, 1999, now abandoned; which corresponds to International Application No. PCT/JP97/00188, filed Jan. 27, 1997. The entire disclosures of the above applications are hereby incorporated by reference.

FIELD OF THE INVENTION

The present invention is primarily used in semiconductor manufacturing facilities. More specifically, the present invention is used for supplying water when silicon dioxide film is affixed by a so-called water oxidation method (or steam oxidation method) using a process chamber.

DESCRIPTION OF THE PRIOR ART

For example, for affixing a silicon oxide film by the water oxidation method in semiconductor manufacture, high-purity water is required.

Consequently, for a conventional affixing of a silicon oxide film, as shown in FIG. 52, a process in which hydrogen gas $H_2$ and oxygen gas $O_2$ are allowed to combust in a quartz furnace 50 has been extensively used in which water generated by the combustion of these two gases is fed into semiconductor manufacturing equipment; and the oxide film is formed on the Si wafer surface.

In FIG. 52, numeral 51 designates a hydrogen gas nozzle, 52 a Si chip for ignition held in a vicinity of a top side of the hydrogen gas nozzle 51, and 53 is a heating lamp for heating the Si chip 52. A vicinity at a tip end of the hydrogen gas nozzle 51 inside the quartz furnace attains a high temperature from about 1800° C. to 2000° C. due to flames of combustion. In addition, an amount of oxygen gas $O_2$ supplied to the quartz furnace 50 is set to a level exceeding one half that of the hydrogen gas $H_2$ in order to completely combust the hydrogen gas $H_2$ and to maintain safety, and flow rates of $O_2$ and $H_2$ are respectively separately set to several liters/min.

The process of FIG. 52 achieves excellent practical effects in that water thereby generated is of a high purity and can be instantaneously generated at a rate of several liters/min.

However, in the process of FIG. 52, there is a problem in that if the feed rate of hydrogen gas $H_2$ or oxygen gas $O_2$ is reduced to decrease the water amount, combustion can easily be thereby stopped and it is therefore extremely difficult to apply controls for decreasing the generated water amount, and a control range of a ratio of water to oxygen (moisture content/oxygen) is narrow.

The process has a difficulty in that because raw gas is fed directly into the reactor pipe, when combustion stops an interlock mechanism becomes indispensable to prevent explosion.

In addition, there is also a problem in that when gas flow rate is reduced, flames are generated in the vicinity of the nozzle, $SiO_2$ composing the quartz nozzle evaporates, and these volatile materials mix in a reactor atmosphere ($H_2O+O_2$) and contaminate a gas ($H_2O+O_2$) fed to the semiconductor manufacturing equipment to such an extent that it can no longer be used for manufacturing high performance semiconductors.

In the meantime, for solving difficulties of combustion furnace type water-generating equipment as shown in FIG. 52, the inventors of this application previously developed a water generating process using the equipment shown in FIG. 53, disclosed in Japanese unexamined Patent Publication No. Hei-6-115903.

That is, this water generating process first mixes hydrogen $H_2$, oxygen $O_2$ and inert gas Ar to form a mixture gas C, the mixture gas C is introduced into a reaction pipe 54 made of a material having a catalytic action that can radicalize hydrogen and oxygen and at the same time the reaction pipe 54 is heated to allow hydrogen and oxygen in the mixture gas C to react, thereby generating water.

The water generating method according to the Japanese Unexamined Patent Publication No. Hei 6-115903 can obtain a mixture gas containing high-purity water ranging from low concentration on a ppb order to high concentration on a percent order, and at the same time is excellent in responsiveness, in ease of maintaining control, and in achieving high effects.

However, the water generating process using the equipment shown in FIG. 53 still has many problems that must be solved.

A first point is that because the mixture gas C of hydrogen and oxygen and argon is introduced into the reaction pipe 54, a reactivity degrades as compared with a case in which only hydrogen and oxygen are supplied, and as a result, the reactor size is increased. In particular, there is a case in which hydrogen or inert gas is added to water to adjust an oxidation-reduction power, and $N_2O$, etc. are added to water in order to improve interface characteristics of Si and $SiO_2$, and in such event, an increase of the reactor size results in an increase of gas consumption rate, posing a serious problem from a standpoint of economy, etc.

It is also a problem that even if hydrogen and oxygen finish the reaction completely, the product gas is a mixture gas of moisture and argon, and it is unable to output high-purity water only or a mixture gas of water and oxygen.

A second problem is a problem of responsiveness and reactivity of water generation. Because stainless pipes are used as a material having the catalytic action and catalytic action of pipe surfaces are utilized, it is unable to achieve a large reaction gas rate per unit surface area.

As result, when a large volume of generated water, for example, a water volume of about 1 liter/min., is required, the reaction pipe 54 itself is markedly increased and, at the same time, considerable time is taken to generate water.

A third problem is safety. In order to improve safety of this water-generating equipment, the invention of Japanese Unexamined Patent Publication No. Hei 6-115903 adjusts a heating temperature of the reaction pipe 54 to be between 50° C. and 500° C., and at the same time, the whole reaction pipe 54 is uniformly heated to the same temperature.

However, because a significant portion of the reaction between hydrogen and oxygen in the reaction pipe 54 takes place at a portion close to an inlet end of the reaction pipe 54, the temperature of the reaction pipe 54 rises more at a portion closer to the inlet end of the mixture gas due to reaction heat.

As a result, for example, if the heating temperature of the reaction pipe 54 is set to a high temperature of about 500° C., the temperature at the reaction pipe inlet end sometimes reaches nearly about 600° C., and even in a case of argon mixture gas, ignition of hydrogen gas may result when the argon mixture rate is small.

When the temperature of the reaction pipe 54 is lowered, there is a problem in that the reaction gas increases.

SUMMARY OF THE INVENTION

A primary object of this invention is to solve the problems in the conventional water generation process or water-generating equipment for semiconductor manufacturing equipment—that is: (1) in a combustion furnace system using a quartz furnace, it is difficult to adjust the flow rate in a small flow rate region of generated water, generated water is likely to be polluted, and high-purity water cannot be obtained; (2) in a water generating process for introducing argon mixture gas into a stainless steel reaction pipe heated to a high temperature, it is unable to output water or water and oxygen mixture gas; (3) a reactor size is increased and it is difficult to downsize this equipment and at the same time, responsiveness is poor; and (4) when a heating temperature of the reactor is raised to increase reactivity and responsiveness, an inlet end temperature of the reactor rises excessively, giving rise to a danger of causing an explosion, etc.—, and it is another object of this invention to provide a water generating process, a water-generating reactor, a temperature control process for the water-generating reactor, and a process for forming a platinum coating catalyst layer of the water generating reactor which can greatly reduce the size of water-generating equipment and which can safely and stably produce high purity water at a rate exceeding 1 liter/min. as well as a mixture gas of high purity water and oxygen under conditions of higher responsiveness and reactivity.

That is, a water generating process of this invention basically relates to supplying hydrogen and oxygen into a reactor equipped with a material with catalytic action that can activate a reactivity of hydrogen and oxygen, and seeks to hold the reactor temperature at a level below an ignition temperature of hydrogen or gas containing hydrogen, thereby allowing the hydrogen to react with the oxygen while preventing combustion of the hydrogen and the oxygen in a process for generating water from the hydrogen and oxygen.

A first water-generating reactor according to this invention has a basic construction in which cylinders made of a material having the catalytic action that can activate the hydrogen or oxygen reactivity, or a material whose surface is covered with the same material having the catalytic action, are in a casing, to form passages through which the hydrogen and oxygen flow while coming into contact with inner and/or outer wall surfaces, there being a heater outside or inside the casing.

Furthermore, a second generating reactor according to this invention has a basic construction in which a column (filled with: granules made of a material having the catalytic action that can activate reactivity of hydrogen and/or oxygen; sintered materials of powders or fibers made of the material having the catalytic action; laminates or honeycomb bodies comprising thin sheets made of the material having the catalytic action; mesh bodies, sponge bodies, or fin-shaped bodies made of the material having the catalytic activity; or granules, sintered materials, thin sheet laminates, honeycomb bodies, mesh bodies, sponges or fin-shaped bodies whose surfaces are covered with the material having the catalytic activity) are placed, or two or more of these are placed, in the casing, and passages are formed for allowing hydrogen and oxygen to flow therethrough while coming in contact with said granules, sintered materials, laminates, honeycomb bodies, mesh bodies, or fin-shaped bodies, and, at the same time, a heater is placed outside or inside the casing.

In addition, a third water-generating reactor of this invention comprises a reactor body made of heat resistant material equipped with an inlet and water and moisture gas outlet, and a platinum coated film on an inner wall surface of the reactor body, wherein hydrogen and oxygen supplied from the inlet is brought in contact with the platinum coated film to activate the reactivity and water is produced from the hydrogen and the oxygen.

A fourth water-generating reactor according to this invention comprises a reactor body made of heat resistant material equipped with an inlet and water and moisture gas outlet, a gas diffusing member provided inside an internal space of the reactor body, and a platinum coated film provided on an inner wall surface of the reactor body, wherein hydrogen and oxygen supplied from the inlet are diffused by the gas diffusing member, are then brought into uniform contact with the platinum coated film to activate the reactivity, and water is produced from the hydrogen and the oxygen.

A process of temperature control of a water-generating reactor of this invention comprises providing a catalyst in a casing that can activate reactivity of hydrogen or oxygen, and holding an upstream-end temperature of hydrogen and oxygen under reaction in the water-generating reactor at a level lower than a downstream-end temperature in the water-generating reactor by allowing the hydrogen and oxygen to react with each other at a high temperature.

A process for forming a platinum coated catalyst of a water-generating reactor according to this invention comprises cleaning an inner wall surface of a metallic body of a reactor by applying a surface treatment, forming a barrier coating of a nonmetallic material of an oxide or a nitride on the inner wall surface and forming a platinum coated film on the barrier coating in the water-generating reactor, with the platinum coated film formed on the inner wall surface of the metallic reactor body (the body having an inlet and a water and moisture gas outlet) being used as a catalyst, with hydrogen and oxygen supplied through the inlet being brought into contact with the platinum coated film to activate their reactivity and water being generated from the hydrogen and oxygen in the water-generating reactor.

Hydrogen and oxygen, mixed at a ratio of nearly 2:1, are allowed to come into contact with the high-temperature catalyst material surface in the reactor, and radicalized by catalytic action of the catalyst material to directly react and generate water.

The generated water is guided out of an outlet end of the reactor as a steam, and thereafter, is mixed with a suitable amount of $O_2$, $N_2$, Ar, etc. and heated, and then supplied to the semiconductor manufacturing equipment.

Because a majority of the reactions between the hydrogen and oxygen take place in a vicinity of the gas inlet end of the reactor, in the first and the second water-generating reactors according to this invention, the inlet end of the reactor is more strongly heated by reaction heat and temperature rises greatly. Consequently, catalytic action at the reaction inlet end is weakened, gas supply position is distributed in a longitudinal direction of the reactor, or an inlet-end heater temperature is lowered so that temperature rise on the reactor inlet end is prevented.

Contrary to this, in the third and fourth water-generating reactors of this invention, because reactions of hydrogen and oxygen take place nearly uniformly throughout whole inside areas of reactor bodies, a temperature of the whole reactor body rises nearly uniformly.

In a water-generating reactor in which a platinum coating catalyst layer is formed according to this invention, the barrier film formed on the inner wall surface of the reactor body prevents metal components forming the reactor body from diffusing into the platinum coated film. Consequently, an amount of metal oxides formed in the platinum coated film greatly decreases and a high catalytic performance of platinum can, thereby, be stably maintained over a long period of time.

DETAILED DESCRIPTION OF THE PREFERRED EMBODIMENTS

Figure 1:
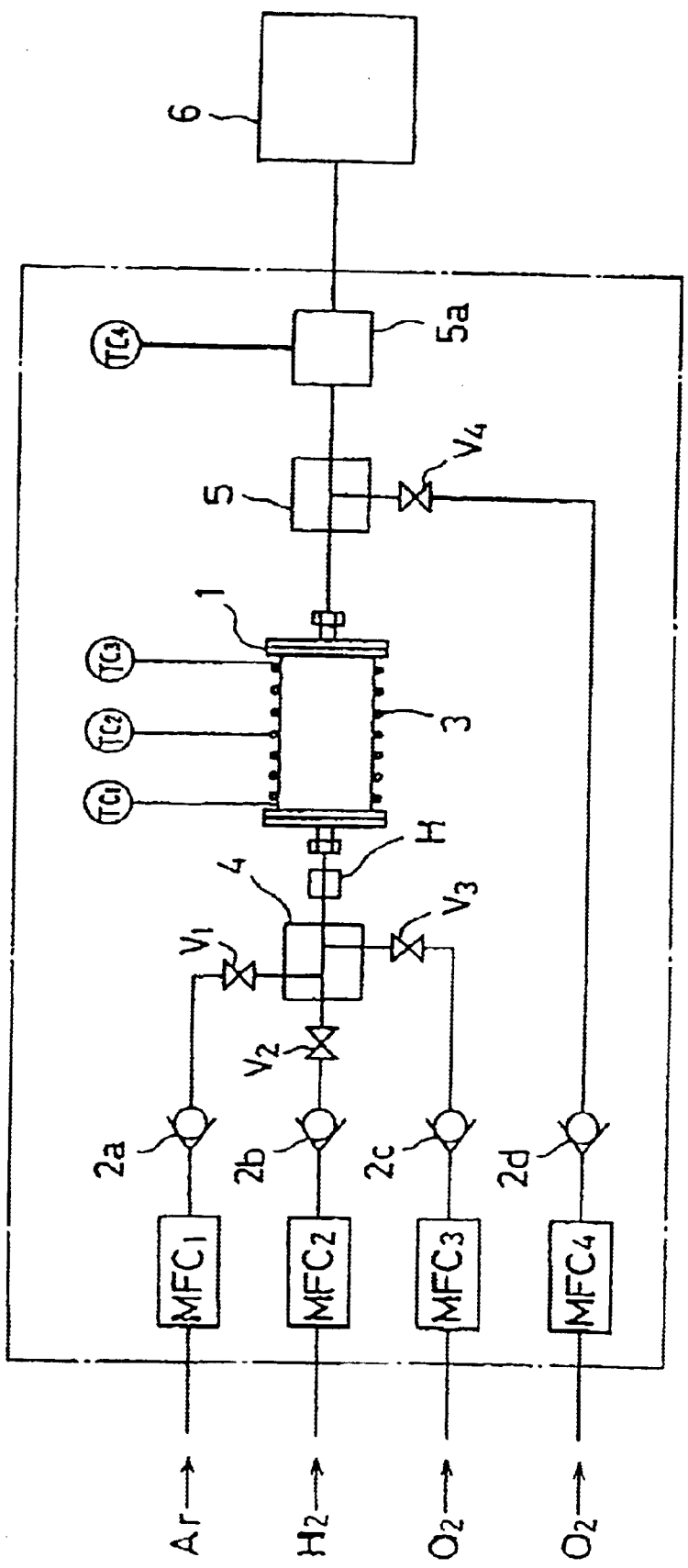
FIG. 1 is a system block diagram showing an embodiment of water-generating equipment using first and the second water-generating reactors of this invention.

Water Generating Method and First and Second Water-generating Reactors and Temperature Control Method FIG. 1 is a system diagram of water-generating equipment employing a first and a second water-generating reactor. In FIG. 1, reference characters $H_2$ designates hydrogen gas, $O_2$ oxygen gas, Ar argon gas for purging, MFC1–MFC4 mass flow controllers, $V_1$–$V_4$ valves, TC1–TC4 temperature measuring thermocouples, 1 a reactor, 2a–2d check valves, 3 a heater, 4 an $O_2$ and $H_2$ mixing portion, 5 an $O_2$ and water mixing portion, 5a a heater, and 6 semiconductor manufacturing equipment.

Hydrogen gas $H_2$ and oxygen gas $O_2$ supplied to the reactor 1 are set to either 2:1, 3:1 or 4:3 and, as is clear from a test sample 1 later discussed, an $H_2$-rich mixture gas can lower reaction temperature and water is likely to be generated.

In FIG. 1, a reaction gas is brought to a hydrogen-rich condition, but needless to say, conversely, the reaction gas could also be brought to an oxygen-rich condition.

In FIG. 1, hydrogen and oxygen are to be supplied to the reactor 1 in a gaseous form, but liquefied hydrogen and liquefied oxygen could also be supplied.

Furthermore, in FIG. 1, hydrogen and oxygen are premixed at the mixing portion 4 and supplied to the reactor 1, but it is also possible to supply hydrogen gas and oxygen gas independently to the reactor 1, and to mix them in the reactor 1.

In addition, in FIG. 1, the mixture gas of hydrogen gas and oxygen gas formed at the mixing portion 4 is supplied to the reactor 1 as is, but a preheating section H is provided at an introducing portion of the reactor 1, and the mixture gas may be preheated thereby. By providing the mixture gas preheating section at the gas introducing portion, even under conditions in which there is not a sufficient temperature or flow rate, it is made possible to effectively prevent generation of unreacted gas.

First Embodiment

Figure 2:
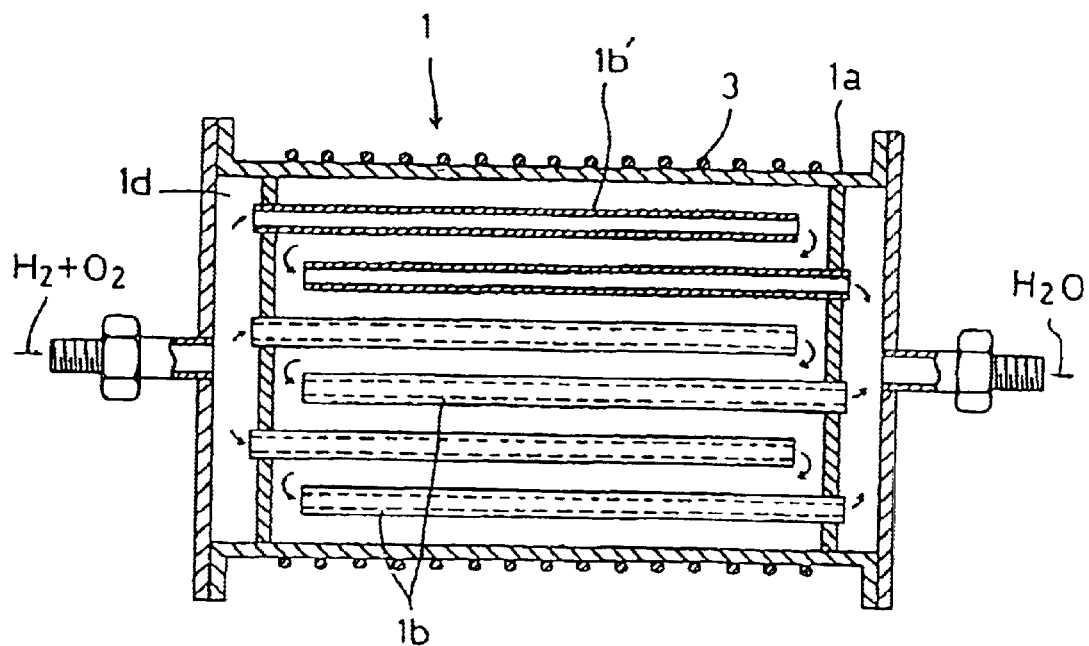
FIG. 2 is a schematic cross-sectional view showing a first embodiment of the first water-generating reactor.

The reactor 1 comprises a heat-resistant corrosion-resistant Ni alloy (Hastelloy) casing 1a in which a plurality of nickel pipes 1b are housed as shown in FIG. 2 (first embodiment). In FIG. 2 the mixture gas is allowed to flow as a shuttle flow in the Hastelloy casing 1a (which has a 34.6 mmø inside diameter), where 4 to 6 pieces of nickel pipe 1b (each having a ¼ inch ø inside diameter and a 100 mm lenth) are housed, so that both inner and outer surfaces of the nickel pipe 1b are utilized as catalysts for activating the reactivity of hydrogen and oxygen.

A gas pressure at an inlet to the reactor 1 is selected to be 1.1–1.05 kg/cm², and a flow rate is set at $O_2$=500 cc/min. and $H_2$=1,000 cc/min., and 1,000 cc/min. water is generated.

The heater 3 is wound around an outer wall surface of the casing 1a of the reactor, and the heater 3 is used to hold the mixture gas at the inlet end of the reactor 1 to about 200–500° C. and at an outlet end to about 600° C. or lower.

The temperature of the nickel catalyst in the reactor 1, is preferably controlled to 200–500° C. for the inlet end portion temperature and in a range that does not cause steam to condense out and to not higher than 600° C. for the outlet end portion, as is clear from each test example discussed below.

This is because, as is clear from test example 2, about 68% of 75 cc/min. of $H_2$ and $O_2$ mixture gas (when the reaction piping formed of Ni pipe at ¼ inch inside diameter and 2 m long is held to 450° C.) completes reactions within 20 cm from the inlet end and about 29% of 750 cc/min. of mixture gas (when the reaction pipe formed of Ni piping, of ¼ inch inside diameter and 20 m long, is held to 450° C.) within 20 cm from the inlet end, respectively. During this period, a large amount of reaction heat ($2H_2+O_2 \rightarrow 2H_2O+$ 136.6 kcal) is discharged, and with this heat, the nickel pipe 1b (catalyst material) is overheated.

In the first embodiment, the nickel pipes 1b only are used as catalyst material, but a pipe 1b' to which $H_2$ and $O_2$ is fed in a first flow may be made of a material with low reactivity, and conversely, the pipe 1b through which returning $H_2$ and $O_2$ is fed may be made of a material with high reactivity so that overheating of the mixture gas at the upstream end portion may thereby be prevented.

In the first embodiment, the number of pipe(s) 1b' through which $H_2$ and $O_2$ is fed in the first flow is the same as that of the pipe(s) 1b through which returning $H_2$ and $O_2$ is fed, but heating of the mixture gas at the upstream end may be prevented by having a smaller number of the former pipes than the number of the latter pipes.

In addition, in the first embodiment, water generated in the reactor 1 is supplied directly to semiconductor manufacturing equipment (illustration omitted) but if a preheating portion (not illustrated) is installed at the gas inlet end of the reactor 1, the generated water taken from the outlet end of the reactor 1 may be reheated using heat from the preheating portion, before it is supplied to the semiconductor manufacturing equipment.

As the said catalyst material, a Ni filter or Ni ribbon may be used as shown in test example 3, later discussed (second water-generating reactor), or Hastelloy, platinum, Pd, stainless steel, etc. may be used.

The catalyst may be formed in a column filled with granular catalyst, sintered material of powders or fibers (filter element), laminating with laminated thin sheets, honeycomb body, mesh body, sponge body, or fin-shape body. One, two or more of these may be initially placed in the casing 1a to form a passage(s) through which hydrogen and oxygen is allowed to flow while coming in contact with them (second water-generating reactor).

In addition, a pipe, granule, sintered material, thin sheet laminate, honeycomb body, mesh body, sponge body, or fin-shape body whose surfaces are covered with the catalyst material (second water-generating reactor) may be selected as the form of the catalyst.

The first water-generating reactor 1 according to this invention can successfully achieve a water generation responsiveness (about 40–50 seconds) required for practical use, given a certain level of allowance as to the conditions of temperature and gas flow rate under which total volume of $H_2$ and $O_2$ are allowed to react as shown in test example 4, discussed below.

Even if the inner surface of reaction piping is reduced with $H_2$ or oxidized with $O_2$ (annealing temperature: 500° C.), a water generation responsiveness is completely free of any influence, and changes of water generation reactivity of the reaction pipe never occur.

Furthermore, with respect to safety of the reactor 1, as shown in test example 5, discussed below, in any case of the $H_2$ to $O_2$ mixture ratio of 3:1, 2:1, and 4:3, a gas ignition temperature is about 620° C. and no gas ignition is observed at 610° C.

In this invention, since the gas temperature in the reactor 1 is controlled to be 600° C. at a maximum, or lower, there is no fear of gas ignition, that is, gas explosion. In particular, controlling the temperature at the gas inlet end portion of the reactor 1 to be in the vicinity of about 200–500° C., with the reaction heat of the mixture gas taken into account, temperature of each portion of the reactor 1 can be surely held to 600° C. or lower, and explosion by ignition can be completely prevented.

At the gas mixing portion 4 of the $O_2$ gas and the $H_2$ gas, a regular in-pipe gas mixing system is adopted, and no special gas mixing mechanism at all is used.

Needless to say, a gas mixing mechanism designed to discharge $H_2$ gas into oxygen gas $O_2$ in a swirling stream using a mixing box (not illustrated) and to uniformly mix them both, may be used as a gas mixing portion 4.

A gas preheating portion may be installed inside or downstream of the mixing portion 4.

The $O_2$ and water mixing portion 5 is installed near the outlet end of the reactor 1, and is provided with the heater 5a.

That is, oxygen gas $O_2$ is mixed with water spouted from the reactor 1, and the mixture gas of $H_2O$ and $O_2$ is heated to about 120° C. by the heater 5a to prevent dew condensation of $H_2O$ on pipe walls, and then supplied to the semiconductor manufacturing equipment 6.

In the reactor 1 of FIG. 1, $O_2$ is mixed with water, but as a diluting gas, in addition to $O_2$, $H_2$ and inert gas for adjusting oxidation-reduction power, or $N_2O$, etc. for improving interface characteristics of Si and Si $O_2$ are sometimes used.

In the reactor 1 of FIG. 1, since gases supplied to the reactor 1 are restricted to hydrogen and oxygen only, as compared to a conventional case in which mixture gas (diluting gas) of hydrogen, oxygen, argon, etc. is supplied, the reactivity is improved, and it has an advantage in that the reactor 1 can be downsized a corresponding amount.

Table 1 shows analysis results in which impurities in water generated from the first water-generating reactor 1 according to this invention was analyzed by a flameless atomic absorption analysis.

That is, the generated water was collected by allowing it to condense in the PFA tube, and three components of Cr, Fe, and Ni were analyzed by the flameless atomic absorption analysis. As a result, metals of all three components became low values on the order of ng/mL or less.

TABLE 1

Analysis of impurities in generated water
(flameless atomic absorption analysis)

| Element | n = 1 | n = 2 | (Unit: ng/m. liter) Mean value |
|---|---|---|---|
| Cr | 0.055 | 0.051 | 0.053 |
| Fe | 1.5 | 1.6 | 1.6 |
| Ni | 0.69 | 0.74 | 0.72 |

Note) n = 1 and n = 2 indicate the results of measurements carried out twice.

TABLE 2

| | Chemical component (wt %) | | | | | | |
|---|---|---|---|---|---|---|---|
| | Ni | Cu | Fe | Mn | C | Si | S |
| Min. | 99.0 | — | — | — | — | — | — |
| Max | — | 0.25 | 0.40 | 0.35 | 0.15 | 0.35 | 0.01 |
| Analysis value | 99.2 | 0.01 or less | 0.16 | 0.19 | 0.06 | 0.08 | 0.01 or less |

Table 2 shows the chemical components of nickel pipe used in the first water-generating reactor, and Ni seamless pipe commercially available from Mitsubishi Material Company is used.

To prevent particle contamination in the generated water, it is preferable to specular-surface finish a whole or part of the surface of the catalysts material in the reactor or the surface of the casing including the forward and backward piping systems which may come in contact with gas. It has been confirmed that specular-surface finishing the surfaces coming in contact with gas decreases incidences of particles in the generated water to about ⅓ or less.

For preventing the above-mentioned metal contamination, it is effective to make a whole or part of the casing including the backward and forward piping systems from a heat-resistant metal or corrosion-resistant metal. For example, it has been confirmed that with the casing made from stainless steel, metal contamination in the generated water has doubled after the casing has been used for 100 hours, but with the casing made from Hastelloy, nickel-based heat-resistant metal alloy, the metal contamination level in the generated water has hardly changed even after it has been used for 100 hours. Even in a test using a casing made from heat-resistant metal of iron-chromium-aluminum alloy, results similar to those obtained with the Hastelloy casing were observed.

In addition, it has been confirmed that for reducing the metal contamination, it is effective to apply an oxidation-resistant reduction-resistant or corrosion-resistant protective film or a surface treatment with performance equivalent to the protective film to the whole or part of the surface of the casing, including the backward and forward piping systems, which may come in contact with the gas.

For example, it as been confirmed that with the casing made from stainless steel which was not provided with inner surface treatment, metal contamination in generated water doubled after it was used for 100 hours, but with the casing made from stainless steel whose inner surface was covered with chromium oxide film, the metal contamination level in the generated water scarcely changed even after it was used for 100 hours.

Second Embodiment

Figure 3:
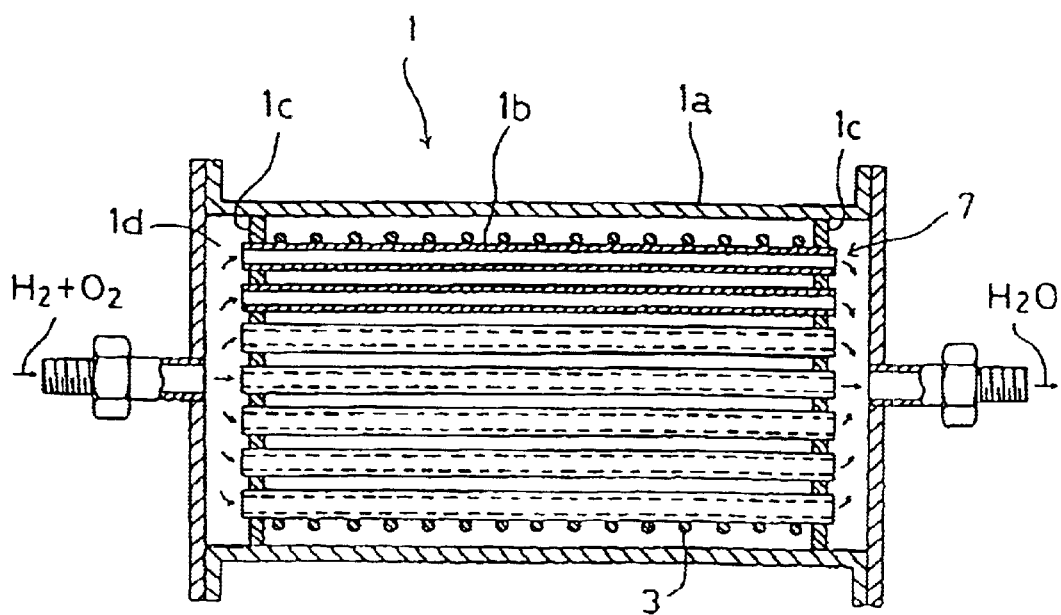
FIG. 3 shows a second embodiment of the first water-generating reactor.

FIG. 3 shows a second embodiment of the first water-generating reactor 1 according to this invention. In this second embodiment, an assembly 7 is formed in which a plurality of Ni pipes 1b are fixed to end plates 1c, and the assembly 7 is housed in the housing 1a. A heater 3 is wrapped around a periphery of the assembly 7, and the temperature at the inlet end of the reactor 1 is held to about 200–500° C. or at the outlet end to about 600° C. or lower by temperature adjustment of the heater 3.

Third Embodiment

Figure 4:
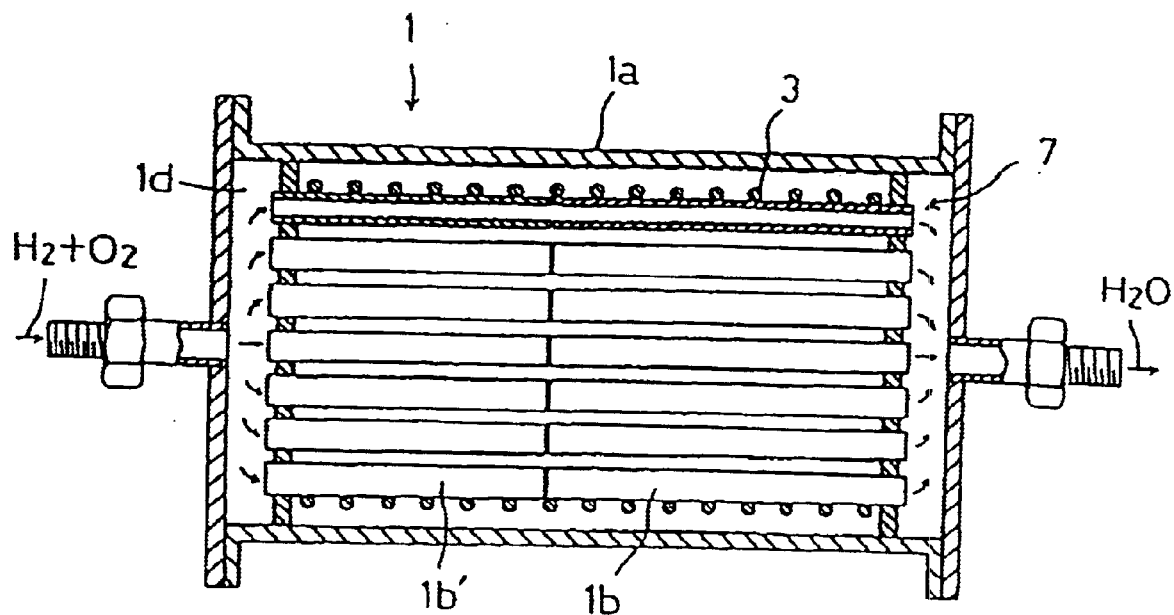
FIG. 4 shows a third embodiment of the first water-generating reactor.

FIG. 4 shows a third embodiment of the reactor 1, in which upstream end portions of the catalyst pipes making up the catalyst assembly 7 of the reactor 1 are stainless steel pipes 1b' and downstream end portions are nickel pipes 1b.

As in the case of the third embodiment, by allowing a reactivity of the catalyst pipes at the upstream end to be lower and at the downstream end to be higher, an amount of the $O_2$ and $H_2$ reaction-generated heat is increased at the downstream end, and an overheated state can be effectively prevented at the upstream end.

Figure 5:
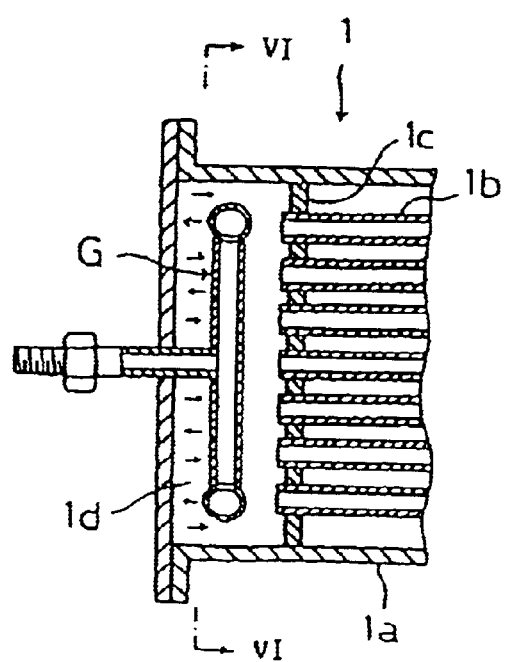
FIG. 5 is a schematic cross-sectional view of a gas spouting mechanism of the first water-generating reactor.
Figure 6:
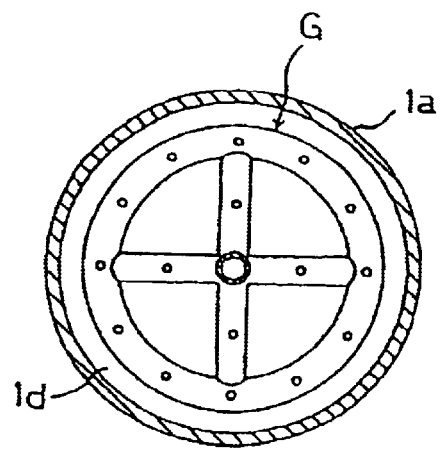
FIG. 6 is a cross-sectional view taken on line VI—VI of FIG. 5.

In the reactors 1 of FIG. 3 and FIG. 4, the reaction gas ($O_2+H_2$) is designed to be spouted from a gas supply pipe directly to a vestibule 1d of the casing 1a, but in order to make an inflow of the reaction gas into the catalyst pipes uniform, it is desirable to place a gas spouting mechanism G as shown in FIGS. 5 and 6 in the vestibule 1d of the casing 1a, to cause gas spouted from nozzle holes of this gas spouting mechanism G to collide with a casing inner wall surface thereby causing the gas to form a gas flow as with uniform kinetic energy.

Fourth Embodiment

Figure 7:
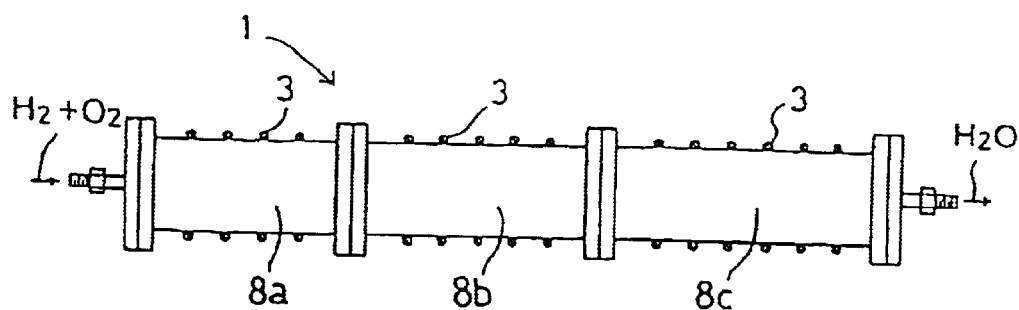
FIG. 7 shows a fourth embodiment of the first water-generating reactor.

FIG. 7 shows a fourth embodiment of the reactor 1, where three types of assemblies 7 of varying reactivities are assembled in series.

That is, by using a unit 8a with low reactivity for an inlet end, and a unit 8c of high reactivity for an outlet end, a distribution of reaction heat is made uniform in a longitudinal direction, thereby preventing localized overheat of the reactor 1.

Needless to say, a heater (illustration omitted) is installed to each of the reactor units 8a, 8b, 8c, respectively.

Figure 8:
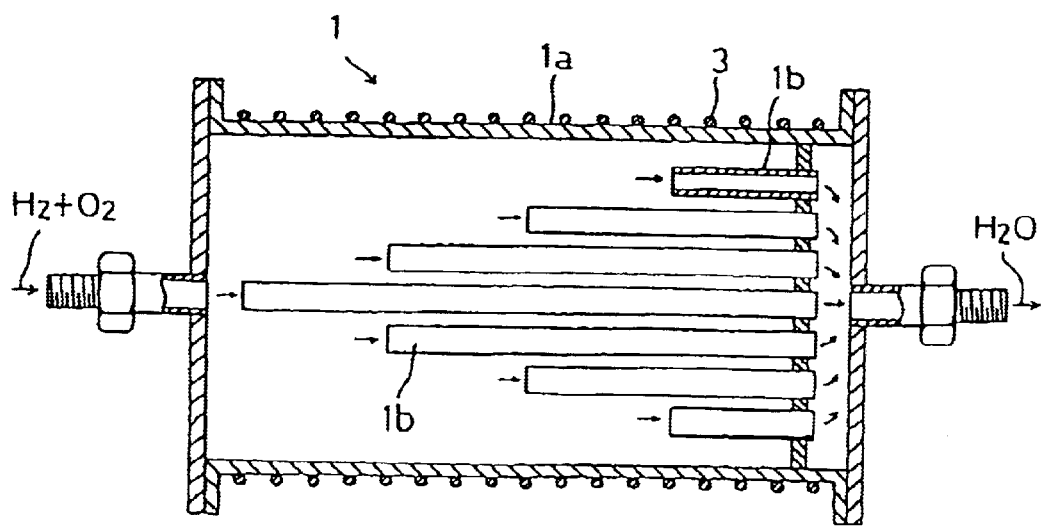
FIG. 8 shows a fifth embodiment of the first water-generating reactor.

FIG. 8 shows a fifth embodiment of the reactor 1, where a number and length of catalyst pipes 1b are varied to lower a reactivity at a mixture gas inlet end and to increase outlet end reactivity, with a distribution of reaction heat being designed to be uniform in the longitudinal direction of the reactor 1.

In FIG. 8, the heater is omitted.

Sixth Embodiment

Figure 9:
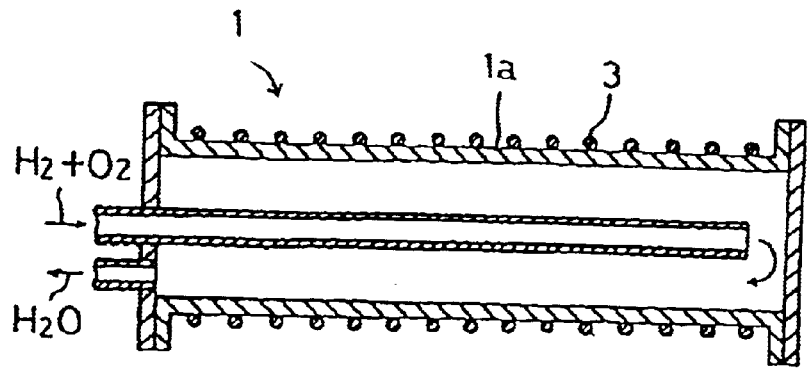
FIG. 9 shows a sixth embodiment of the first water-generating reactor.

FIG. 9 shows a sixth embodiment of the reactor 1, where an $H_2$ and $O_2$ mixture gas inlet end and water outlet end are designed to be placed at the same end, with the inlet end being cooled by the generated water to prevent the inlet end from being heated to high temperature.

Figure 10:
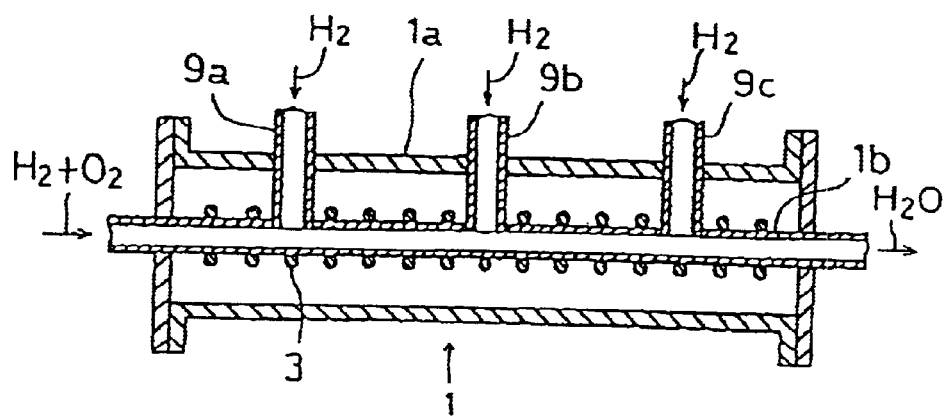
FIG. 10 shows a seventh embodiment of the first water-generating reactor.

FIG. 10 shows a seventh embodiment of the reactor.

In this embodiment, a plurality of branch pipes 9a, 9b, 9c are mounted on catalyst pipe 1b or a casing 1a. $O_2$ gas (for example, 500/cc/min.) and part of $H_2$ gas (for example, 250 cc/min.) are supplied from an inlet end of the catalyst pipe 1b (or casing 1a), and a remainder of $H_2$ (for example, 250 cc/min.) is supplied from each of branch pipes 9a, 9b, 9c.

By distributing the position of the $H_2$ gas supplied in this way, it is intended to prevent an overheating caused by reaction heat at the inlet end of the catalyst pipe 1b (or casing 1a).

Eight Embodiment

Figure 11:
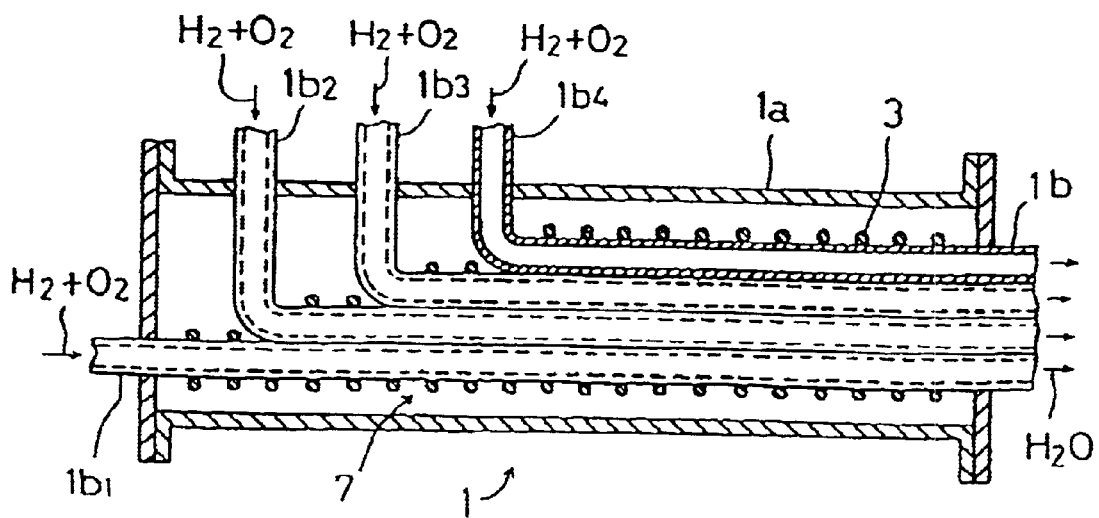
FIG. 11 shows an eighth embodiment of the first water-generating reactor.

FIG. 11 shows an eighth embodiment of the reactor 1, in which a catalyst assembly 7 of the reactor 1 is formed to have a plurality of catalyst pipes 1b in parallel, while at the same time an inlet end of each catalyst pipe is positioned to be separated and dispersed from the inlet ends of the other catalyst pipes.

The mixture gas is fed at a flow rate of, for example, 200 cc/min. for $O_2$ and 400 cc/min. for $H_2$ from the inlet end of the catalyst pipe $1b_1$, and 200 cc/min. for $O_2$ and 100 cc/min. for $H_2$ from the inlet end of each catalyst pipe $1b_2$, $1b_3$, $1b_4$.

With this configuration, the generation of reaction heat is dispersed and temperature control of the reactor 1 is facilitated.

Ninth Embodiment

Figure 12:
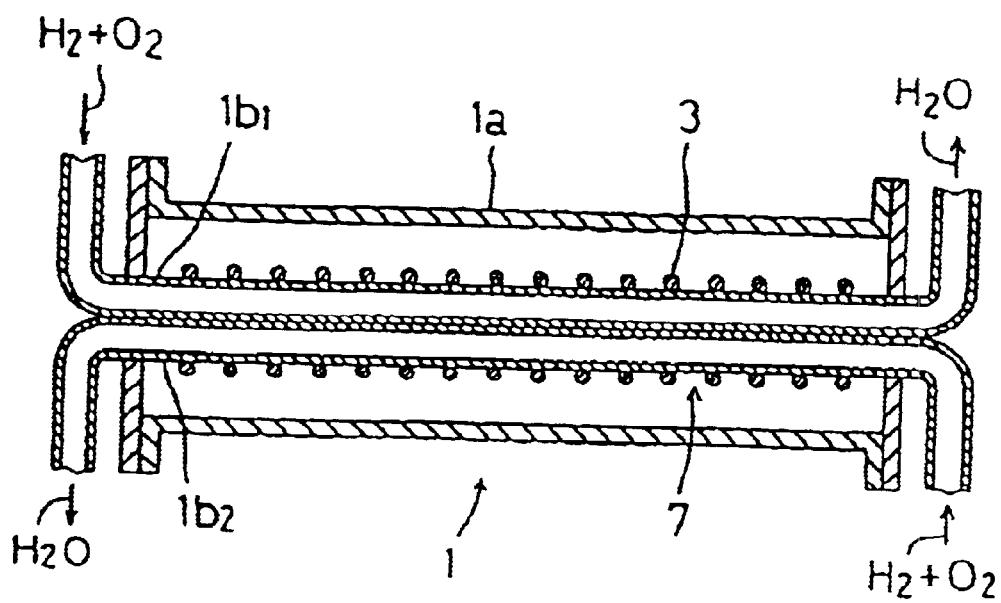
FIG. 12 shows a ninth embodiment of the first water-generating reactor.

FIG. 12 shows a ninth embodiment of the reactor 1, in which two (or more) catalyst pipes $1b_1$, $1b_2$ are installed in parallel and at the same time, the mixture gas is supplied into each catalyst pipe $1b_1$, $1b_2$, respectively, from an opposite direction.

In this embodiment, reaction heat at the inlet end is utilized for promoting reaction of the mixture gas at the outlet end, thereby saving energy and at the same time preventing overheating of the catalyst pipe at the inlet end.

Tenth Embodiment

Figure 13:
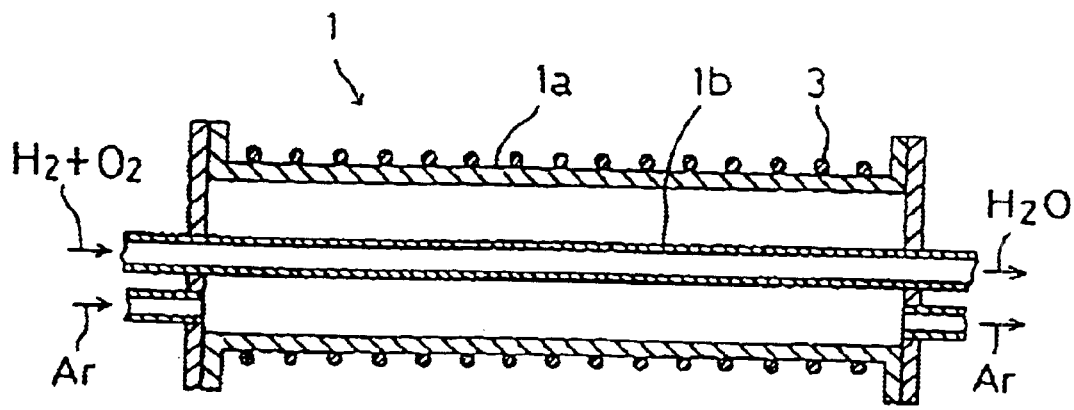
FIG. 13 shows a tenth embodiment of the first water-generating reactor.

FIG. 13 shows a tenth embodiment of the reactor 1, in which a heat medium gas such as $N_2$, Ar, $CO_2$, etc. is allowed to flow between the casing 1a and a nickel tube 1b to transfer reaction heat at an inlet end to an outlet end, and reaction heat thus transferred is utilized to promote reactions at the outlet end.

A heater 3 may be wound around the outside of the nickel tube 1b (catalyst pipe 1b).

Figure 14:
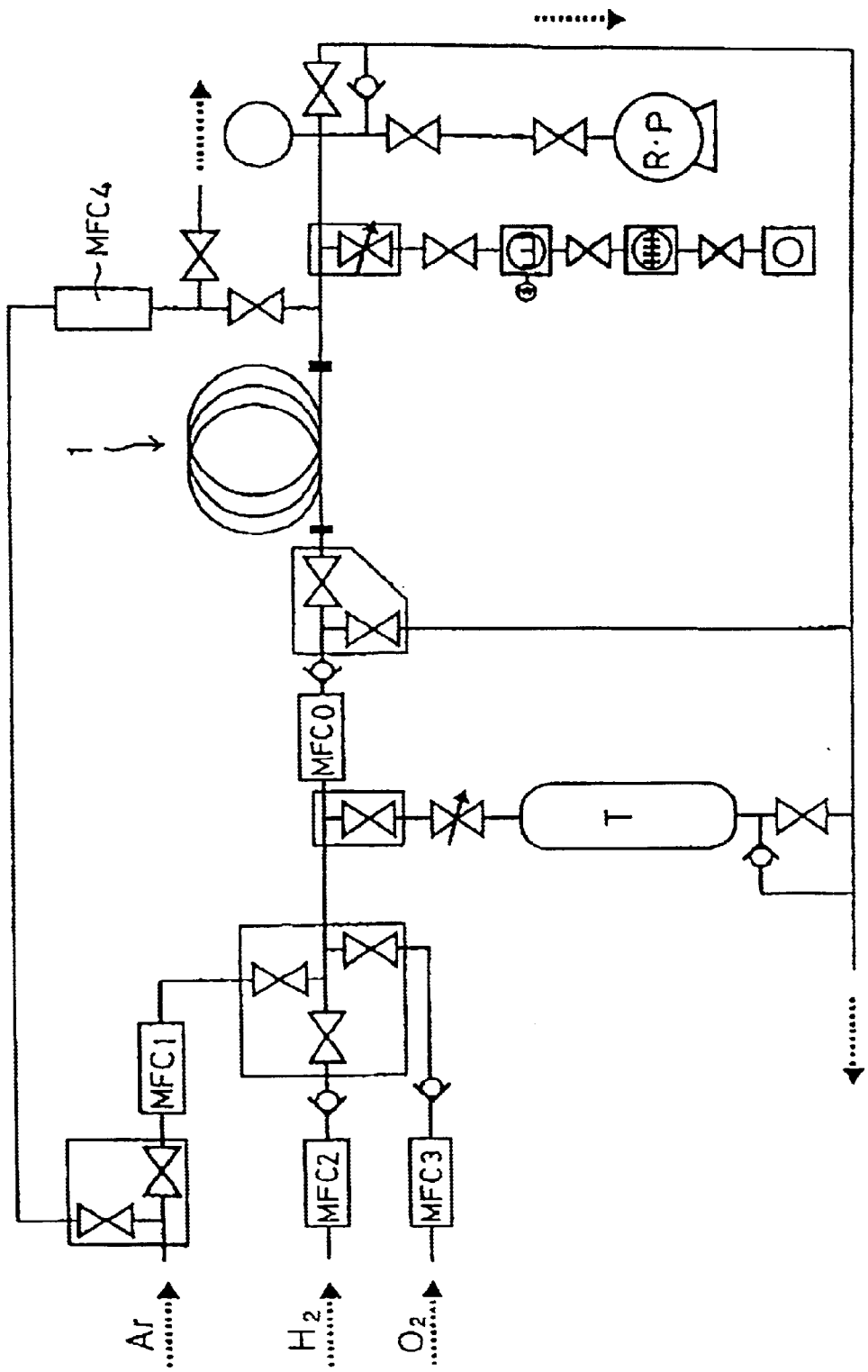
FIG. 14 shows an overall system diagram of test equipment for obtaining basic data of this invention.

FIG. 14 shows a system diagram of experimental equipment used for obtaining basic data required for creation of this invention.

In FIG. 14, MFC0–4 designate mass flow controllers, RP a vacuum pump, and T a tank. As a reactor 1, a nickel pipe (inner surface area 273 $cm^2$) ¼ inch inside diameter and 2 m long is used.

Test Example 1

The relationship between the $H_2$, and $O_2$, mixture ratio and reaction temperature was tested using the experimental equipment of FIG. 14.

As is clear from FIGS. 15 through 18, an $H_2$ rich mixture gas is likely to lower reaction temperature and generate water easily.

Figure 19:
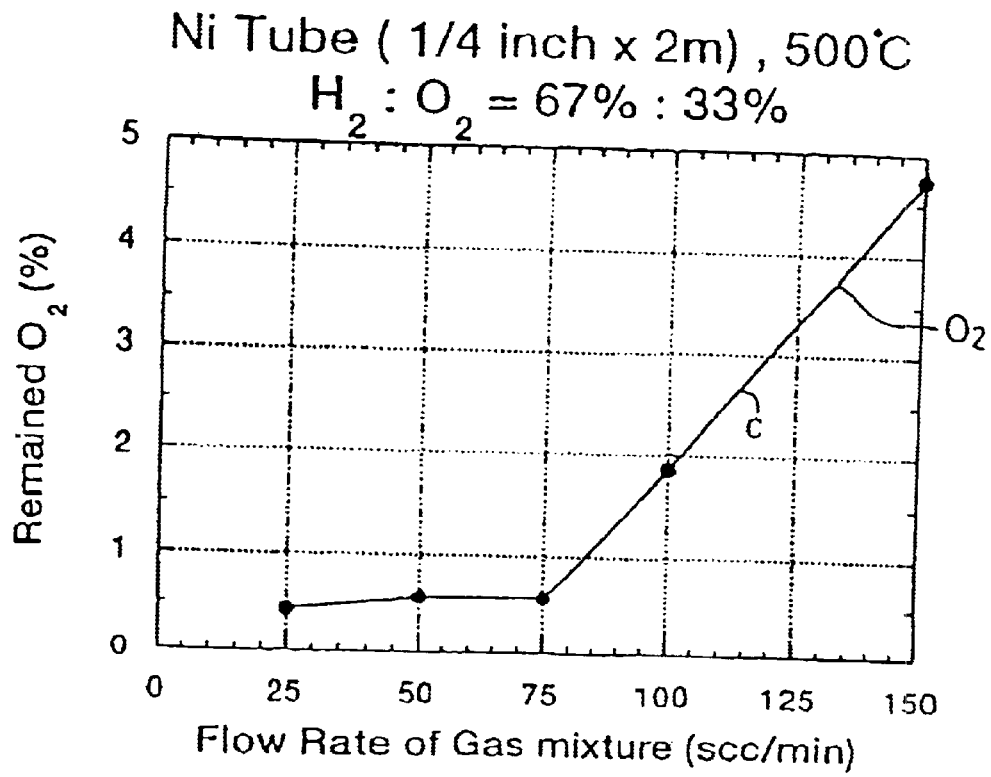
FIG. 19 is a graph showing a relationship between a mixture-gas-flow rate and remaining $O_2$ (Test 1)

In addition, as is clear from FIG. 19, in the case of the reactor of this test equipment, when the mixture-gas-flow rate became 75 cc/min. or more at 500° C., unreacted $O_2$, increases.

The curve A shows $H_2O$, curve $BH_2$, and curve $CO_2$, respectively.

Test Example 2

By holding the nickel tube (¼ inch in inside diameter, 2 m long, 273 $cm^2$ in inner surface area) to 450° C., supplying the mixture gas of $2H_2+O_2=75$ cc/min. from the inlet end and then detecting the remaining $O_2$ in the tube, the reaction rate was investigated.

As a result, it was determined that at a point 20 cm from the inlet end, about 68% $O_2$, and $H_2$, had completed the reaction.

Similarly, it has been determined that when the mixture gas is supplied into a nickel tube 20 m long (¼ inch inside diameter) at a flow rate of $2H_2+O_2=75$ 750 cc/min., about 29% of $O_2$ and $H_2$ reactions have been completed at the point 20 cm from the inlet end.

The results of the tests indicate that in the reactor 1, most of the reaction of $H_2$, with $O_2$ is completed at the vicinity of the inlet end of the nickel pipe, and consequently, the reaction heat is generated in a large quantity at the vicinity of the inlet end.

Test Example 3

Using an All Metal Filter and nickel ribbon (0.3 thick×20 wide×1000 mm long) comprising nickel fiber sintered material, a water generating test was carried out (second water-generating reactor).

Figure 20:
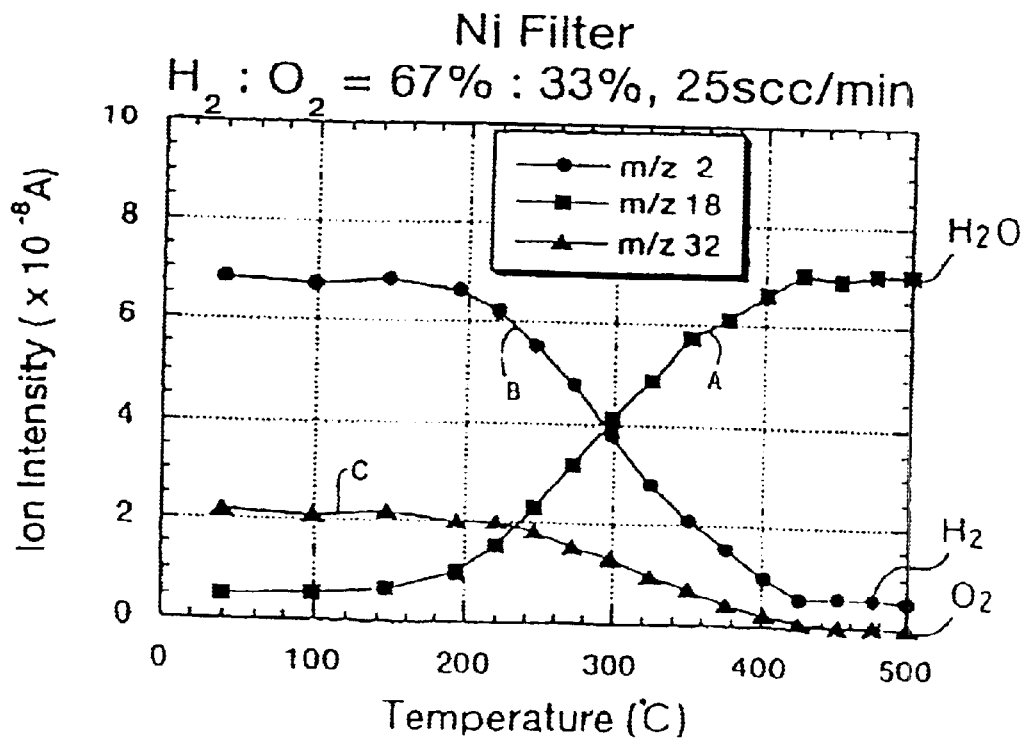
FIG. 20 is a graph showing a relationship between reactor temperature and water generation when a nickel filter is used (Test 3)
Figure 21:
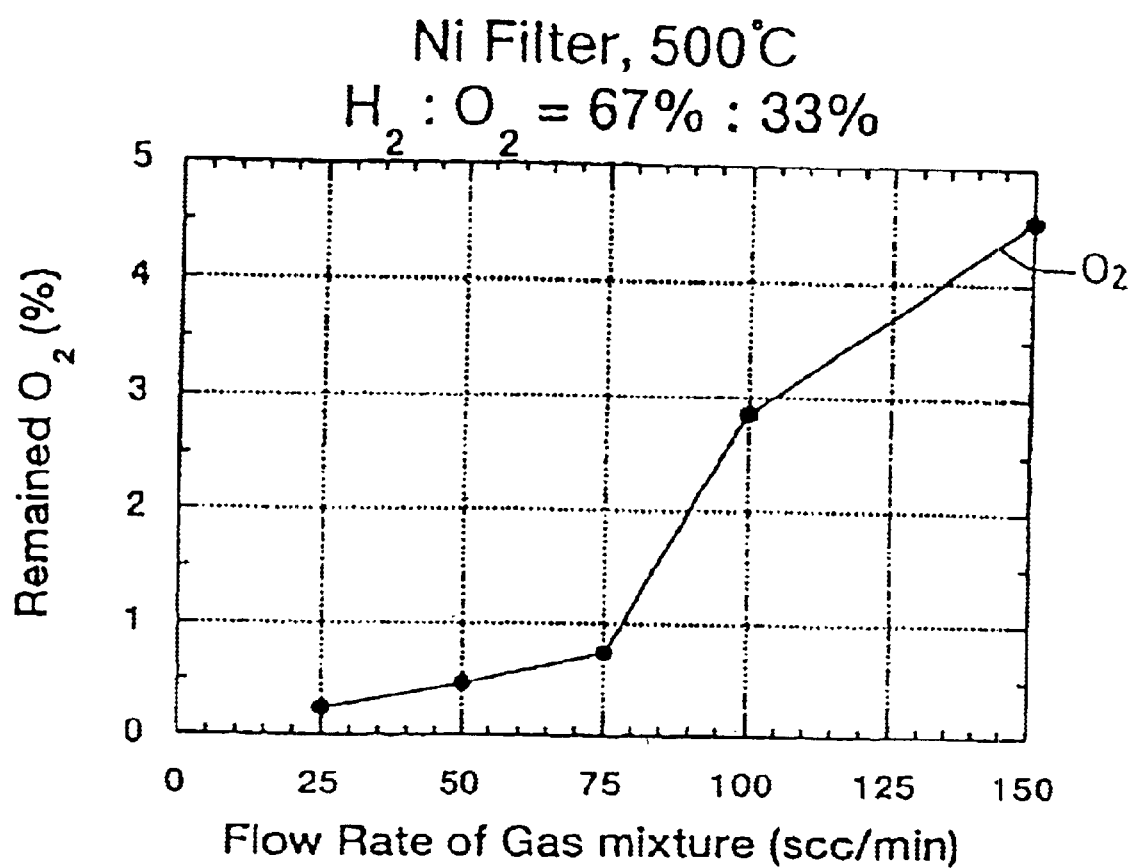
FIG. 21 is a diagram showing a relationship between mixture-gas-flow rate and remaining $O_2$ in a case of a nickel filter (Test 3)
Figure 22:
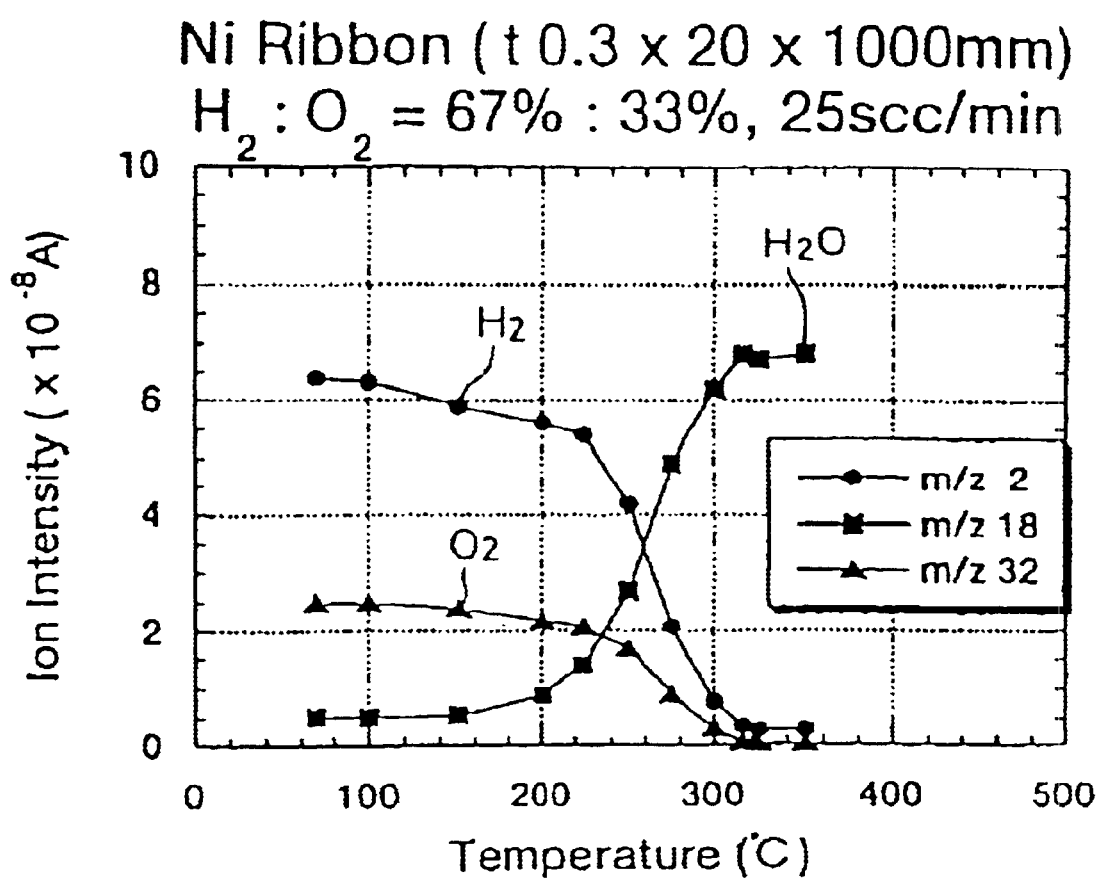
FIG. 22 is a graph showing a relationship between reactor temperature and water generation when a nickel ribbon is used (Test 3)
Figure 23:
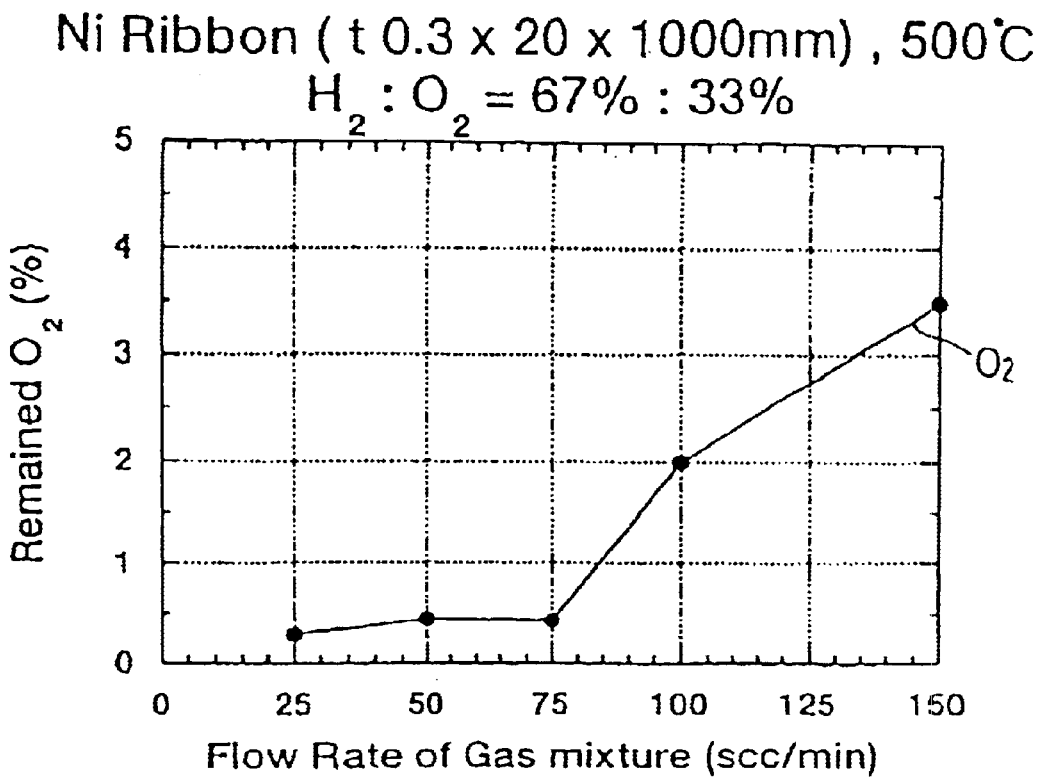
FIG. 23 is a diagram showing a relationship between mixture-gas-flow rate and remaining $O_2$ in a case where nickel ribbon is used (Test 3)

FIGS. 20 and 21 show test results obtained when the nickel filter was used, while FIGS. 22 and 23 show test results obtained when nickel ribbon was used.

Figure 15:
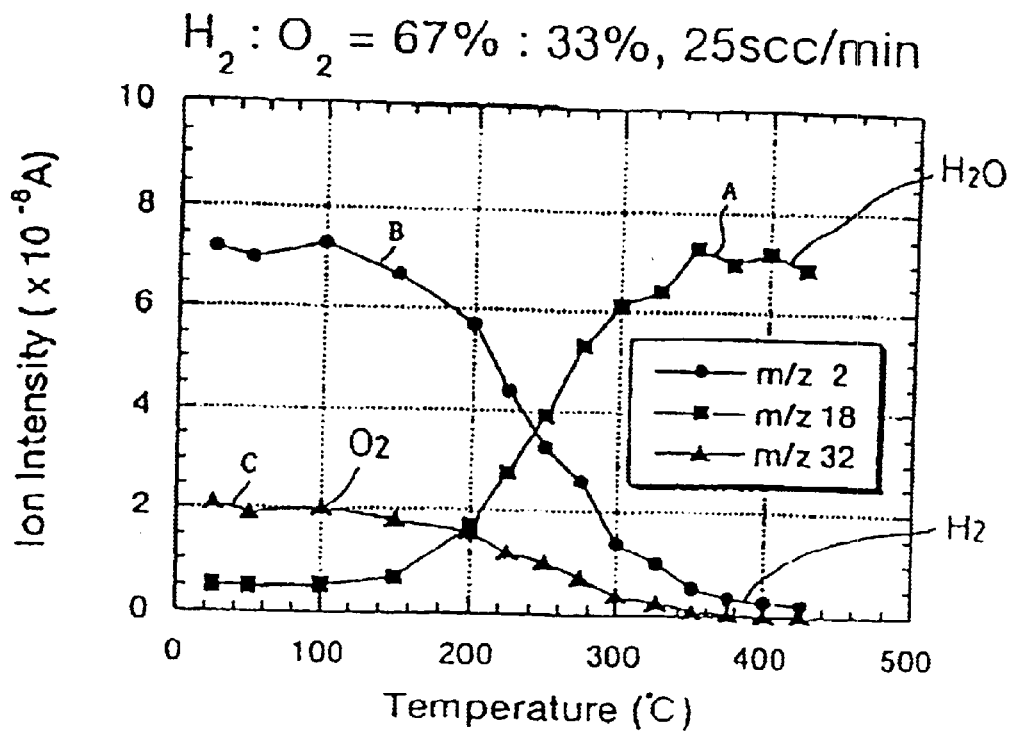
FIG. 15 is a graph showing a relationship between reactor temperature and water generation (Test 1)
Figure 16:
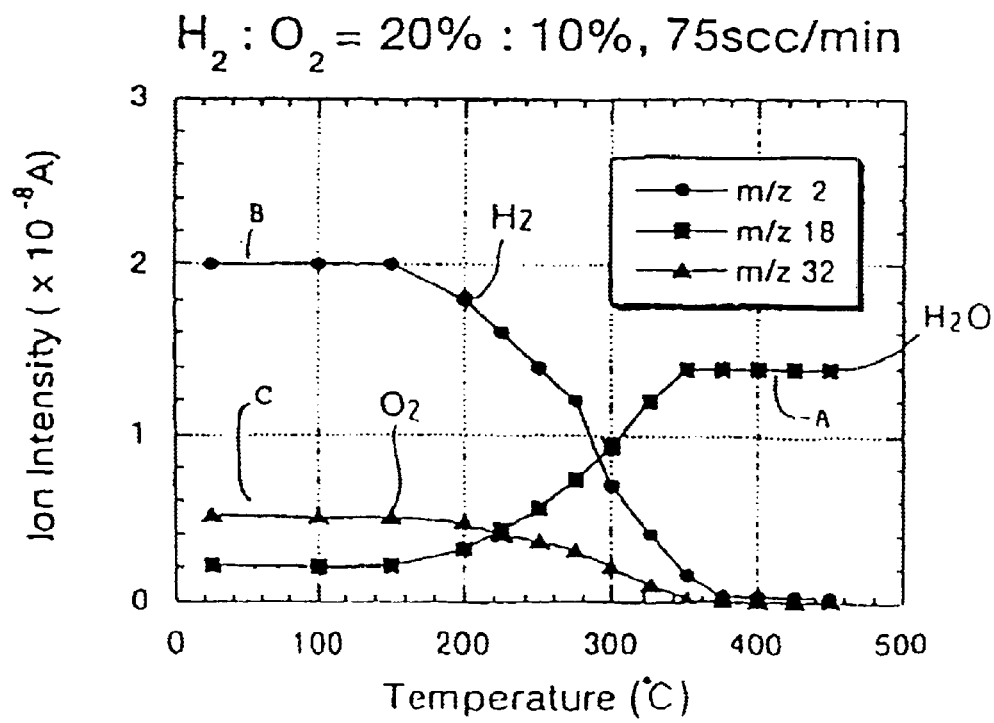
FIG. 16 is a graph showing a relationship between reactor temperature and water generation (Test 1)
Figure 17:
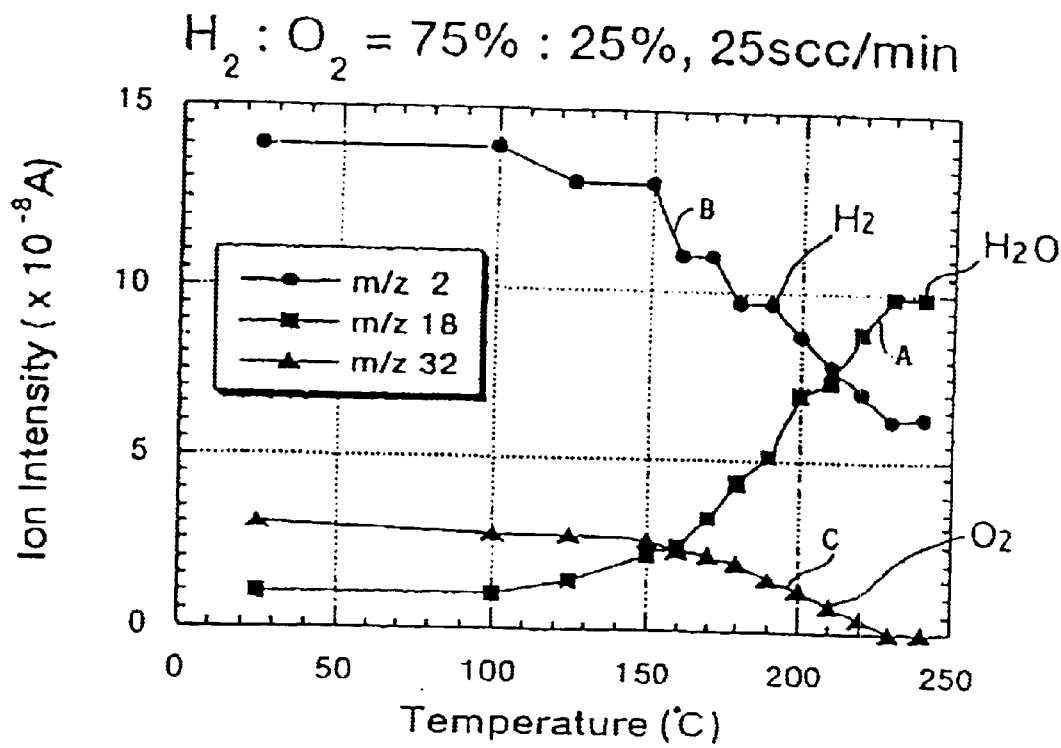
FIG. 17 is a graph showing a relationship between reactor temperature and water generation (Test 1)
Figure 18:
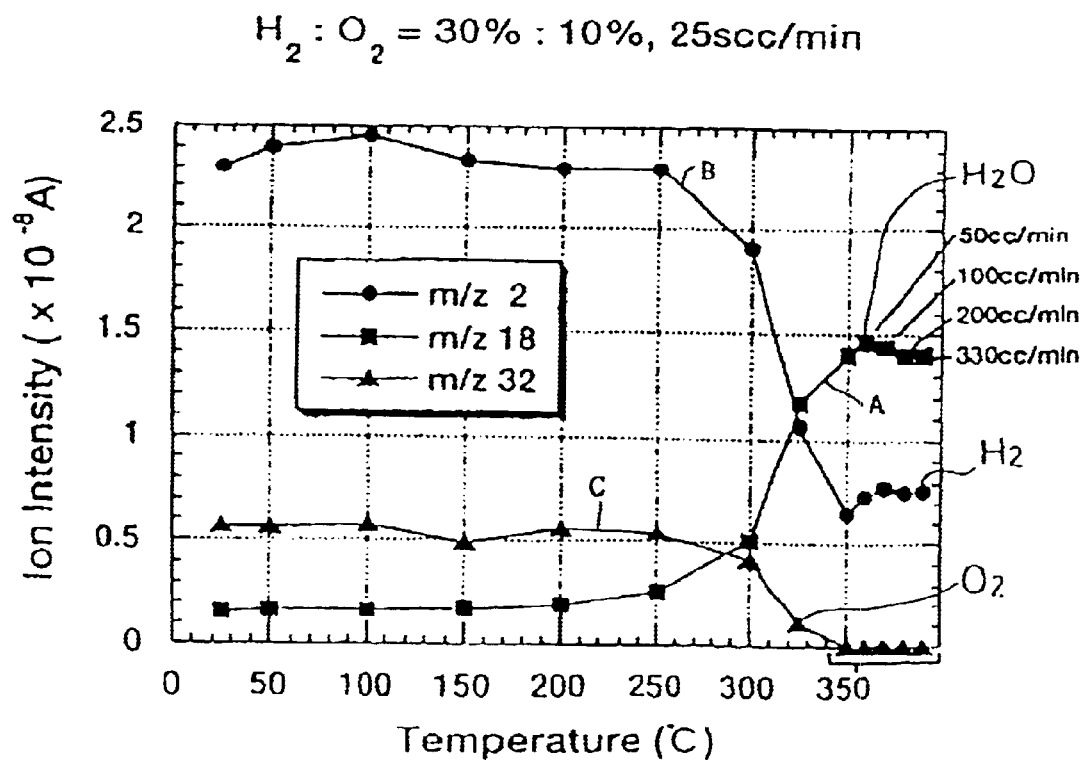
FIG. 18 is a graph showing a relationship between reactor temperature and water generation (Test 1)

As is clear from FIG. 20 and FIG. 22, it is possible to generate water in an amount equivalent to, or more than, that obtained in the case of FIG. 15 in which the nickel tube was used.

Consequently, it is possible to use a nickel ribbon or nickel filter in place of a nickel tube as the catalyst material.

Test Example 4

Figure 24:
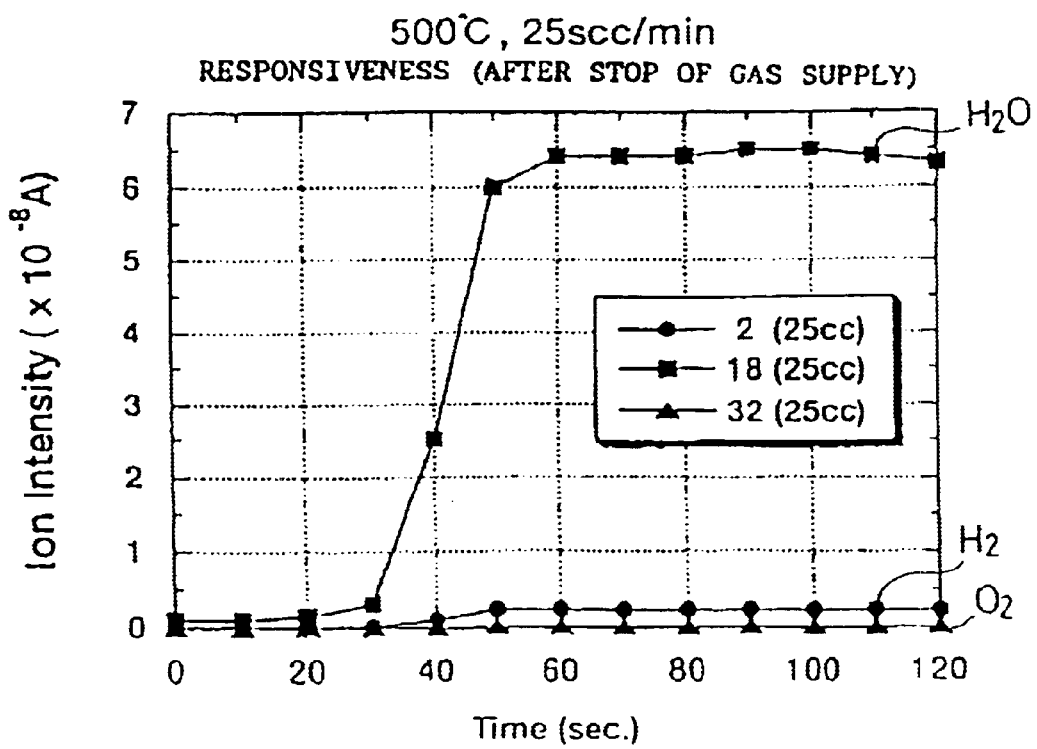
FIG. 24 is a graph showing a relationship between time and water generation (responsiveness) (after gas is stopped) (Test 4)

The water generating responsiveness was tested with the nickel tube held to 500° C. and the mixture-gas-flow rate at 25 cc/min. (FIG. 24). As is clear from FIG. 24, when the mixture gas was supplied again after stopping the supply of the mixture gas, the water generating rate becomes constant in about 40–60 seconds, indicating excellent responsiveness.

Figure 25:
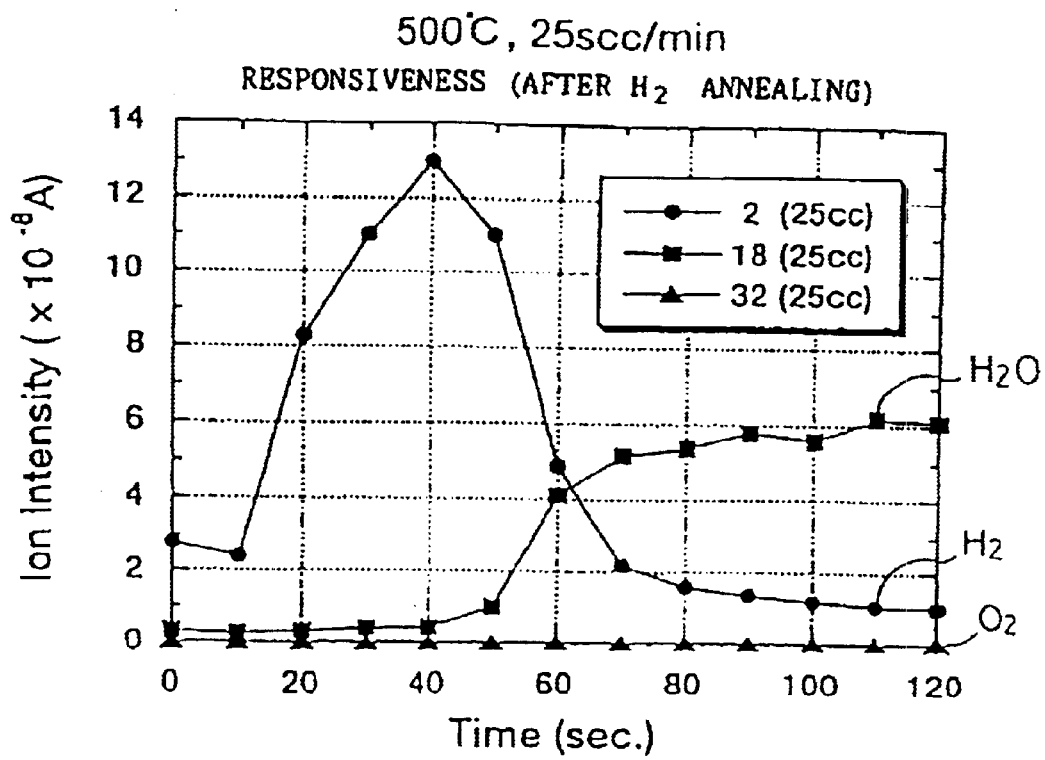
FIG. 25 is a graph showing a relationship between time and water generation (responsiveness) (after $H_2$ annealing) (Test 4)
Figure 26:
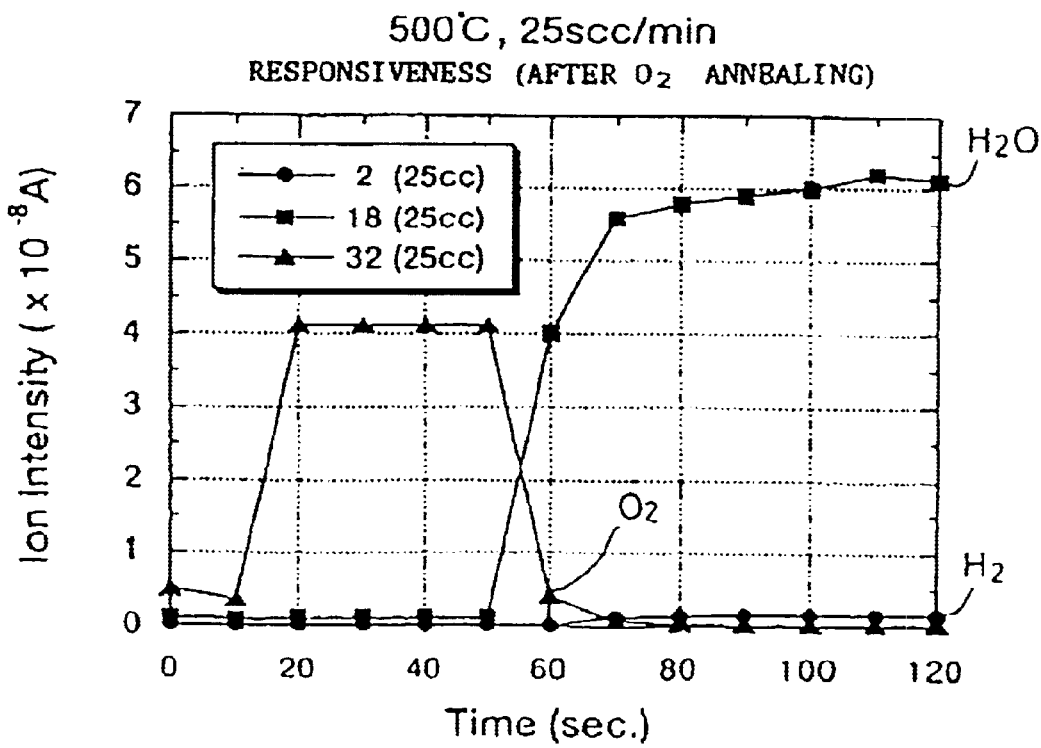
FIG. 26 is a graph showing a relationship between time and water generation (responsiveness) (after $O_2$ annealing) (Test 4)

And after the inside of the nickel tube was annealed (500° C.) in an $H_2$ environment (FIG. 25), and after it was annealed (500° C.) in an $O_2$ environment (FIG. 26), a specified water generating amount was able to be obtained in 60–80 seconds.

Test Example 5

The relationship between the $H_2$ and $O_2$ mixture ratio and gas ignition temperature was confirmed by tests.

Figure 27:
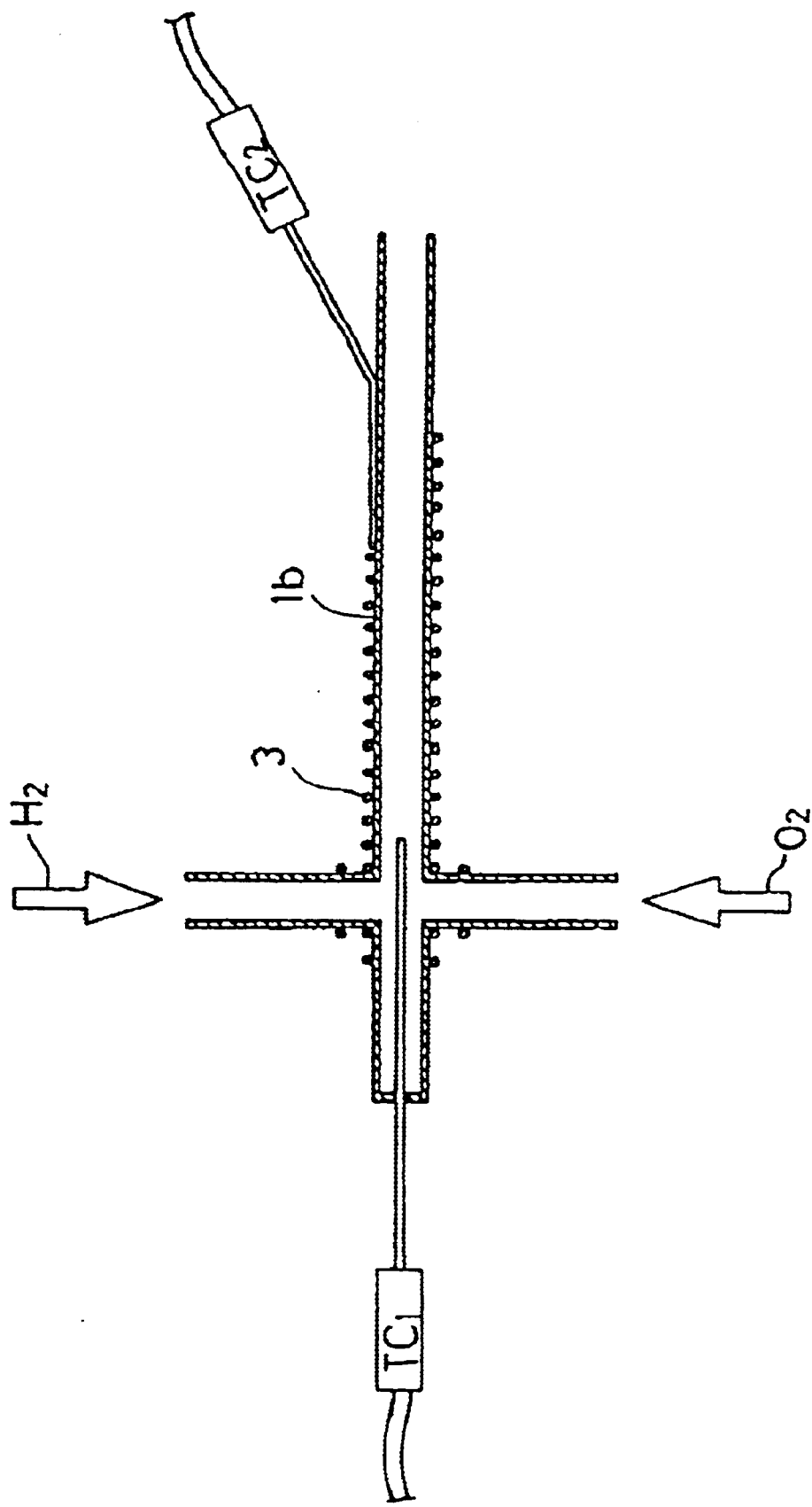
FIG. 27 is an illustration of ignition temperature detection equipment.
Figure 28:
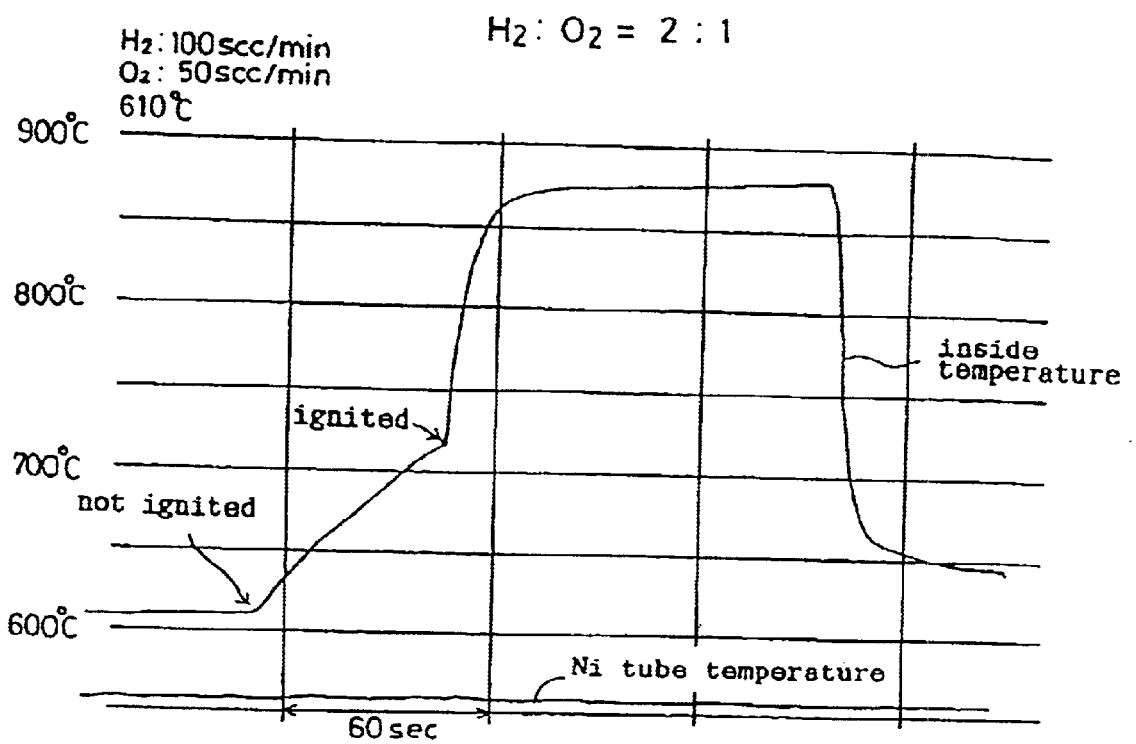
FIG. 28 is a graph showing ignition temperature (Test 5)
Figure 29:
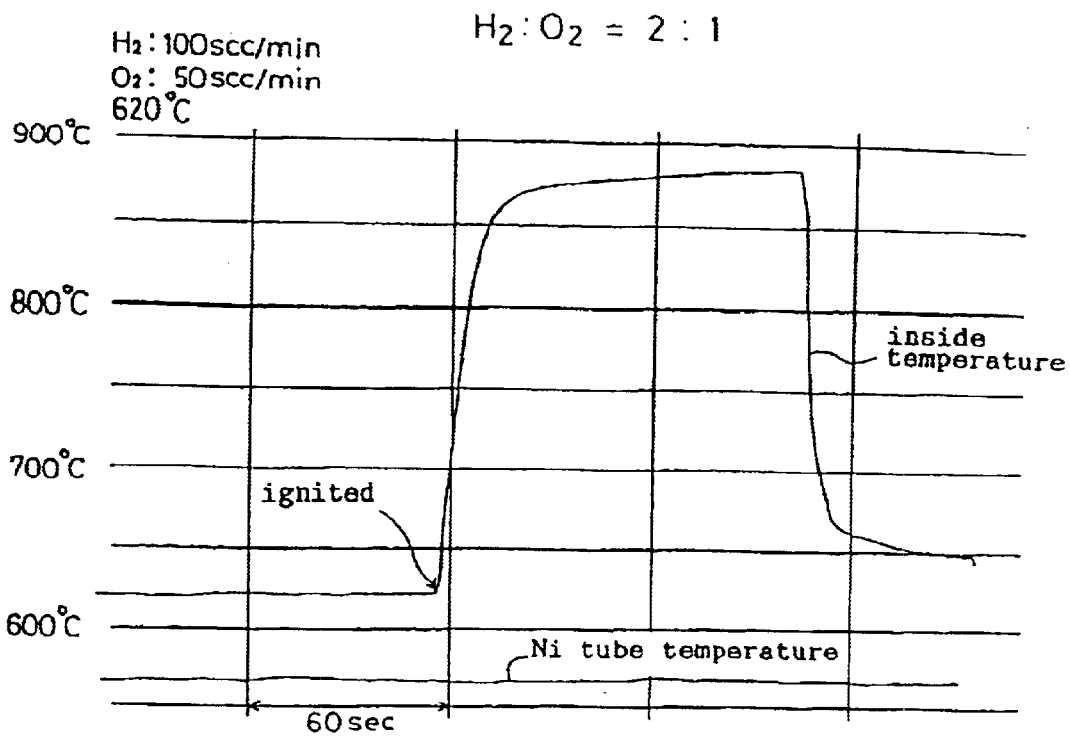
FIG. 29 is a graph showing ignition temperature (Test 5)
Figure 30:
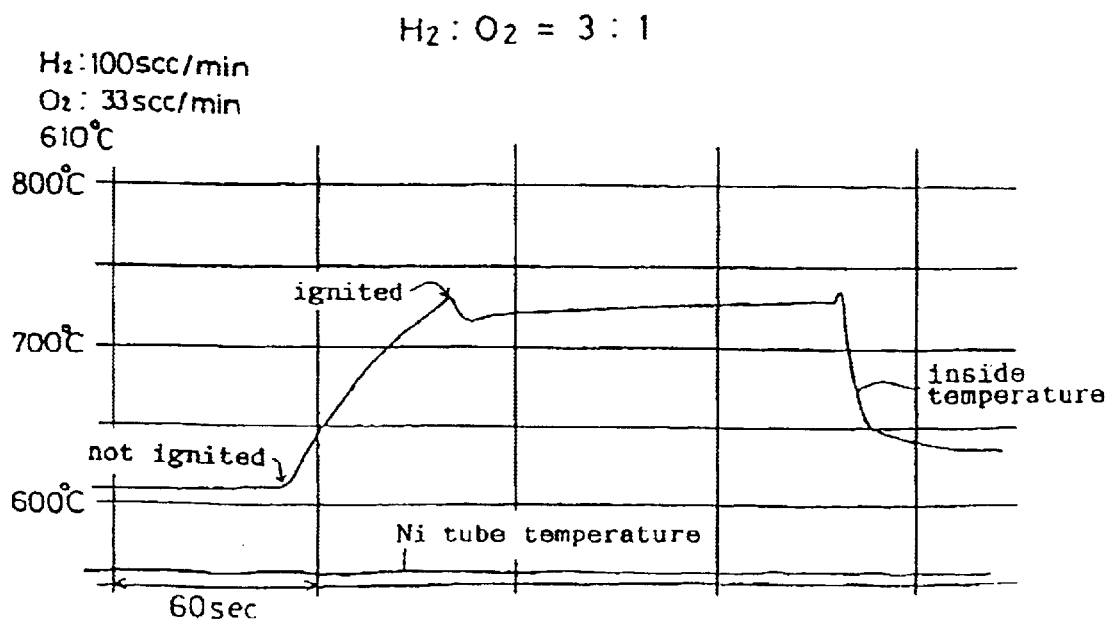
FIG. 30 is a graph showing ignition temperature (Test 5)
Figure 31:
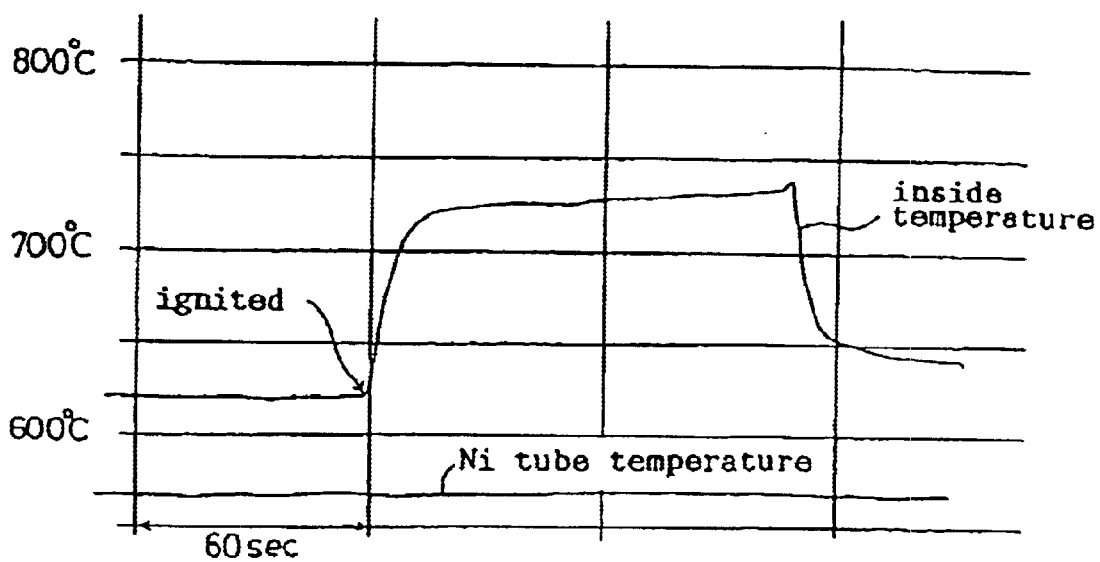
FIG. 31 is a graph showing ignition temperature (Test 5)
Figure 32:
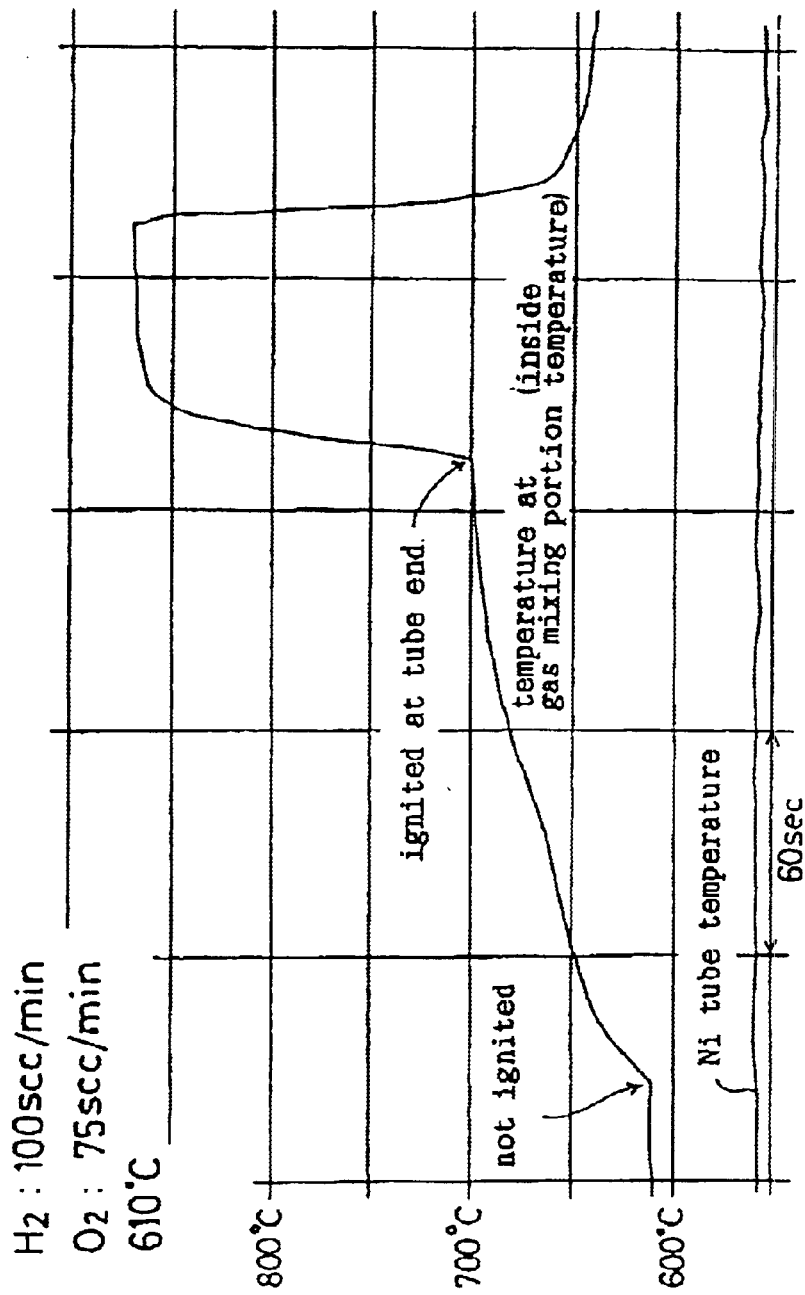
FIG. 32 is a graph showing ignition temperature (Test 5)
Figure 33:
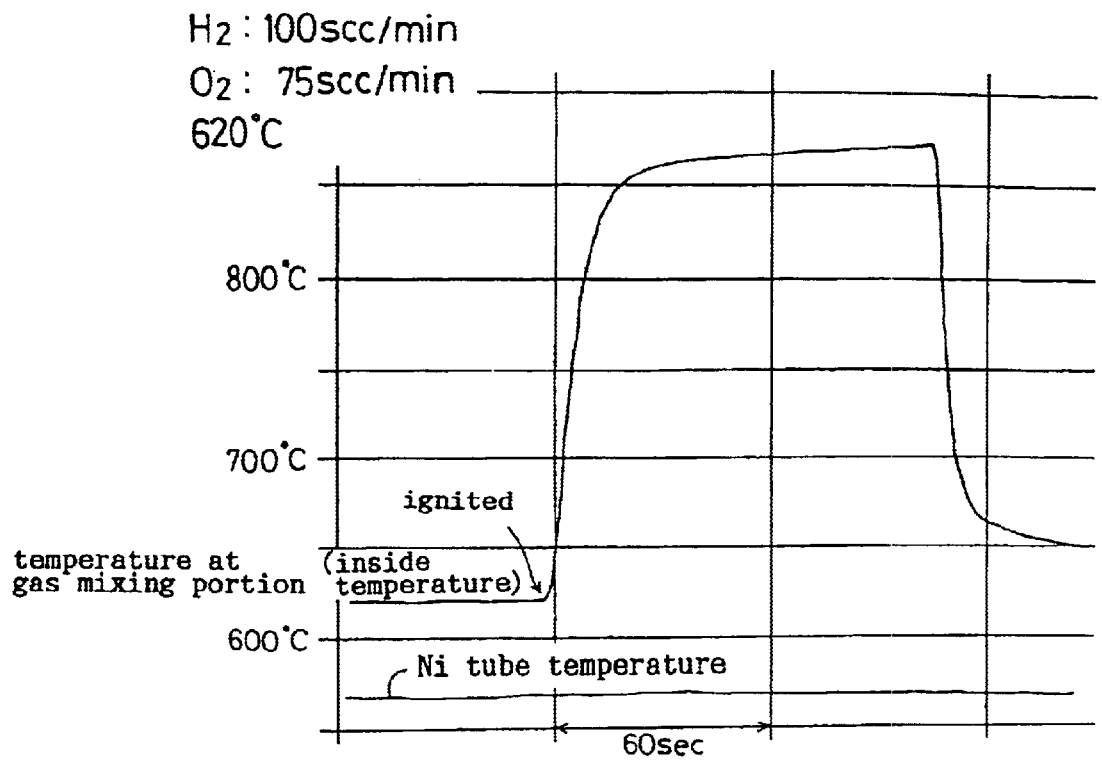
FIG. 33 is a graph showing ignition temperature (Test 5)

FIG. 27 shows simplified version of ignition temperature detection test equipment. Using this equipment, the mixture ratio of $O_2$ and $H_2$ supplied to the nickel tube was varied and the ignition temperature was investigated.

As is clear from FIGS. 28 through FIG. 33, it has been determined that when the $H_2$ and $O_2$ mixture ratio is 3:1, 2:1 or 4:3, ignition does not take place at 610° C. but ignition does take place at 620° C.

Consequently, with safety taken into account from a viewpoint of preventing explosions, it is desirable that the mixture temperature of the reactor 1 be set to nearly 600° C.

Because in the first and second water-generating reactors according to this invention, oxygen and hydrogen are only to be supplied directly to the inside of a reactor, high-purity water or a mixture gas of high-purity water and oxygen can be taken out, and at the same time, because the reactivity is higher than for conventional cases in which a diluting gas is supplied, still more downsizing of the reactor is possible, and this is in no way inferior, in terms of safety, to a known process of taking out an argon mixture gas.

Since the pipe, sintered material, thin sheet laminate, honeycomb body, mesh body, sponge body or fin-shape body are utilized as catalyst material, and the catalytic actions of the inner and outer surfaces are best used, the size of the equipment can be greatly reduced and, at the same time, the amount of water it is possible to generate is increased as compared to known similar types of the water-generating equipment,.

In addition, with the temperature control method of this invention, the reactivity (degree of catalytic action) at the inlet and outlet ends of the reactor, or the distribution of reaction amount in the longitudinal direction of the reactor, are varied to prevent generation of a large volume of reaction heat in the vicinity of the inlet end of the reactor, and an excessive temperature in the vicinity of the inlet end is thereby prevented. With this construction, localized temperature rise of the reactor can be prevented and safety can be markedly improved.

Furthermore, with the temperature control method of this invention, where the gas temperature in the vicinity of the inlet end of the reactor is held to 200–500° C. and the gas temperature in the vicinity of the outlet end to about 600° C. or lower, there is no fear of causing explosion, etc., while a required amount of high-purity water can be generated with high responsiveness.

Third and Fourth Water-generating Reactors

FIG. 34 through FIG. 45 show other embodiments of the third and the fourth water-generating reactors.

As a metal catalyst material that can activate the hydrogen or oxygen reactivity, platinum, nickel, stainless steel, etc. exist, and of all these, platinum provides excellent catalyst.

However, platinum is expensive and has a problem from the viewpoint of economy. In particular, when the reactor pipe in the reactor shown in FIG. 2 or FIG. 3 is made of platinum, there is the problem that the manufacturing cost of the reactor soars.

Consequently in the reactor of FIG. 2 or 3, the reactor pipe is made of nickel or stainless steel, or a method of using a platinum-plated nickel or stainless steel pipe as the reactor pipe is adopted, but when the nickel pipe and stainless steel pipe are used as the reactor pipe, the water generation amount per unit surface area of the reactor pipe is small, and there is a problem in that the size of the reactor must be significantly increased in order to produce water of about 1 L/min. or more.

For example, it has been demonstrated that when reactor pipe comprising a parallel combination of ¼"×280 mm×19 pieces of nickel piping (nickel surface area: about 1800 cm², reactor pipe inner volume: about 300 cm³, 2 pieces of ¼" straight pipe about 13 m long connected in series) (¼" straight pipe about 26 m long) is used to allow 100 cc/min. of $H_2$ and 56 cc/min. of $O_2$ to flow at 500° C., an upper limit of the usable water generation rate is about 100 cc/min. (Max.).

However, since in actual semiconductor manufacturing equipment, a water generation rate exceeding 1 liter/min. is generally required, a significantly large-size reactor is required to secure the required water generation rate.

When nickel pipe is used as the reaction pipe, a problem of oxide corrosion on the reaction pipe outer surface arises.

For example, when 50 cc/min. of $H_2$ and 27.5 cc/min. of $O_2$ are supplied to ¼"×200 mm nickel reactor pipe and water is generated for 5 hours at 500° C., it has been confirmed by SEM analysis that about 90% reactivity of water generation reaction can be obtained, but oxide scale about 0.5 $\mu$m thick is formed on the outer surface of the nickel reactor pipe.

On the other hand, when the temperature of the nickel reactor pipe is lowered to 350° C., formation of oxide scale on the reactor tube outer surface is reduced to a nearly negligible level, but reactivity of the water generation reaction conversely lowers from about 90% to 50–60%, and as a result, the water generation amount markedly decreases.

In this way, when nickel pipe is used as the reactor pipe, the upper limit of the reaction temperature is restricted to about 350° C. from a viewpoint of oxide scale generation, and, as a result, the reactor size must still be increased due to the decrease in water generation amount.

It has been confirmed that even if oxide scale forms on the nickel reactor pipe surface, the water generation ratio increases as temperature rises. However, when oxide scale is generated on the reactor pipe surface, contamination of the generated water results, and consequently, the reaction temperature of the reactor pipe must be held to about 350° C. or lower (Max.) as described before.

As described above, in order to permit an increase of the generated water volume while downsizing the water-generating reactor, it is essential to use platinum whose catalytic activity at low temperature is significantly higher than that of nickel, etc. as a catalyst in the form of a coating or plating layer.

Figure 34:
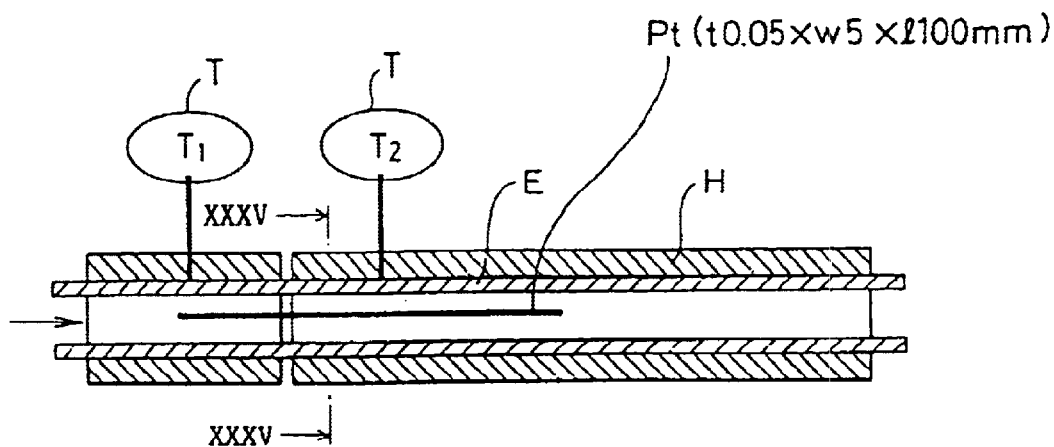
FIG. 34 is a longitudinal cross-sectional view of a test reactor using platinum foil as catalyst material.
Figure 35:
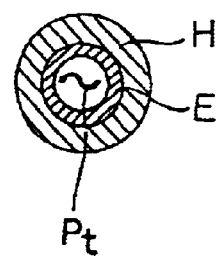
FIG. 35 is a cross-sectional view as seen on lines XXXV—XXXV of FIG. 34.

Therefore, to investigate platinum catalytic activity in more detail, reactor pipes as shown in FIGS. 34 and 35 were fabricated and water generating tests were carried out.

That is, in FIGS. 34 and 35, reference character E designates a Hastelloy pipe (¼", 200 mm in total length), H designates a heater, T designates thermometer, Pt a platinum foil catalyst (thickness: 0.05 mm; width: 5 mm; length: 100 mm), and platinum surface area 10 cm².

From the gas inlet end of the reactor pipe, $H_2$, $O_2$ and $N_2$ gases are allowed to flow at ratios shown in Table 3, and a reactivity at the reactor pipe outlet, as well as temperatures of the gas at the upstream end, $T_1$, and the downstream end, $T_2$, were measured, respectively.

In Table 3, numeral *1 designates the value just after the gas is passed and *2 designates the value obtained when temperature has risen by self heat generation after the gas is passed and reaction is stabilized.

TABLE 3

| Material | Gas flow rate (sccm) | | | | Temperature (° C.) | | Reactivity (%) |
|---|---|---|---|---|---|---|---|
| | H$_2$ | O$_2$ | N$_2$ | Heater | Upstream end | Downstream end | |
| Pt | 25 | 25 | 100 | *1 OFF | 21 | 25 | 3.8 |
| 99.98% | | | | *2 OFF | 172 | 72 | 94.7 |
| (10 cm$^2$) | | | | ON | 180 | 100 | 96.3 |
| | | | | ON | 193 | 150 | 99.7 |
| | | | | ON | 206 | 200 | 99.7 |
| | 25 | 25 | 100 | *2 OFF | 167 | 69 | 92.8 |
| | | | | ON | 203 | 200 | 99.7 |
| (t 0.05 | 50 | 50 | 200 | *2 OFF | 283 | 128 | 98.3 |
| x w 5 x L | | | | ON | 298 | 200 | 99.9 |
| 100 mm) | 50 | 50 | 200 | *2 OFF | 282 | 124 | 97.3 |
| | | | | ON | 297 | 200 | 99.5 |

The results of each of the above tests indicates that 1) platinum provides remarkable high catalytic activity as compared to nickel, 2) when gas is allowed to flow, even at room temperature, slight reaction occurs, and reactivity exceeding 90% can be obtained because of the temperature rise from the reaction heat, even without external heating, 3) when gas is allowed to flow without being diluted with N$_2$ gas, etc., the gas may be ignited even at room temperature, 4) most reaction takes place at a tip end portion of the Pt foil (gas inlet end) and the temperature reaches a considerably high level, 5) the tip end surface of the Pt foil changes by heating (SEM observation results), etc.

Figure 36:
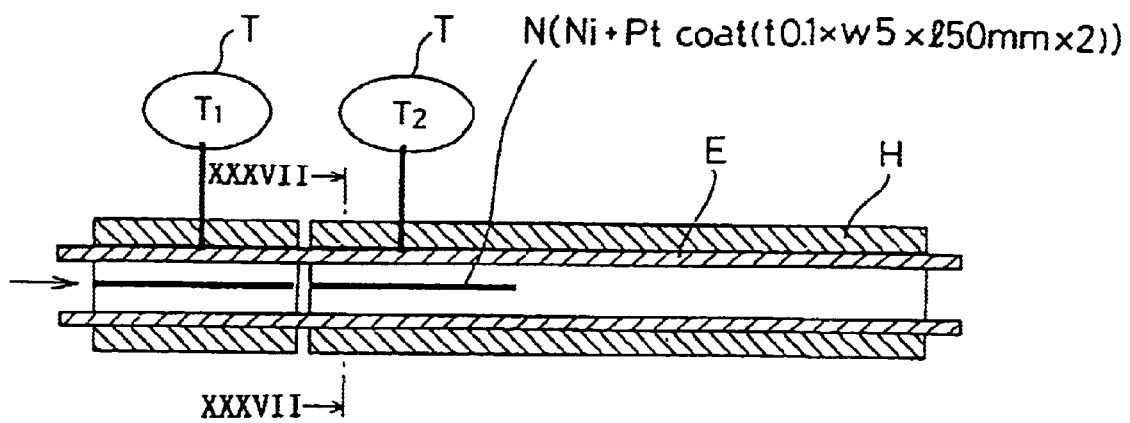
FIG. 36 is a longitudinal cross-sectional view of a test reactor using a platinum-plated-nickel thin sheet as catalyst material.
Figure 37:
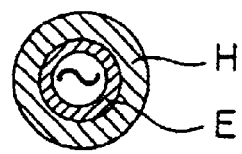
FIG. 37 is a cross-sectional view as seen on lines XXXVII—XXXVII of FIG. 36.

Then, in order to investigate the catalytic activity of the platinum coating layer, the inventors of this application carried out water generation tests by forming 300–400 Å platinum coating film on both outer surfaces of a Ni thin sheet (0.1 mm thick×5 mm wide×50 mm long, surface area: about 10 cm$^2$), using ion sputtering equipment. As is shown in FIGS. 36 and 37, a reactor is used which is constructed by inserting two pieces of Ni thin sheets N provided with the above mentioned Pt coating into a ¼" Hastelloy pipe about 200 mm long, wherein 50 cc/min. of H$_2$ and 50 cc/min. of O$_2$ and 200 cc/min. of N$_2$ were fed into the inside of the reactor pipe from one end.

Table 4 shows the results of this test.

In Table 4, numeral *1 is the value right after the gas was passed, numeral *2 the value obtained when the temperature has risen by self heat generation right after the gas was passed and reaction was stabilized, numeral *3 the value right after deterioration appeared in the platinum coating layer in the continuously gas feeding test, and numeral *4 the value tens of minutes after the deterioration appeared.

TABLE 4

| Material | Gas flow rate (cc/min.) | | | | Temperature (° C.) | | Reactivity (%) |
|---|---|---|---|---|---|---|---|
| | H$_2$ | O$_2$ | N$_2$ | Heater | Upstream end | Downstream end | |
| Pt | 25 | 25 | 100 | *2 OFF | 123 | 63 | 98.7 |
| coated on | | | | ON | 137 | 100 | 99.5 |
| Ni thin | | | | ON | 150 | 150 | 99.7 |
| sheet | | | | ON | 200 | 200 | 100 |
| (10 cm$^2$) | 25 | 25 | 100 | *2 OFF | 138 | 65 | 99.2 |
| Thickness | | | | ON | 152 | 100 | 99.2 |
| (300–400Å) | | | | ON | 165 | 150 | 99.5 |
| (t 0.1 | | | | ON | 200 | 200 | 100 |
| xw5 | 50 | 50 | 200 | *1 OFF | 29 | 30 | 5.5 |
| xL 50 mm | | | | *2 OFF | 208 | 130 | 98.0 |
| x2) | | | | *3 OFF | 190 | 174 | 98.0 |
| | | | | *4 OFF | 35 | 38 | 0 |

The results of the test confirmed that 1) even with a Ni thin sheet having a platinum coating, high catalytic activity of a level similar to that of platinum foil can be obtained, 2) even under O$_2$-rich condition, nearly 100% reactivity can be achieved, 3) when no diluting gas is present, even at room temperature, the mixture gas (H$_2$+O$_2$) is ignited, 4) due to rapid temperature rise, the Ni thin sheet having the Pt coating suddenly loses the catalytic activity, etc.

By analyzing the surface of the Pt coating film on the Ni thin sheet after catalytic activity is lost, causes of the sudden loss of catalytic activity of the Ni thin sheet with the Pt coating have been confirmed to be due to a temperature rise of the Ni thin sheet caused by reaction heat causing substrate metal (Ni) to diffuse into the Pt coating film, and this is oxidized in the Pt coating film by the oxidizing environment. As a result, when the platinum coating film is formed on the surface of the Ni thin sheet, as described above, there is a possibility of losing the catalytic activity, and therefore, the problem of its stability as a reactor remains.

First Embodiment of Third and Fourth Reactors

Referring again to the drawings, a first embodiment of the third and fourth water-generating reactors according to this invention will be described.

Figure 38:
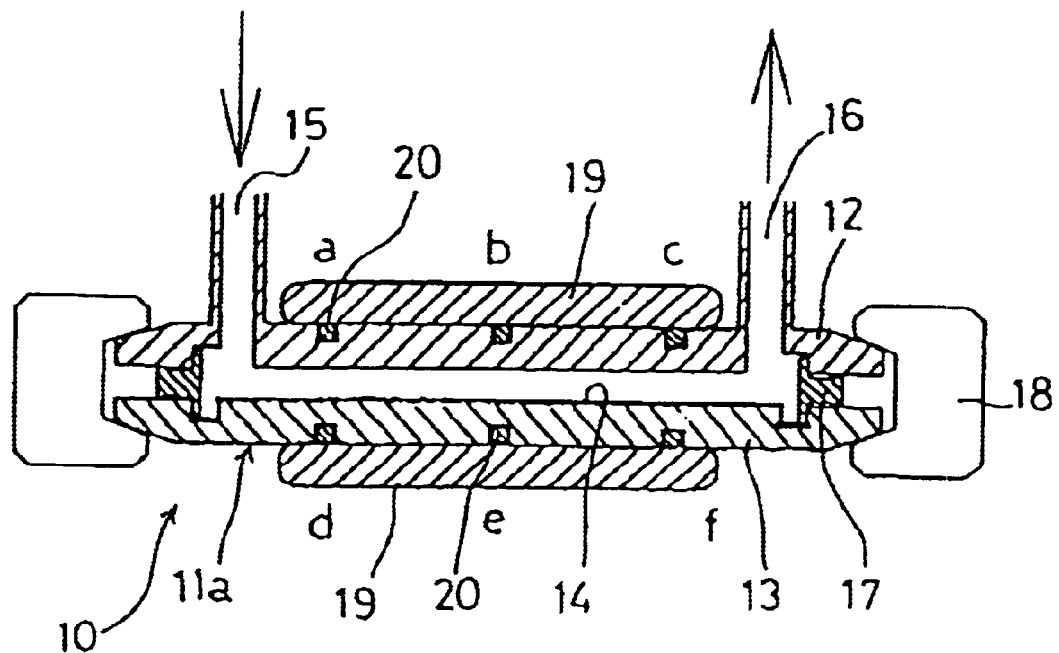
FIG. 38 is a longitudinal cross-sectional view showing a first embodiment of third and fourth water-generating reactors according to this invention.
Figure 39:
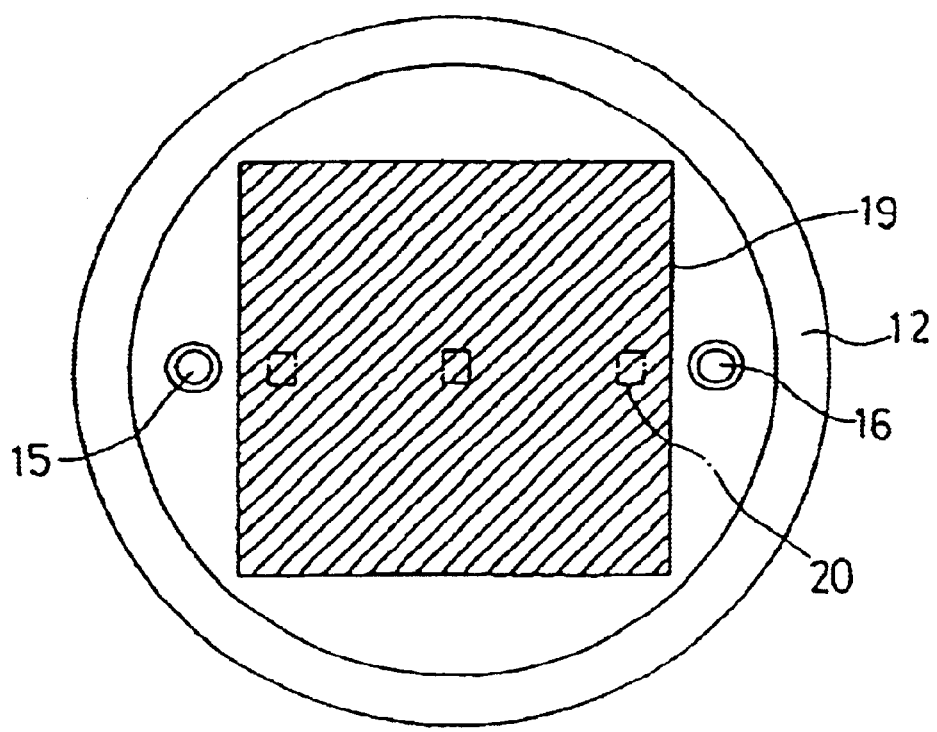
FIG. 39 is a plan view of the structure of FIG. 38.

FIG. 38 and FIG. 39 show the first embodiment of the third and the fourth water-generating reactors, and correspond to a 11th embodiment reactor, overall. In FIGS. 38 and 39, numeral 10 designates a reactor, numeral 11a a reactor body, numerals 12, 13 reactor-body members (flanges), numeral 14 platinum coating film, numeral 15 an inlet for raw material gas, numeral 16 a water and moisture gas outlet, numeral 17 a gasket, numeral 18 a clamp, numeral 19 a heater, and numeral 20 thermocouples.

The reactor 10 comprises two reactor body members (flanges) 12, 13 installed opposite to each other via the gasket 17 and air-tightly tightened and fixed by the clamp 18 with a specified space maintained between them. The reactor body members (flanges) 12, 13 are made of stainless steel (SUS304), heat-resistant metal material. The reactor body may be made of nonmetal material, such as quartz, ceramics, etc., as long as the members thereof are of heat-resistant materials.

The platinum coating film 14 is formed in a uniform thickness on an inner surface of one reactor body member (flange) 13 using an ion sputtering process, and the film thickness is selected to be 100–500 Å.

In addition, the inlet 15 and water and moisture gas outlet 16 are provided in the other reactor main member (flange) 12 on which no platinum coating film 14 is formed.

An aluminum gasket is used as the gasket 17, and a flat type electric heater is used as the heater 19.

In this first embodiment, the platinum coating film 14 is formed only on the inner surface of one of the reactor main members 13 and the inlet 15 and water-and-moisture-gas outlet 16 are provided in the other reactor main member 12 with no film 14 formed thereon; but the platinum coating film 14 may be formed on the inner surface of both reactor main members 12, 13 and the inlet 15 and water and moisture gas outlet 16 may be provided on both flanges.

In the first embodiment, the reactor 10 is formed by combining two pieces of reactor body member (flanges) 12, 13, but the reactor 10 may be formed in a shape of cylinder or rectangular tube on an inner surface of which the platinum coating film 14 may be provided.

In addition, in this first embodiment, the platinum coating film 14 is formed by the ion sputtering process, but the film may be formed by a plating process, vapor-deposition process, ion plating process, cladding process, or hot press process, or any suitable combination of these, and the metal material of the reactor proper which carries the film 14 may be a steel material other than stainless steel, such as an alloy steel of nickel, molybdenum, etc.

Furthermore, in this first embodiment, the platinum coating film 14 is designed to be formed directly on the surface of the metal material forming the reactor body by the ion sputtering process, but a barrier film comprising non-metal material may be formed in advance on the outer surface of the metal material and the platinum coating film may be formed on this barrier film.

By intermediately installing the barrier film of the non-metal material, it becomes possible to effectively prevent the substrate metal forming the reactor body from diffusing into the platinum coating film at high temperatures and, as a result, it becomes possible to effectively prevent deterioration of the catalytic activity of the coating film caused by oxidizing the diffused metal in the platinum coating film.

Examples of the non-metallic material forming the barrier film include TiN, TiC, TiCN, TiAlN, $Al_2O_3$, etc., which have been confirmed by tests to be desirable from a viewpoint of preventing deterioration of catalytic activities of the platinum coating film.

The thickness of the barrier film is satisfactory if it is in an order of 0.5–2.0 μm, and any barrier film forming method is acceptable, but an ion plating process or vapor deposition process is suitable.

For example, it has been confirmed by changes-of-water-reactivity-with-passage-of-time test results that when stainless steel (SUS304) is used as the metal material on which a TiN barrier film of 1.5 μm average thickness is formed by an ion plating process, and then, on this barrier film, a platinum plating film about 0.5 μm thick is formed by a vapor deposition process, changes of water reactivity with passage of time are markedly reduced as compared to a case without the barrier film.

Test Example 6

For testing, a reactor with reactor body members (flanges) 12, 13 with an effective inside diameter of 70 mmø, 4-mm space distance between both flanges 12, 13, 38.5 $cm^2$ Pt coating film area, about 250 Å film thickness, and about 16.8 $cm^3$ inner volume was constructed, and $H_2$ and $O_2$ were supplied from the gas inlet 15 into the inside of the reactor 10 at the flow rate shown in Table 1, and the temperature and reactivity of each portion were measured.

In this test example 6, the film thickness was designed to be about 250 Å but it has been confirmed by test results that if the film thickness were 10 Å or more, a specified reactivity (about 98% or more) can be obtained. In the case of a cladding process or hot press process, a comparatively thick film can be formed, but from the viewpoint of economy, an upper limit of the film thickness is selected to be around 0.5 mm.

TABLE 5

| Test No. | $H_2$ cc/min. | $O_2$ cc/min. | Temperature (° C.) Set | (3) | (4) | Time (min.) | Reactivity (%) |
|---|---|---|---|---|---|---|---|
| 1 | 50 | 50 | 120 | 112 | 124 | 30 | 99.55 |
| 2 | 250 | 250 | 120 | 125 | 214 | 30 | 99.75 |
| 3 | 480 | 480 | 120 | 201 | 356 | 120 | 99.58 |
| 4 | 50 | 50 | 120 | 113 | 124 | 30 | 98.03 |
| 5 | 480 | 480 | 120 | 200 | 355 | 120 | 99.55 |
| 6 | 50 | 50 | 120 | 113 | 124 | 30 | 95.24 |
| 7 | 50 | 50 | 200 | — | — | 30 | 98.67 |
| 8 | 50 | 50 | 250 | — | — | 30 | 99.32 |
| 9 | 50 | 50 | 120 | — | — | 30 | 94.92 |
| 10 | 480 | 480 | 120 | 201 | 354 | 120 | 99.27 |
| 11 | 50 | 50 | 120 | 113 | 124 | 30 | 93.91 |
| 12 | 480 | 480 | 120 | 200 | 353 | 120 | 99.15 |
| 13 | 50 | 50 | 120 | 113 | 124 | 30 | 94.15 |
| 14 | 480 | 480 | 120 | 202 | 354 | 600 | 99.30 |
| 15 | 50 | 50 | 120 | — | — | 30 | 94.10 |

Table 5 shows test conditions of test example 6 using a reactor according to the above-mentioned first embodiment and the test results thereof.

Figure 40:
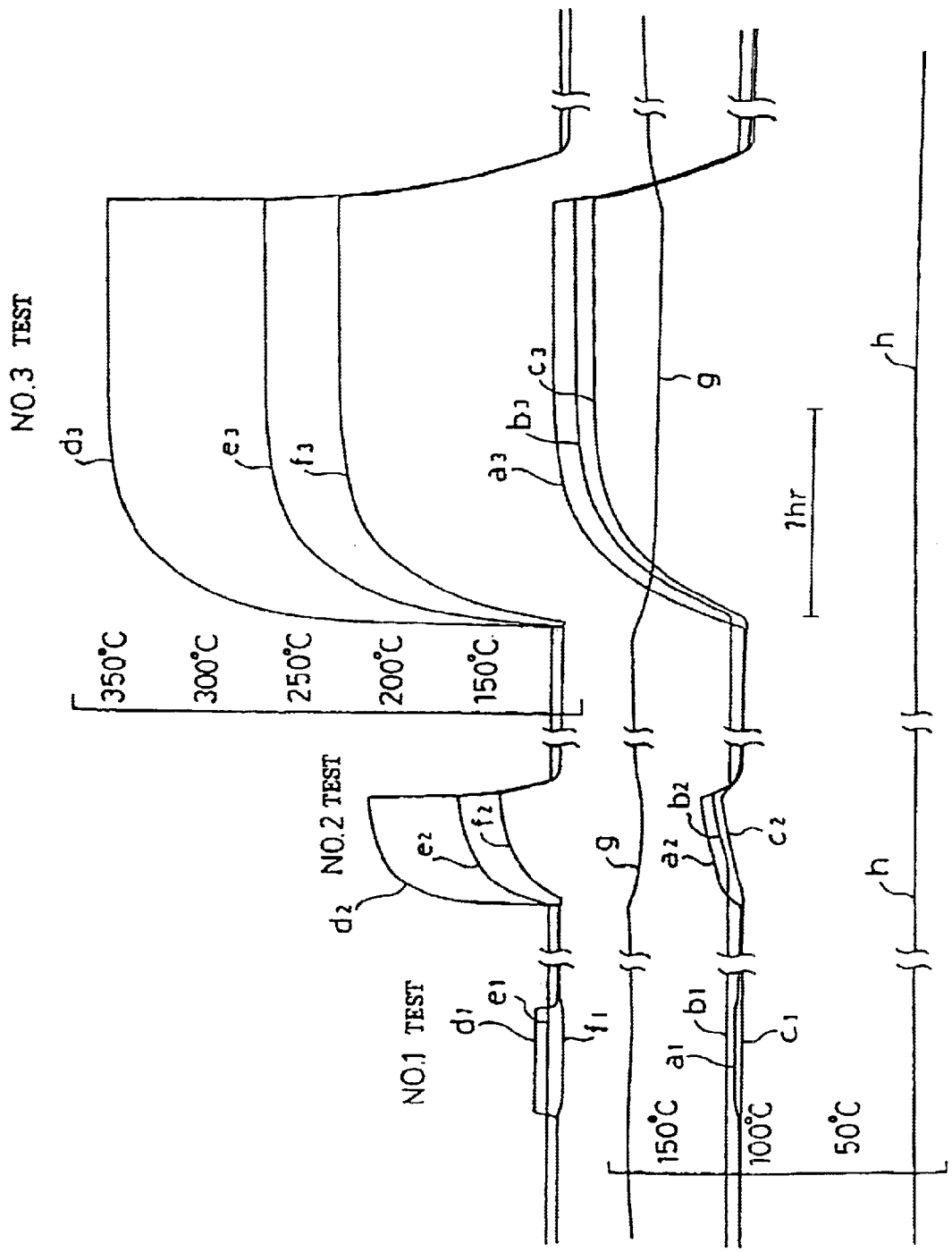
FIG. 40 is a diagram showing temperature of each portion of the reactor according to the first embodiment.

FIG. 40 shows temperature change of each temperature measuring portion in Test No. 1, Test No. 2, and Test No. 3 of Table 5.

That is, reference characters a, b, c show temperature changes of three thermocouples 20a, 20b, 20c mounted on the reactor body member (flange) 12 (without platinum coating film), and the results of No. 1 test are shown with $a_1$, $b_1$, $c_1$, the results of No. 2 test are shown with $a_2$, $b_2$, $c_2$, and the results of No. 3 test are shown with $a_3$, $b_3$, $c_3$, respectively.

The reference characters d, e, f show temperature changes of three thermocouples mounted on the reactor body member (flange) 13 (with platinum coating film), and $d_1$, $e_1$, $f_1$, show the results of No. 1 test, $d_2$, $e_2$, $f_2$, the results of No. 2 test, and d, e, f, the results of No. 3, respectively.

In addition, references character g shows temperature of the downstream-end piping of the reactor 10 and reference character h shows the gas temperature at the $H_2$ and $O_2$ mixing portion, and test results indicate that these two temperatures g, h scarcely change in any of No. 1 test, No. 2 test, and No. 3 test.

As is clear from FIG. 40, in No. 1 test ($H_2$: 50 cc/min.; $O_2$: 50 cc/min., reactor temperature adjusted at 120° C.) of Table 5, temperature $d_1$ of the gas inlet end portion of the reactor body member (flange) 12 provided with the Pt coating film 4 rose by about 10° C. due to the reaction heat generated, and the reactivity was 99.55%.

In No. 2 test (test was started with $H_2$: 250 cc/min.; $O_2$: 250 cc/min., and reactor temperature adjusted at 120° C. and the heater 19 was turned off midway), temperature $d_2$ of the gas inlet end portion of the reactor body member (flange) 13 rose by about 100° C. and at the same time, temperature of the other portions exceeded the initial adjusted temperature of 120° C. due to reaction heat generated, and the reactivity was 99.75%.

In addition, in No. 3 test (test was started with $H_2$: 480 cc/min.; $O_2$: 480 cc/min., and reactor temperature adjusted at 120° C. and the heater 19 was turned off midway), temperature at the gas inlet end portion of the reactor main member (flange) 13 exceeded 350° C. and the reactivity was 99.58%.

However, in all of No. 1 test to No. 3 test, gas temperature h at the $H_2$ and $O_2$ mixing portion was held at room temperature, suggesting that $H_2$ and $O_2$ are not reacted by ignition.

Figure 41:
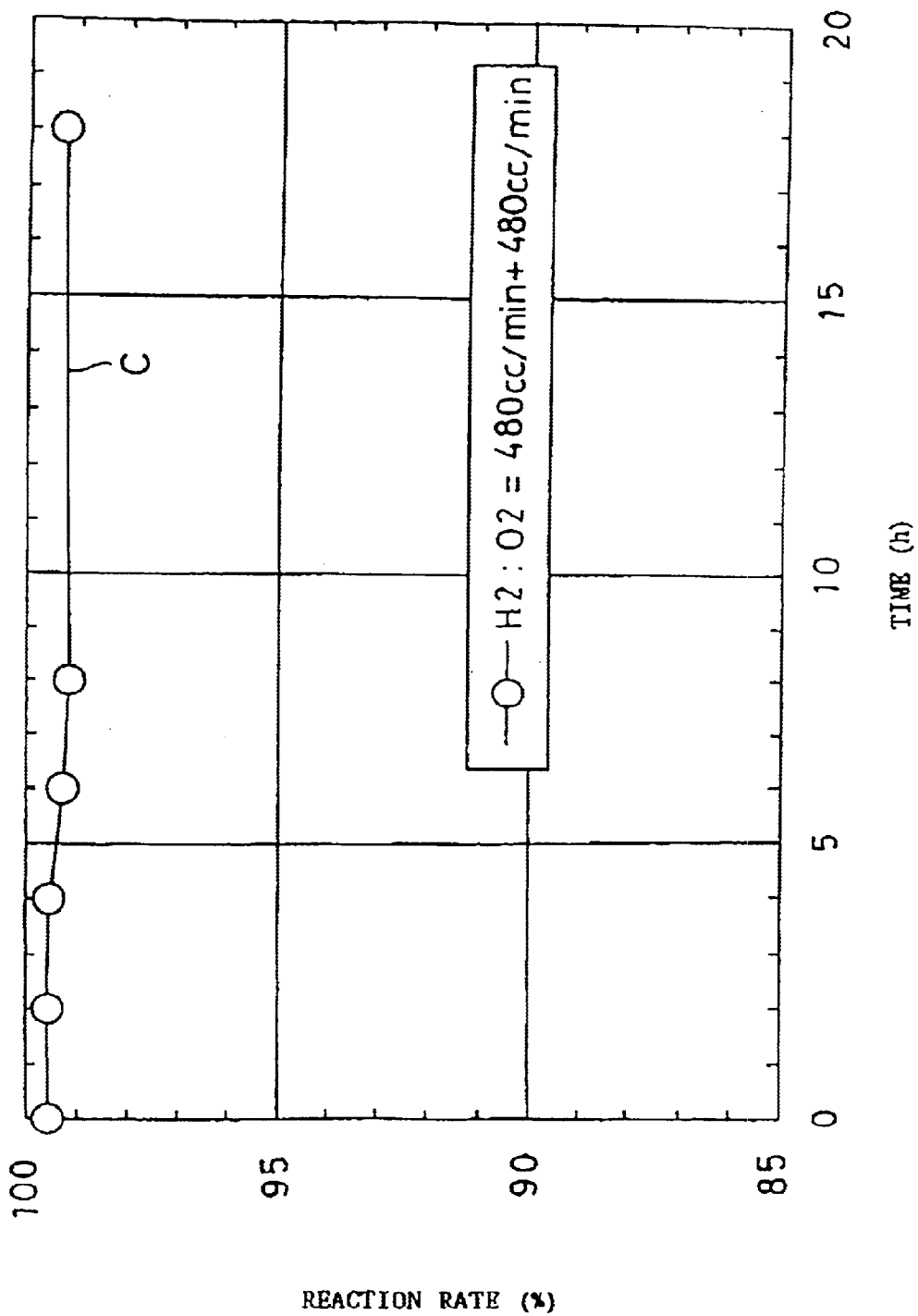
FIG. 41 is a diagram showing changes with passage of time in water generation reactivity in the reactor 1 of the first embodiment.

FIG. 41 shows a relationship between passage of time and reactivity as observed when the reactor 10 is used over a long period of time, and curve C shows the reactivity as observed when the reactor is used with $H_2$: 480 cc/min.; and $O_2$: 480 cc/min.

It indicates that when the reactor is used with $H_2$: 480 cc/min.; $O_2$: 480 cc/min., a lowering of reactivity is scarcely observed even after operation for 18 hours.

Figure 42:
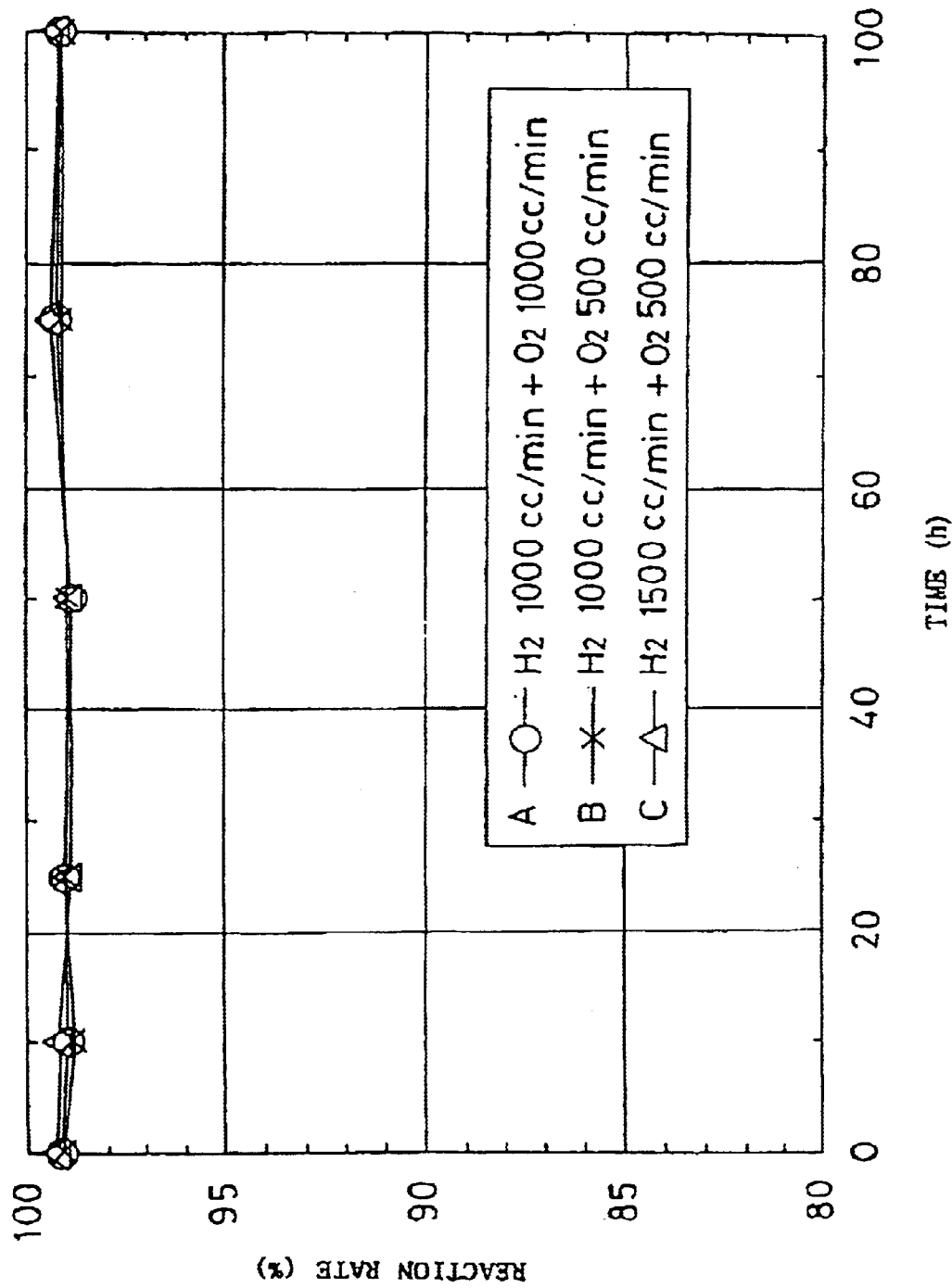
FIG. 42 is a diagram showing water generating responsiveness of the first embodiment.

FIG. 42 shows a relationship between passage of time and water generation reactivity as observed when the reactor is used with the reactor temperature held to about 400° C. and the reactor has operated as long as 100 hours, and the curve A shows the case of $H_2:O_2$=1000 cc/min.: 1000 cc/min., the curve B the case of $H_2:O_2$=1000 cc/min.: 500 cc/min., and the curve C the case of $H_2:O_2$=1500 cc/min.: 500 cc/min., respectively.

As is clear from FIG. 42, even if the material gas is so-called oxygen rich gas ($H_2/O_2<½$) or so called hydrogen-rich gas ($H_2O_2>½$), the water generation reactivity is always held nearly to a level of 99%, indicating that even after long operation for 100 hours, no deterioration of reactivity is confirmed.

Second Embodiment

Figure 43:
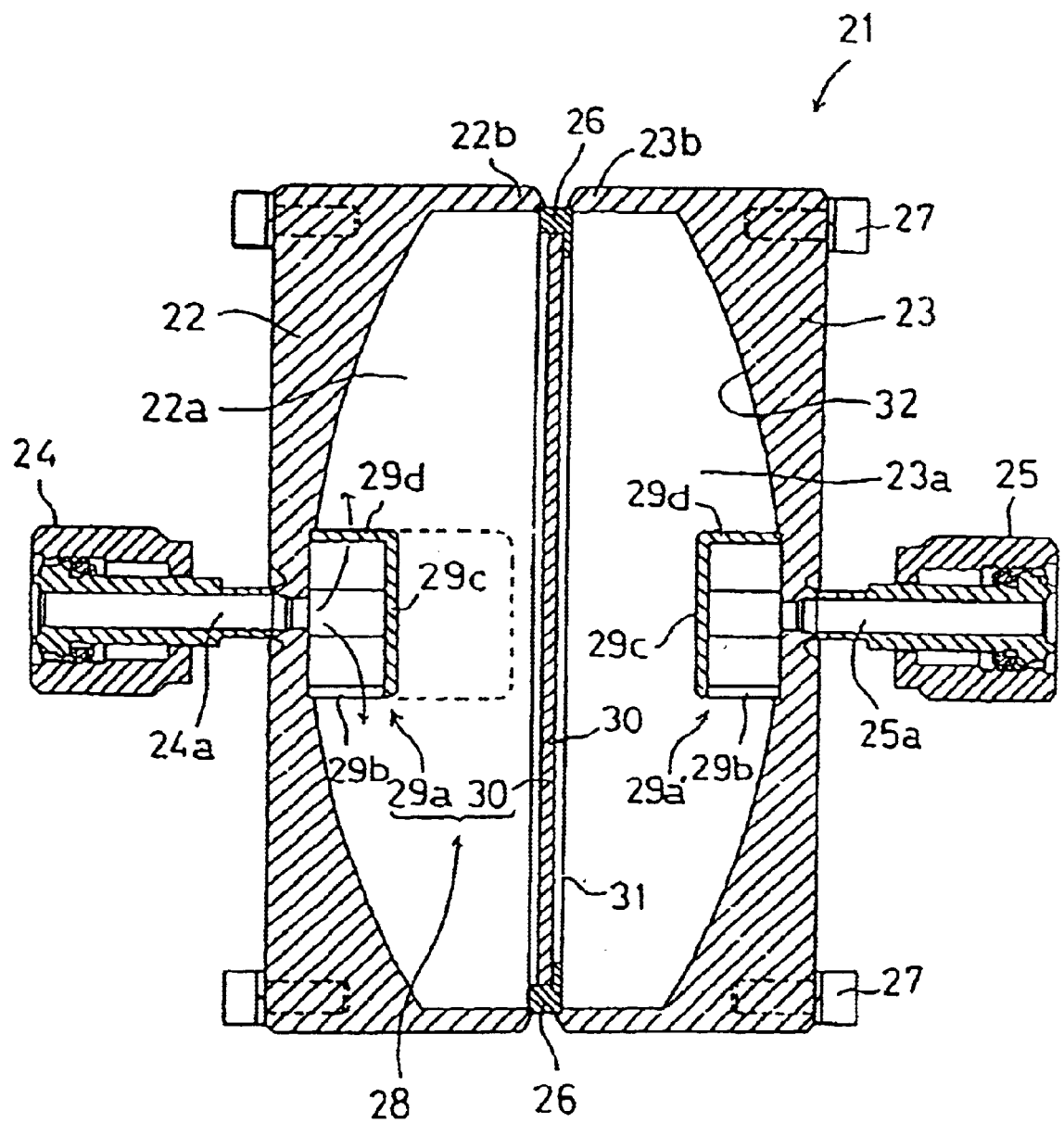
FIG. 43 is a schematic longitudinal cross-sectional view showing a second embodiment of the third and the fourth water-generating reactors according to this invention.

FIG. 43 shows a vertical cross-sectional view of a reactor related to a second embodiment of the third and the fourth water-generating reactors according to this invention, and corresponds to a 12th overall embodiment of a reactor of this invention. In FIG. 43, a reactor 21 is formed to have a short cylindrical form, and at the same time, a diffusing member 28 for diffusing a mixture gas is placed inside, thereby bringing gas in uniform contact with a platinum coating film 32, and with this configuration, localized temperature rises of the platinum coating film 32 and the base carrier member is designed to be prevented.

That is, in FIG. 43, numerals 21 designates the reactor, 22, 23 reactor body members, 24 a gas supply joint, 25 a water and moisture gas take-out joint, 26 a filter flange, 27 a reactor fixing bolt, 28 a gas diffusion member, 29a, 29a' reflector plates, 30 a filter, 31 a filter retainer, and 32 the platinum coating film. The reactor 21 is formed in a short cylindrical form by air-tightly linking the two stainless steel reactor main members 22, 23.

A recess 22a, whose bottom surface is spherical, is provided inside one of the reactor body member 22, and a gas passage 24a of the gas supply joint 24, which is mounted on a rear surface, is in free communication with the recess 22a.

A recess 23a, whose bottom surface is spherical, is provided inside the other rector body member 23, and a water and moisture gas passage 25a of the water and moisture gas take-out joint 25 mounted on a rear surface is in free communication with the recess 23a.

In addition, flanges 22b, 23b are respectively formed at the front surfaces of both reactor main members 22, 23, and the reactor 21 is fabricated by air-tightly welding and fixing the flanges 22b, 23b together via the filter flange 26,.

In this second embodiment, both flanges 22b, 23b are designed to be fixed by welding but both flanges 22b, 23b may be assembled and fixed separably by a clamp (illustration omitted) with a gasket installed intermediately (illustration omitted).

The gas diffusion member 28 comprises the reflector plate 29a, the filter 30, etc., and as shown in FIG. 43, it is placed in the recess 22a of the reactor proper member 22.

That is, the reflector plate 29a has a cylindrical form with a bottom, its whole surface is designed to be open, and it is fixed in a position opposite the material gas inlet on the bottom surface of the reactor body member 22. Similarly, the reflector plate 29a' is fixed at a position opposite a water and moisture gas outlet at the bottom surface of the reactor body member 23.

Gas injected in the reflector plate 29a through the gas passage 24a of the gas supply joint first collides against a reflector plate bottom surface 29c, and then is injected in an arrow direction through an open hole 29b provided on a peripheral wall 29d and diffused into the recess 22a, thereby uniformly passing through nearly a whole surface of the filter 30 and entering the recess 23a of the reactor body member 23.

The gas injected into the recess 23a uniformly collides against and comes in contact with a whole surface of the platinum coating film 32, and is thereby catalytically activated.

In addition, water and moisture gas formed in the recess 23a is guided out of the water and moisture gas passage 25a through the open hole 29b of the reflector of the reflector plate 29b.

In the embodiment of FIG. 43, the reflector plate 29a' is designed to be installed at a position opposite the water and moisture gas outlet, but the reflector plate 29a' may be omitted. However, by installing the reflector plate 29a', water generation reactivity can be improved by about 0.5–2.0%, and, in particular, it has been confirmed that in the case of hydrogen-rich reaction gas, the reflector plate 29a' achieves remarkable effects.

A stainless steel filter with average 2 μm mesh is used as the filter 30, and a plating layer of about 1 μm thick is used as the platinum coating film 32.

In this second embodiment, the bottom surface of the reactor body members 22, 23 are designed to be spherical, but one or both thereof may be formed as a plane(s).

Furthermore, it is also possible to increase a depth size of the reflector plate 29a as shown in the dotted line of FIG. 43 and thereby suppress a gas volume passing through a center portion of the filter 30.

In addition, in this embodiment a disk type filter 30 is used whose whole surface is designed to be penetrated by gas, but in place of this, a filter 30 which has a filter portion (gas penetrating portion) at a peripheral surface portion only, may be used. By constructing the filter in this manner the reflector plates 29a, 29a' can be omitted.

By installing the gas diffusion member 28 inside the reactor 21, the platinum coating film 32 is never locally heated by reaction heat, and water generation can be conducted with nearly the whole area of the platinum coating film 32, maintaining it at about 500° C., and it has been verified that a specified amount of water can be generated safely and continuously under high water generating reactivity and responsiveness conditions.

Figure 44:
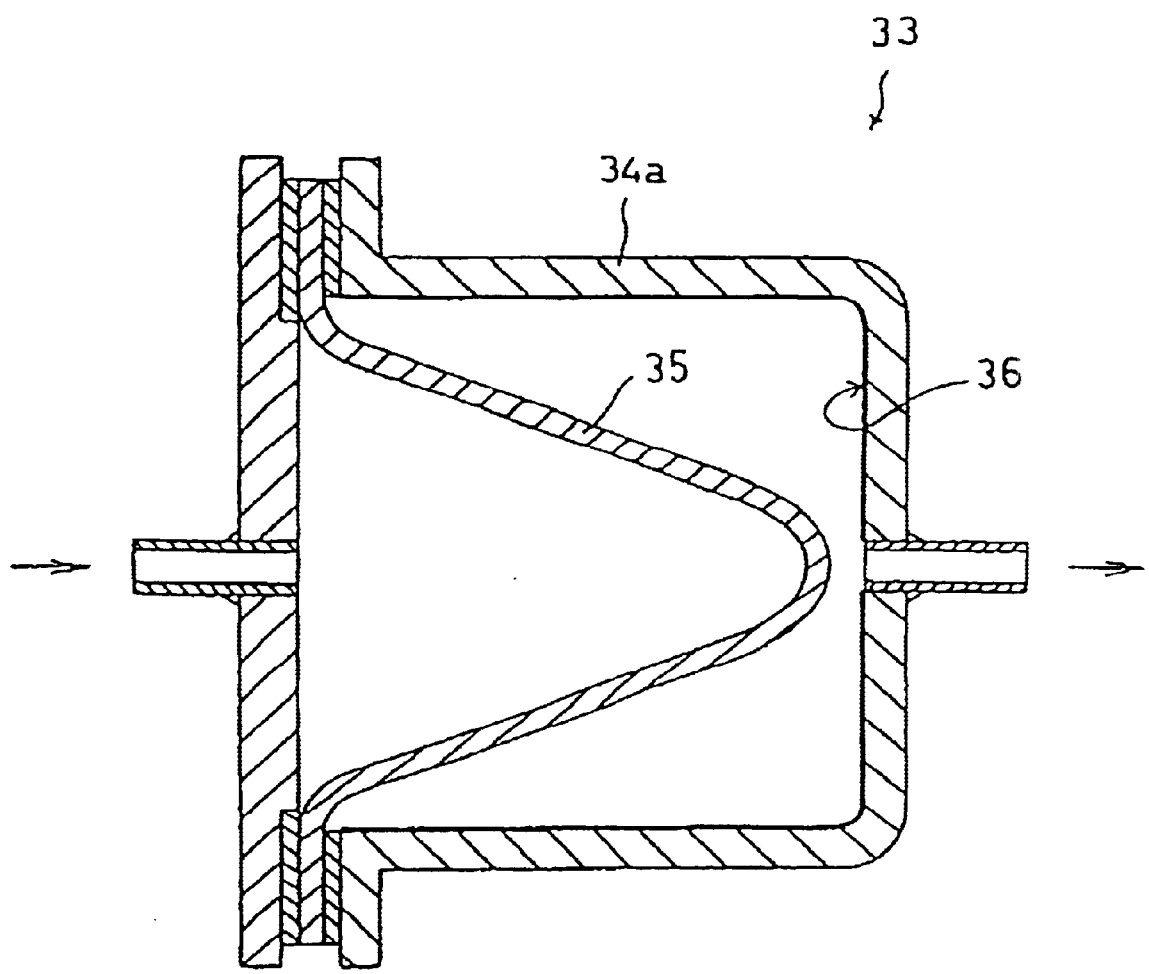
FIG. 44 is a schematic longitudinal cross-sectional view showing a third embodiment of the third and fourth water-generating reactors according to this invention.

FIG. 44 shows a third embodiment of the third and fourth water-generating reactors according to this invention, which corresponds to a 13th embodiment of the water-generating reactor. In FIG. 44, a conical filter 35 is inserted into a reactor body member 34a forming a reactor 33, and at the same time, a platinum coating film 36 is formed over nearly a whole area of an inner surface of the reactor body member 34a.

With the reactor 33 depicted in FIG. 44, it has been verified that, as with the embodiment of FIG. 43, a specified amount (about 1 liter/min. or more) of water can be stably generated under high reactivity and responsiveness conditions without causing local overheating of the platinum coating film 36.

Regarding the filter 35 of FIG. 44, by making a center bottom portion thereof, opposite a water and moisture gas outlet, to be a non-gas penetrating portion, it is possible to further reduce an amount of unreacted gas and an improvement of water generation reactivity is possible.

Figure 45:
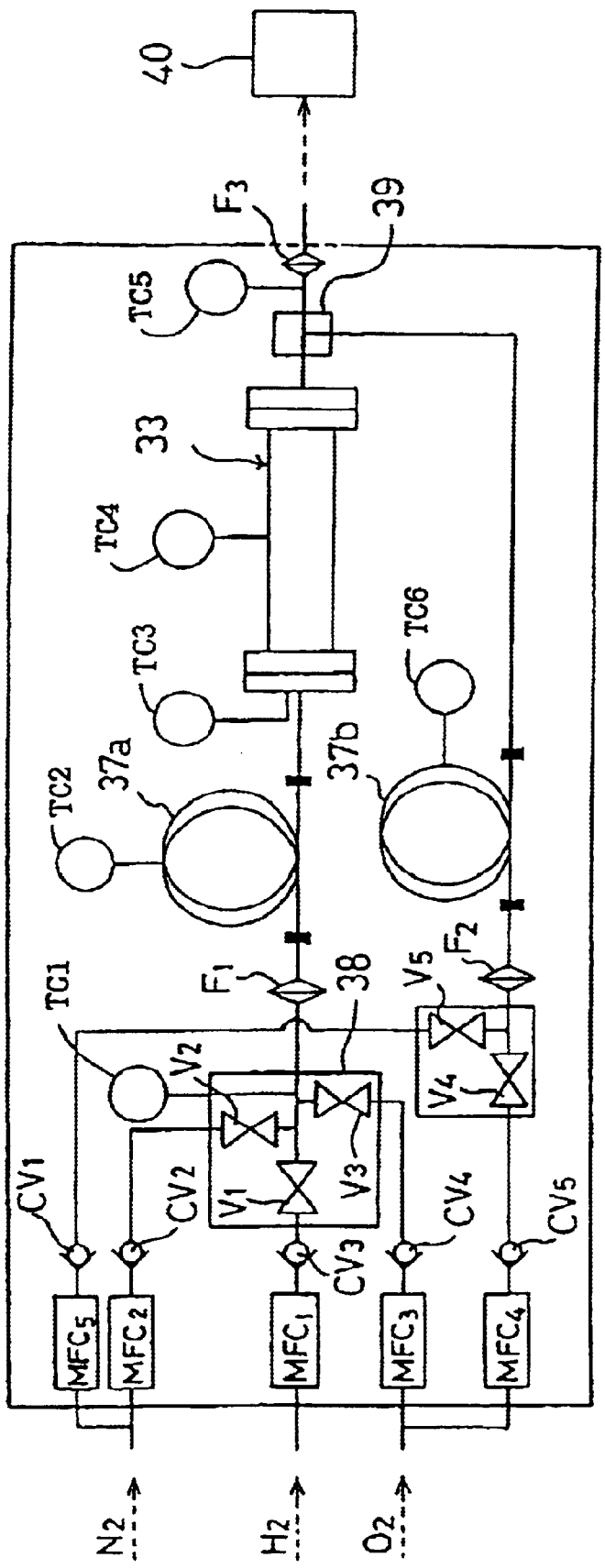
FIG. 45 is an illustration of water-generating equipment using the third and fourth water-generating reactors.

FIG. 45 shows a system outline of water-generating equipment using the third and fourth water-generating reactors according to this invention. In FIG. 45, $H_2$ designates hydrogen gas, $O_2$ oxygen gas, $N_2$ nitrogen gas for purge, MFC1–MFC5 mass flow controllers, $V_1$–$V_5$ valves, TC1–TC6 temperature measuring thermocouples, $CV_1$–$CV_5$ check valves, $F_1$–$F_3$ filters, 37a, 37b gas preheating coils, 38 an $O_2$ and $H_2$ mixing portion, 39 an $O_2$ and water mixing portion, and 40 a semiconductor manufacturing equipment.

Hydrogen gas $H_2$ and oxygen gas $O_2$ supplied to the reactor 33 are set to either 2:1 or 2:2, and, in general, an $O_2$-rich mixture gas is supplied to the reactor 13.

An $O_2$ and $H_2$ supply gas pressure is selected to be about 1.1–1.05 $kg/cm^2$ with a flow rate of $O_2$=about 1000 cc/min., $H_2$=about 1000 cc/min., respectively, and with 1000 cc/min. of water being generated.

The gas preheating coils 37a, 37b are installed to heat the mixture gas or $O_2$ gas to an optional temperature of about 200° C. or lower, but when the mixture gas is room temperature, the gas preheating coil 37a is in general set in a non-operating state.

The reactor 33 is equipped with a heater and, where necessary, cooling equipment, during operation of the reactor 33, the temperature being controlled to not allow reactor heat to heat the reactor 33 to over 500° C. by adjusting the supply rates (water generation rate) of $O_2$ and $H_2$ or by operating the cooling equipment.

In addition, a temperature of an oxygen and water mixture in the oxygen ($O_2$) and water mixing portion 39 mounted in a vicinity of an outlet end of the reactor 33, is maintained constantly at about 120° C. to prevent dew condensation of $H_2O$ on a pipe wall, and a heater is equipped as is required.

In this water-generating equipment, the reaction gas is brought to the oxygen rich condition, but, as shown in the curve C of FIG. 42, needless to say, it may be a reaction gas in a hydrogen-rich condition. For example, when forming a silicon oxide film ($SiO_2$) or other films, reducing gas can produce higher quality film.

In FIG. 45, hydrogen and oxygen are to be supplied to the reactor 33 in gaseous form, but liquefied hydrogen and liquefied oxygen may be supplied instead.

Furthermore, in the water-generating equipment of FIG. 45, hydrogen and oxygen are premixed at the mixing portion 38 and then supplied to the reactor 33, but hydrogen gas and oxygen gas may be independently supplied the reactor 33, and mixed in the reactor 33.

In addition, in the water-generating equipment, $O_2$ is mixed with moisture. But, in addition to $O_2$, $H_2$ or an inert gas may be used as a diluting gas for adjusting oxidation and reduction power, or $N_2O$ may be used for improving interface characteristics of Si and $SiO_2$.

Using the water-generating equipment of FIG. 45, gas consisting of 1000 cc/min. of $O_2$ and 1000 cc/min. of $H_2$ were supplied and 1000 cc/min. water was continuously generated for about 20 hours, and at the same time, impurity of the generated water and deterioration of the Pt coating film of the reactor were investigated.

The impurity in the generated water was analyzed by a flameless atomic absorption analysis, but the impurity components were all in an order of ng/m liter or less, and no impurity component that would cause a problem was detected.

The Pt coated film was inspected by SEM observation, and there were partly discolored portions but peeling off of the Pt coating film or excessive change in quality caused by oxidation, etc. was hardly observed.

In addition, it has been proven that reactivity tends to be slightly lowered with passage of time as shown in FIG. 41, but since it is maintained at a value higher than about 95%, a practical amount of water generation can be obtained even in $O_2$ rich conditions.

In the third and the fourth water-generating reactors of this invention, the platinum coating films are formed on surfaces of inner walls of reactor bodies forming the reactors for contacting and activating the $O_2$ and $H_2$ gas.

As a result, a platinum consumption rate decreases as compared that of a conventional reactor using platinum foil, platinum pipe or nickel pipe with platinum plating as the catalyst material. Also, construction of the reactors themselves can be simplified, manufacturing costs can be reduced, and, at the same time, the reactor bodies can be greatly downsized, as compared to conventional reactors which use nickel, etc. as the reaction material.

In addition, because a gas diffusing device is installed inside each reactor body, the platinum coating film, the catalyst material, is not locally heated.

As a result, peeling of the platinum coating film, or surface degradation due to oxidation, etc., can be effectively prevented while stable water generation can be continuously carried out under high reactivity and high responsiveness conditions.

Furthermore, backfire-prevention functions are provided by the filter forming the gas diffusion member, so that, for example, even if the mixture gas of $H_2O_2$=2:1 fills the rector under atmospheric pressure and the mixture gas is ignited at the downstream end (secondary end), a flame does not propagate to the upstream end (primary end).

As a result, when the filter is used as a gas diffusion member, explosion prevention is greatly improved in the reactor.

As described above, the rector for the third and the fourth water-generating equipment of this invention can supply mixture gas directly to the reactor inside, without requiring preheating of the mixture gas, by utilizing the high catalyst characteristics of platinum, and even if oxygen-rich or hydrogen-rich mixture gas is used, a practical water generation amount of 1000 cc/min. or more can be easily be obtained safely with a comparatively compact reactor body, and excellent practical effects can be achieved.

Process for Forming Platinum Coating Catalyst Layer in Water-generating Reactor

The water-generating reactor of FIG. 43 has excellent effects as follows: (1) an amount of platinum used is reduced, costs for manufacturing the reactor are lowered, and construction of the reactor is simplified as compared to reactors using platinum foil or platinum pipe, platinum plated nickel pipe, etc. as catalytic materials, and (2) by making best use of the high catalytic characteristics of platinum, the mixture gas can be supplied directly into the reactor without preheating and even with an oxygen rich or hydrogen rich mixture gas, water in an amount required for practical application, exceeding 1 liter/min., can be safely generated.

However, when the platinum coating film is directly formed on a metallic substrate, the platinum coating film sometimes suddenly loses catalytic activity when water generating is carried out over a long time.

That is, upon feeding $H_2$ and $O_2$, even at room temperature, the mixture gas ($H_2+O_2$) reacts and water is generated, but when water generation takes place continuously over a long time, the platinum coating film sometimes losses the catalytic activity.

Figure 46:
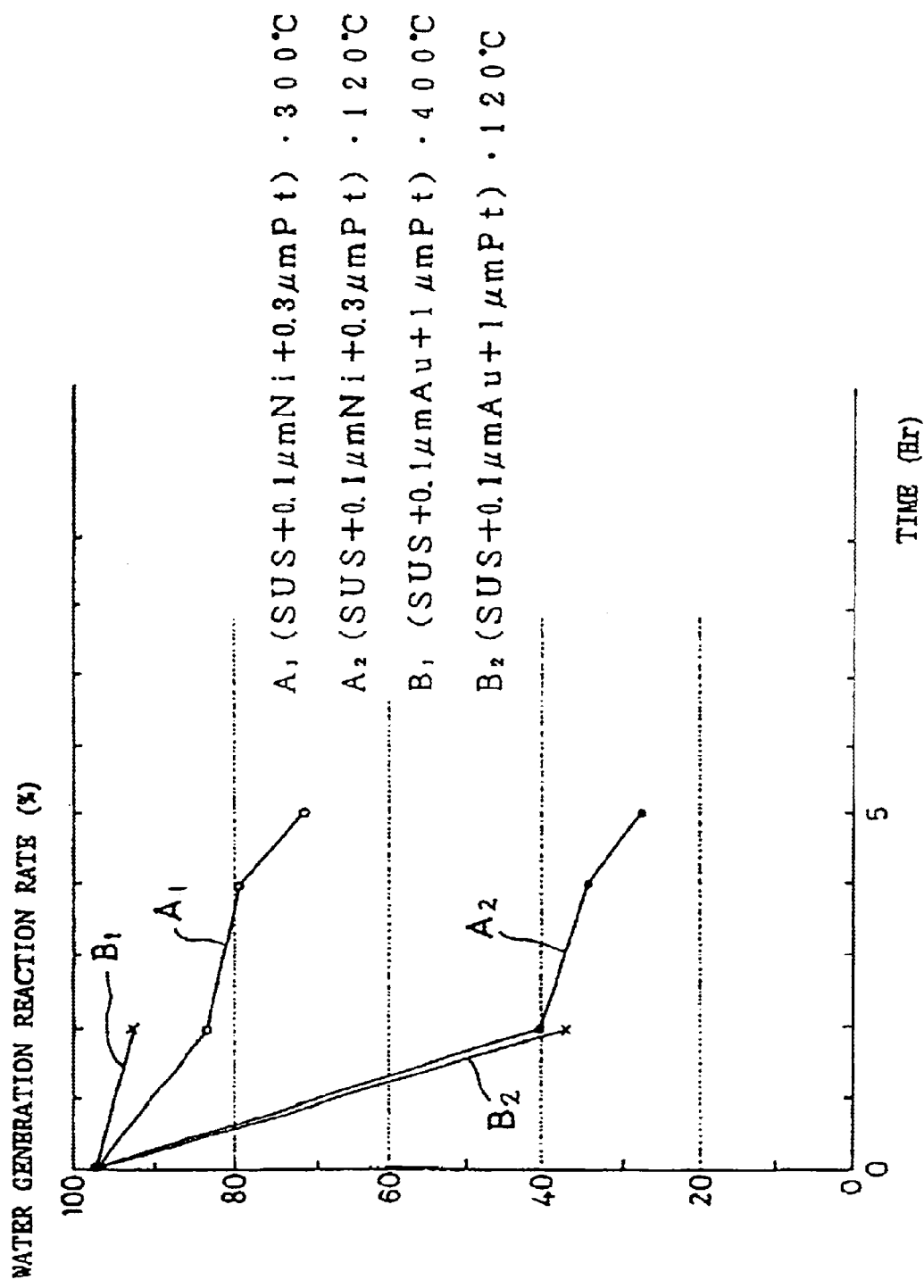
FIG. 46 shows changes with passage of time in water generation responsiveness in a water-generating reactor having a conventional platinum coated film.

FIG. 46 shows a condition of loss of catalytic activity in which platinum coating films are formed by the following processes (A) and (B) using a reactor of the construction of FIG. 38, with the catalytic activity being lost when the reactor is continuously operated for a long time.

(A): After the inner surface of stainless steel which forms the reactor is polished and cleaned to remove a passive-state film, a Ni film of about 0.1 $\mu$m thick is formed by plating, and a platinum film about 0.3 $\mu$m thick is formed by plating on this Ni film.

(B): After the inner surface of stainless steel which forms the reactor is polished and cleaned to remove the passive state film, an Au film about 0.1 $\mu$m thick is formed by plating, and a platinum coating film about 1 $\mu$m thick is formed by plating on this Au film,.

In FIG. 46, curve $A_1$ shows changes of a reaction rate of $H_2$ and $O_2$ with passage of time when sample A is used at 300° C., while curve $A_2$ shows changes of reaction rate with time when the sample A temperature is lowered from 300° C. to 120° C.

Similarly, in FIG. 46, curve $B_1$ shows changes of a reaction rate of $H_2$ and $O_2$ with time when sample B is used at 400° C., while curve $B_2$ shows changes of reaction rate with time when the sample B temperature is lowered from 400° C. to 120° C.

Test conditions, such as dimensions of the reactor, amounts of $H_2$ and $O_2$ supplied to the reactor, etc., are the same in each test.

As is clear from FIG. 46, in sample A, when at the 300° C. temperature, the reaction rate, which is about 98% at the beginning, lowers to a level of about 70% after it is used for 5 hours (curve $A_1$).

When the reaction ratio is measured with the temperature lowered from 300° C. to 120° C., the lowering of the reaction rate is more emphasized, as is shown in curve $A_2$ and the reaction rate, which is about 98% at the beginning, lowers to about 28% after 5 hours (curve $A_2$).

Similarly, for sample B, when carried out at 400° C., the reaction rate, which is about 98% at the beginning, lowers to about 93% after it is used for 2 hours (curve $B_1$); and when the temperature is lowered from 400° C. to 120° C., the reaction rate is about 38% (curve $B_2$).

The inventors conducted an XPS analysis on the stainless steel inner surface after water was generated with the sample A (0.1 $\mu$mNi+0.3 $\mu$mPT) and sample B (0.1 $\mu$mAu–0.3 $\mu$mPt) for 3 hours at 400° C., under the same $O_2$ and $H_2$ supply conditions in order to investigate the causes of the falling catalytic activity (that is, falling reaction rate) of the platinum coating film as described above.

Figure 47:
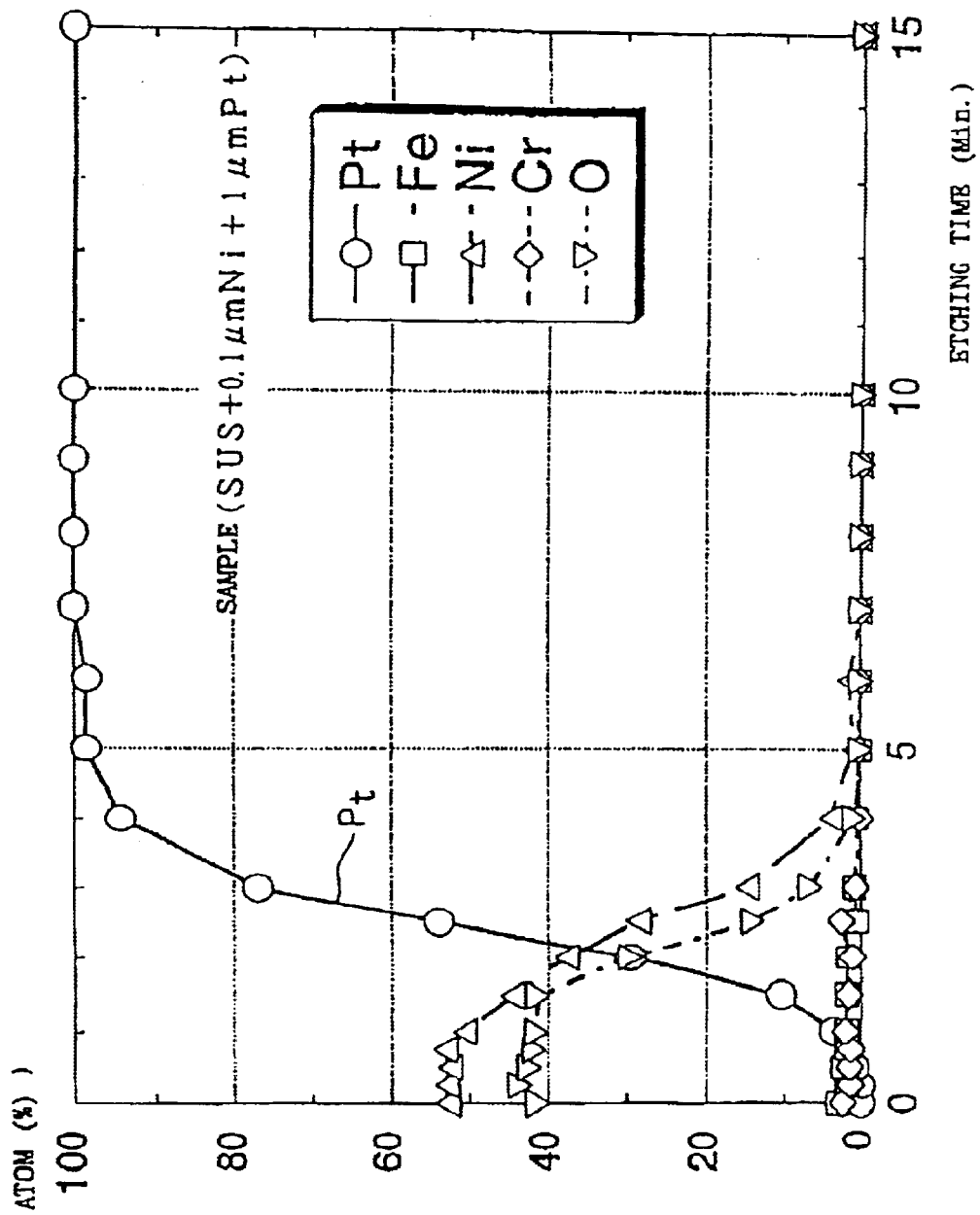
FIG. 47 shows XPS analysis results of a platinum coated film surface after use in a conventional reactor.
Figure 48:
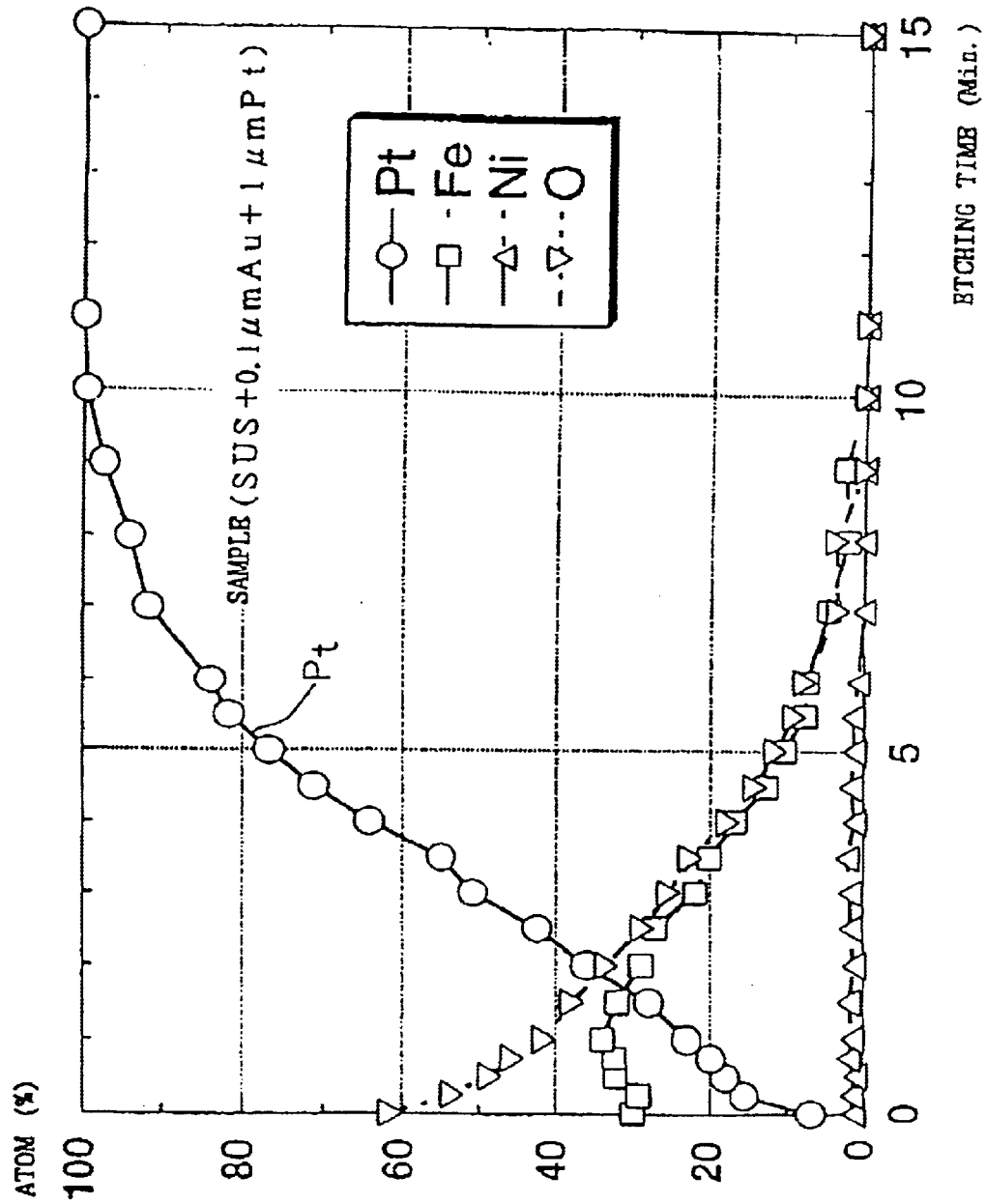
FIG. 48 shows XPS analysis results of another platinum coated film surface after use in the conventional reactor.

FIG. 47 shows XPS analysis results of the external surface of sample A, and FIG. 48 XPS analysis results of the external surface of sample B, respectively.

In FIG. 47 and FIG. 48, the abscissa is expressed in etching time, with 1 minute of etching time corresponding to a film thickness of about 60–70 Å.

As is clear from FIG. 48, in the case of sample B, Fe and O exist in large amounts in the surface layer portion of the coating film on the stainless steel surface after it is used for 3 hours, and the existing amount of Pt is extremely small (about 5%). That is, it is indicated that since the external surface layer portion of the coating film is occupied by iron oxides such as FeO, etc., and the Pt component is decreased, the lowering of the reaction rate results.

Similarly, as clear from FIG. 47, in the case of sample A, it is suggested that the surface layer portion of the coating film on the stainless steel inner surface after it is used for 3 hours is occupied by Ni and O, and the Pt component is nearly zero.

That is, the results displayed in FIG. 47 and FIG. 48 indicate that because of the temperature rise of the substrate stainless steel or Ni film caused by the reaction heat when water is generated, Ni or Fe is diffused in the platinum coating film from the substrate metal, and this is oxidized in the platinum coating film by the oxidizing environment, which is a main cause of loss of catalytic activity of the platinum coating film.

The test results of FIG. 47 and FIG. 48 indicate that a material which does not contain any Ni or Fe component and which does not generate oxides in the platinum coating film is best suited as a substrate film (barrier film) to be formed on the stainless steel surface.

Therefore, the inventors of this invention have reached the conclusion that the high catalytic activity of platinum coating film can be maintained over a long period of time even at a high temperature by using a film which superbly functions to prevent metal diffusion caused by heat as a barrier film intermediately installed between the stainless steel and the platinum coating film.

Based on the above-mentioned conclusion, the inventors of this invention have formed platinum coating catalysts layer as combinations of barrier films of various materials and platinum coating films on inner surfaces of stainless-steel water-generating reactors, and at the same time, have carried out water generating tests using each platinum coating catalyst layer and investigated changes of the water generation reaction rates (catalytic activity) occurring with time.

This invention of a process of forming platinum coating catalysts layers of water-generating reactors is based on the above-mentioned investigation results.

Embodiments of the Process for Forming Platinum Coating Catalytic Layers

Figure 49:
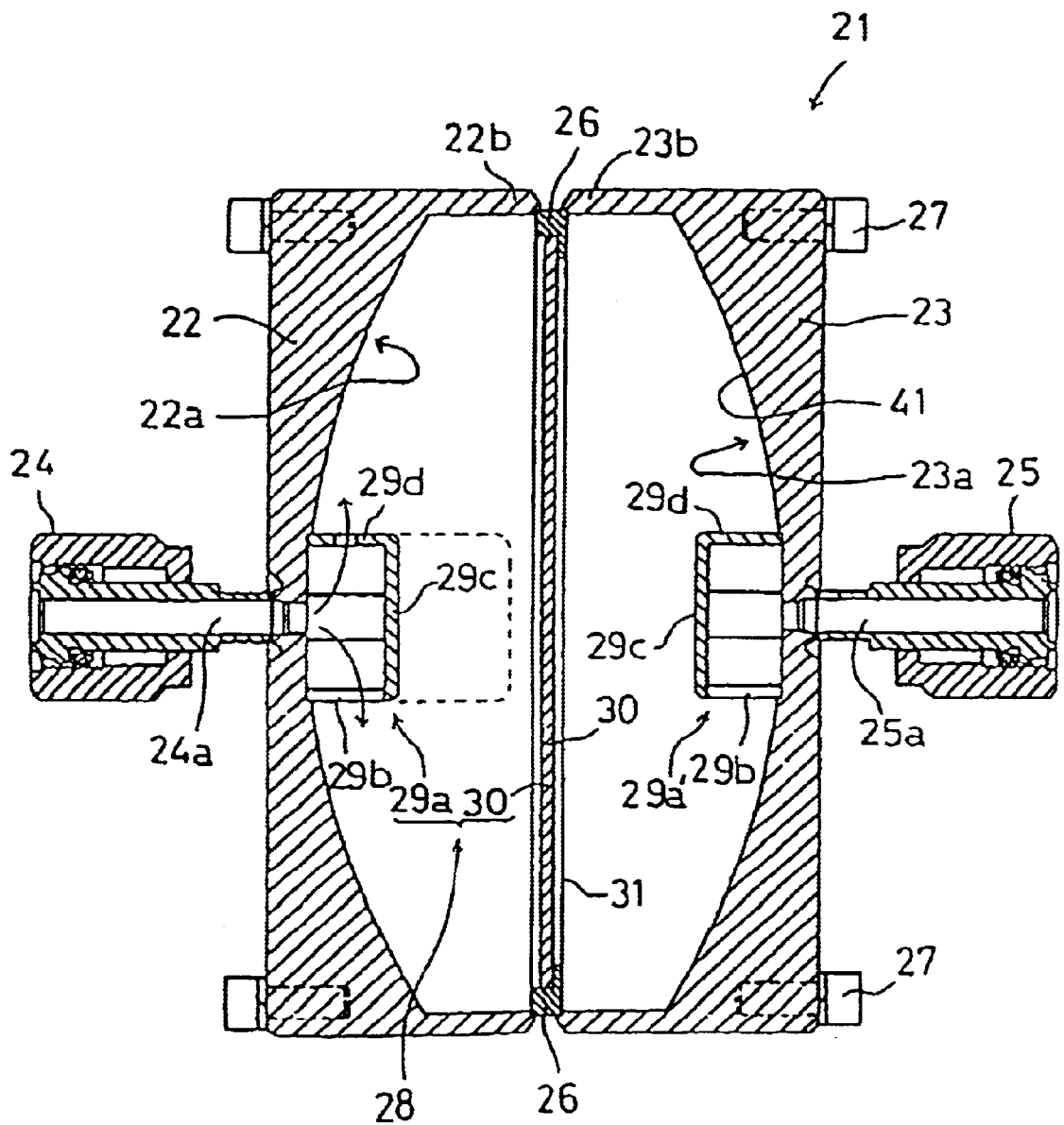
FIG. 49 shows a longitudinal cross-sectional view of the fourth water-generating reactor according to this invention to which the method for forming the platinum coated catalyst layer of this invention is implemented.

FIG. 49 shows a vertical, sectional view of a water-generating reactor for practicing the process of forming the platinum coating catalysts layer of this invention, and in FIG. 49, numeral 21 designates a reactor, numerals 22, 23 reactor bodies, numeral 24 a gas supply joint, numeral 25 a joint for removing water and moisture gas, numeral 26 a filter flange, numeral 27 a reactor fixing bolt, numeral 28 a gas diffusing member, numerals 29a, 29a' reflector plates, numeral 30 a filter, numeral 31 a filter retainer, and numeral 41 a platinum coating catalyst layer. The reactor 21 is formed in a short cylindrical shape by air-tightly linking two stainless steel (SUS316L) reactor bodies 22, 23.

Because the structure of the water-generating reactor of FIG. 49 is identical to the fourth water-generating reactor of this invention described in conjunction with FIG. 43, a detailed explanation will be omitted.

Figure 50:
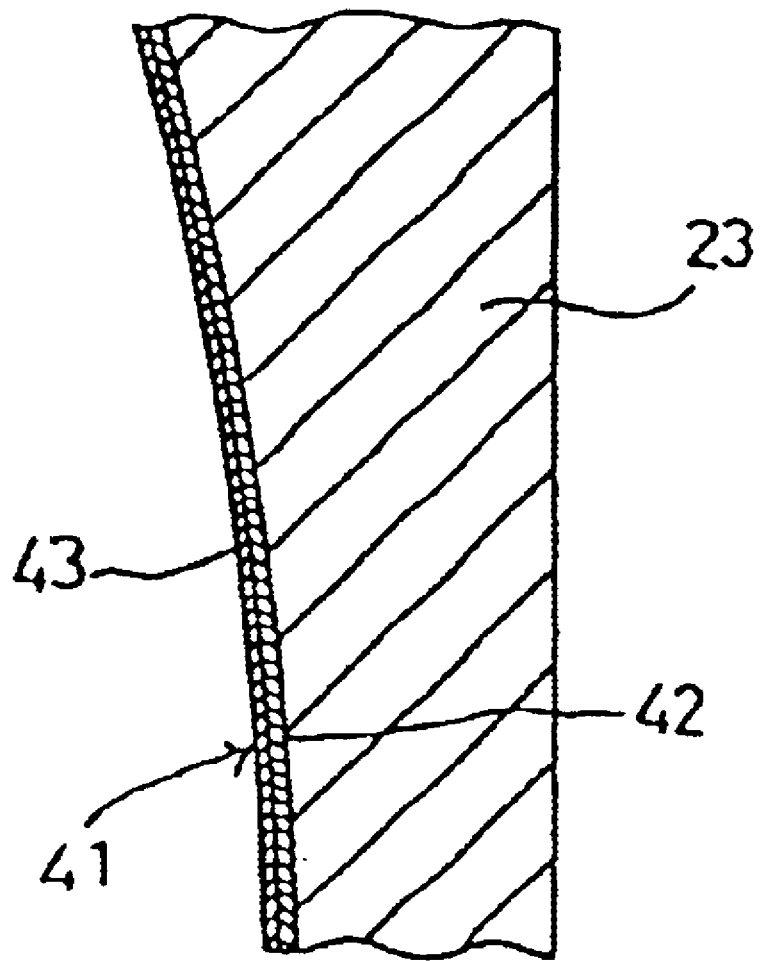
FIG. 50 shows a fragmentary enlarged sectional view of the reactor body of FIG. 49.

In the water-generating reactor of FIG. 49, the platinum coating catalyst layer 41 is formed on the entire inner surface of the reactor body 23 made of SUS316L, and, as shown in FIG. 50, after a TiN barrier film 42 is formed on the inner surface of the reactor body 23, a platinum coating film 43 is formed on the barrier film 42. The platinum coating catalyst layer 41 according to this invention is formed of the barrier film 42 and the platinum coating film 43.

A thickness of the platinum coating film 43 is preferably from 0.1 $\mu$m to 3 $\mu$m, and, in this embodiment, the platinum coating film 43 is formed to be about 1 $\mu$m thick.

A thickness of the barrier film 42 is preferably from 0.1 $\mu$m to 5 $\mu$m, and in FIG. 50, the TiN barrier film 42 is about 2 $\mu$m thick.

Specific Example of Process for Forming Platinum Coating Catalyst Layer

In forming the platinum coating catalyst layer 41, the recessed inner surface of the reactor body 23 formed in a specified shape is properly surface-treated and various metal oxide films and passive-state films naturally formed on a stainless steel surface are removed. Any method may be used for this surface treatment.

When the surface treatment of the inner surface of the recess 23a is completed, the barrier film 42 of TiN is formed. In this embodiment, a TiN barrier film 42 about 2 $\mu$m thick is formed by an ion plating method.

For this barrier film 42, TiC, TiCN, TiAlN, etc. may be used in addition to TiN.

The thickness of the barrier film 42 is suitably from 0.1 $\mu$m to 5 $\mu$m as described above. This is because if the thickness is less than 0.1 $\mu$m, the barrier functions are unable to be satisfactorily carried out, and, on the contrary, if the thickness exceeds 5 $\mu$m, it takes undue time to form the barrier film 42 itself. Even if the thickness is more than 5 $\mu$m, its function to prevent metal diffusion from substrate stainless steel scarcely changes, and moreover, peeling-off, etc. of the barrier film 42, caused by differences of expansion, etc. may occur upon heating.

In addition to the ion plating method, it is possible to use an ion sputtering method, PVD method such as vacuum vapor deposition method, etc. or chemical vapor deposition method (CVD process), hot press method, thermal spraying process, etc. as the method to form the barrier film 42.

Upon completion of the barrier film 42, the platinum coating film 43 is subsequently formed on the barrier film. In this embodiment, the platinum coating film 43 of about 1 $\mu$m is formed by the ion plating method.

The thickness of the platinum coating film 43 is suitably from 0.1 $\mu$m to 3 $\mu$m as described above. This is because if the thickness is 0.1 $\mu$m or less, the film has difficulty causing the catalytic activity over a long period of time, and, conversely, if the thickness exceeds 3 $\mu$m, the cost of forming the platinum coating film 43 rises; and even if it is formed to be 3 $\mu$m or more, there is scarcely any significant difference in the catalytic activity or its working period, and, in addition, peeling-off due to expansion differences, etc. may occur at the time of heating.

As the method to form the platinum coating film 43, it is possible to use an ion sputtering method, a vacuum vapor deposition method, a chemical vapor deposition method, a hot press method, etc. in addition to the ion plating method; and, in addition, if the barrier film 42 is made of an electrically conductive material such as TiN, etc., a plating process may be employed.

Figure 51:
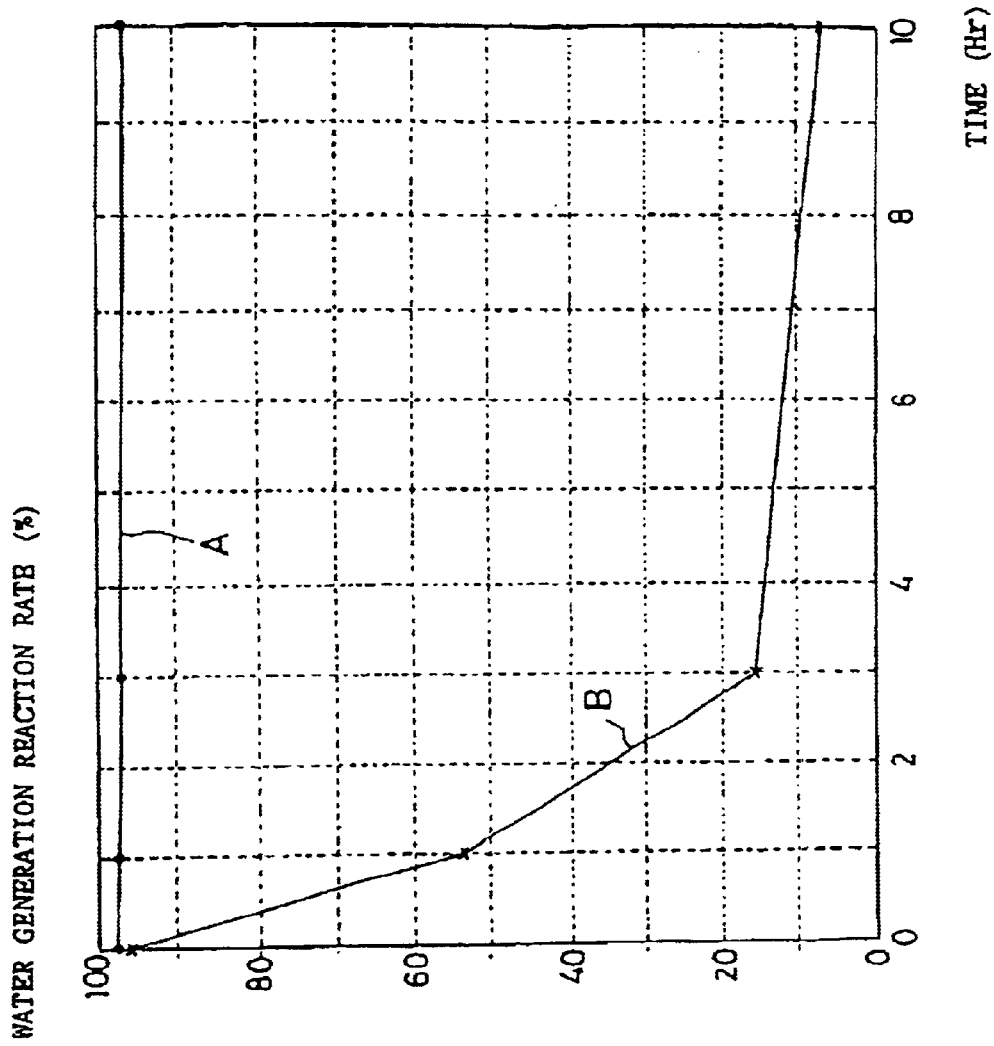
FIG. 51 shows changes with passage of time in water-generation-reactivity rate in a water-generating reactor with a platinum coating catalyst layer formed in accordance with this invention.
Figure 52:
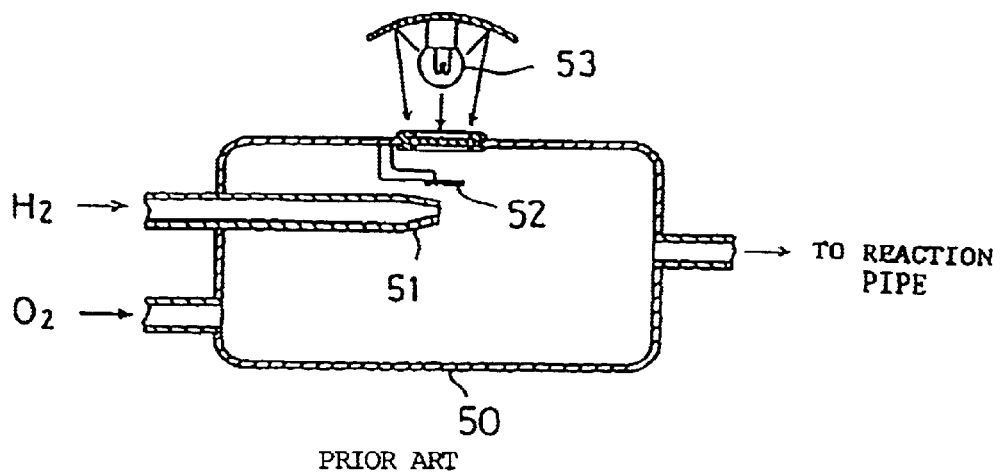
FIG. 52 is an illustration of known combustion-pipe-type water-generation equipment.
Figure 53:
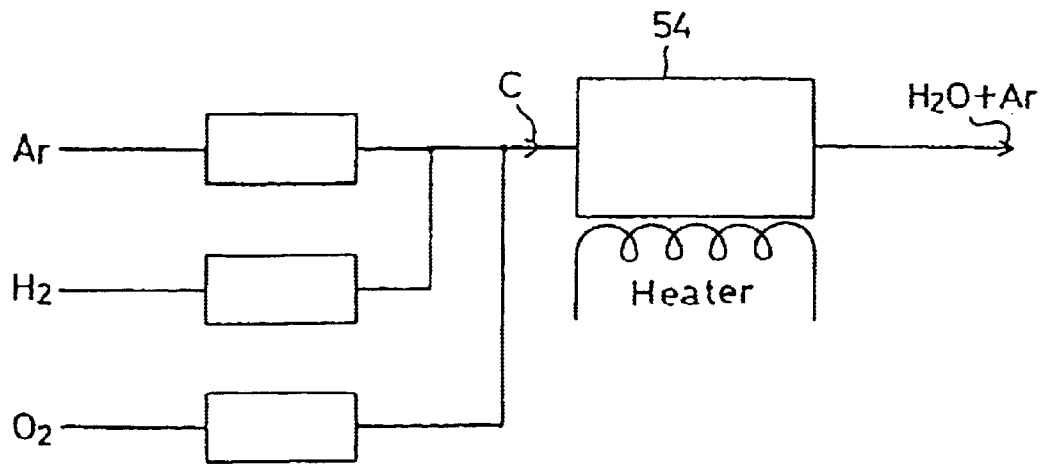
FIG. 53 is a schematic representation of catalyst-reaction-type water-generating equipment according to an earlier-file application.

FIG. 51 shows changes with time of a water reaction rate in a water-generating reactor in which the platinum coating catalyst layer 41 has been formed by this invention.

First of all, the recess 23a of the reactor body 23 of the reactor 1 of FIG. 49 was surface-treated using chemical detergent, and then, as the barrier film 42, a TiN film of about 2 $\mu$m thick was formed by the ion plating method, and then, a platinum coating film 43 of about 1 $\mu$m thick was further formed on it by the ion plating method. And, using this water-generating reactor equipped with this platinum coating film 43, a water generating test was carried out at 400° C. for a total of 10 hours by allowing $H_2$ to flow at 500 cc/min. and $O_2$ at 500 cc/min.

That is, 1) temperature was lowered to 120° C. right after water began to be generated at 400° C. (when T=O Hr), and under this condition, a first water generation reaction rate was measured, 2) then, after the temperature was allowed to return to 400° C. and water was generated for 1 hour (when T=1 Hr), temperature was again lowered to 120° C. and a second measurement was carried out on the water generation reaction rate, 3) and further, after the temperature was again allowed to return to 400° C. and water was generated for 2 hours (T=3 Hr), temperature was lowered to 120° C. and a third measurement was carried out on the water generation reaction rate, 4) and thereafter, after the temperature was allowed to return to 400° C. and water was generated for 7 hours (T=10 Hr), at this point, the temperature was lowered to 120° C. and a fourth measurement was carried out on the water generation reaction rate.

In the water generation test in which the temperature was lowered to 120° C., $O_2$ was allowed to flow at 50 cc/min. and $H_2$ at 50 cc/min. into the inside of the water generating furnace and the water generation rate was measured.

The curve A of FIG. 51 shows the water generation reaction rate measured when temperature was lowered to 120° C. in cases 1)–4).

The reason why the water generation reaction rate was measured with the temperature lowered from 400° C. to 120° C. is that, as is clear from FIG. 46, the lower the temperature, the more greatly is the change of water generation reaction due to deterioration.

The water generation reaction rate is computed from a measured amount of generated water and measured amounts of $O_2$ and $H_2$ supplied.

The curve B of FIG. 51 shows measurement results of a water generation reaction rate under exactly the same conditions as for curve A, using the reactor 21 in which the Ni barrier film, about 2 $\mu$m thick, was formed on the surfaces defining the recess 23a of the reactor body 23 of the same shape by the ion plating method and then the platinum coating film 43, about 1 $\mu$m thick, was formed on the Ni barrier film by the ion plating method.

As is clear from a comparison between the curve A and the curve B in FIG. 51, when the TiN barrier film 42 is provided (curve A), it is possible to hold the catalytic activity of the platinum coating catalyst layer 41 at a nearly constant high catalytic activity state over a long period of time.

The curve A of FIG. 51 shows changes with time of the water generation reaction rate observed when the 2 $\mu$m-thick TiN barrier film 42 was provided. Further, measurements were also taken on changes with time of the water generation reaction under the same conditions as those of the curve A of FIG. 51 in the cases in which TiAlN, TiC, TiCN, and Al$_2$O$_3$ barrier films 2 μm thick were provided. As a result, with each of these barrier films, the changes of the water generation rate with time were nearly identical to those obtained with the TiN barrier film and an undue lowering of the water generation reaction rate was not observed.

As described above, since the changes of the water generation reaction rate with time can be satisfactorily prevented even with the Al$_2$O$_3$ barrier film, it is assumed that the changes of the water generation reaction rate with time can be effectively prevented as with the case of TiN barrier film even if the barrier film is made of other oxides or nitrides, for example, Cr$_2$O$_3$, SIO$_2$, CrN, etc.

Table 6 shows results of an analysis of trace elements in generated water obtained when water generation was carried out at 400° C. for a total of 10 hours using the water-generating reactor of FIG. 49, to which this invention was applied (the one used for the measurement of curve A of FIG. 51).

TABLE 6

| Element | Fe | Cr | Ni | Pt |
| --- | --- | --- | --- | --- |
| Detection concentration (ng/mL = ppb) | 0.17 | 0.037 | <0.05 | <0.01 |
| Detection limit of the detector (ppb) | 0.02 | 0.02 | 0.05 | 0.01 |

An analysis of above trace elements was conducted by a graphite reactor heating-atomic absorption analysis process (polarization Zeeman atomic absorption photometer available from Hitachi) for Fe, Cr and Ni, and by an ICP mass spectrometry (ICP mass spectrometer available from Seiko Denshi) for Pt.

As is clear from Table 6, trace elements in the generated water are all extremely insignificant. It is clear that Pt is scarcely dissolved into water from the platinum coating film 43, because Pt existing in the measuring system is the portion of the platinum coating film 43.

In the process for forming the platinum coating catalyst layer of this invention, after the inner wall surface of the water-generating reactor is cleaned, the barrier film of TiN, etc. is formed on it, and thereafter the platinum coating film is formed on the barrier film.

As a result, even when the reactor body is heated to a high temperature of about 400° C., diffusion of metal components of the substrate forming the reactor body into the platinum coating film can be almost completely prevented by the barrier film of TiN, etc., and the rate of formation of metal oxides in the platinum coating film can be greatly reduced, and the high catalytic performance of Pt is able to be stably maintained over a long period of time.

It is possible to economically form the platinum coating catalyst layer 41 in high efficiency and with a minimum amount of platinum on the surface of the stainless steel reactor body, and at the same time it is possible to maintain the water generation reaction rate of the reactor at a nearly constant level over a long period of time while, at the same time, the generated water is not contaminated with dissolution of Pt.

What is claimed is:

1. A water-generating reactor comprising:
   an inlet to receive hydrogen and oxygen;
   an outlet to expel water;
   a passage formed in the reactor, wherein the inlet is disposed at one end of the passage and the outlet is disposed at another end of the passage so that the hydrogen and oxygen flows through the inlet and into the passage;
   a reactor body made of a heat-resistant metal, the reactor body comprising a first reactor body member welded to a second reactor body member, wherein the inlet and the outlet are mounted on the reactor body, the outlet is a water and moisture gas take-out joint, the passage is an internal space defined by recesses inside the reactor body, and the recesses include a first spherical recess having a first surface and a second spherical recess having a second surface; and
   a platinum coating film is disposed only on the surface of the first recess, wherein when the hydrogen and oxygen supplied by the inlet and diffused contact the platinum coating film, water is generated by a reaction between the hydrogen and the oxygen.

2. A water-generating reactor as recited in claim 1, wherein the catalyst material has a form selected from the group consisting of a column filled with granular catalyst, a filter element including sintered material of powders or fibers, a laminate with laminated thin sheets, a honeycomb body, a mesh body, a sponge body, and a fin-shaped body.

3. A water-generating reactor as recited in claim 2, wherein the catalyst material is nickel.

4. A water-generating reactor as recited in claim 1, wherein the catalyst material covers a surface selected from the group consisting of a surface of a pipe, a surface of a granule, a surface of a sintered material, a surface of a thin sheet laminate, a surface of a honeycomb body, a surface of a mesh body, a surface of a sponge body, and a surface of a fin-shaped body.

5. A water-generating reactor as recited in claim 4, wherein the catalyst material is nickel.

6. A water-generating reactor as recited in claim 1, further comprising:
   a casing, wherein the inlet is disposed at one end of the casing and the outlet is disposed on another end of the casing, the passage is disposed inside the casing; and
   a heater is placed inside or outside of the casing.

7. A water-generating reactor as recited in claim 6, wherein the catalyst material is nickel.

8. A water-generating reactor as recited in claim 6, wherein the catalyst material covers a surface of a first material, the first material being in the form of an item selected from the group consisting of a pipe, a granule, a sintered material, a thin sheet laminate, a honeycomb body, a mesh body, a sponge body, and a fin-shaped body.

9. A water-generating reactor as recited in claim 1, wherein the catalyst material is nickel.

10. A water-generating reactor as recited in claim 1, further comprising:
    a reactor body made of a heat-resistant material, wherein the inlet and the outlet are mounted on the reactor body, the outlet is a water and moisture gas take-out joint, the passage is an internal space defined by recesses inside the reactor body, and the recesses include a first recess having a surface and a second recess having a surface;
    a gas diffusing member disposed in the internal space; and
    a platinum coating film is disposed on the surface of the first recess, wherein when hydrogen and oxygen supplied by the inlet and diffused by the gas diffusing member contact the platinum coating film, water is generated from reactivity of the hydrogen and the oxygen.

11. A water-generating reactor as recited in claim 10, wherein the gas diffusing member comprises a reflector plate located opposite the inlet and a filter located downstream of the reflector plate.

12. A water-generating reactor as recited in claim 10, wherein the gas diffusing member comprises a reflector plate located opposite the inlet, a filter located downstream of the reflector plate, and a reflector plate located opposite the water and moisture gas outlet.

13. A water-generating reactor as recited in claim 10, wherein the gas diffusing member comprises a cylinder filter, a conical filter, or a disk filter placed opposite the inlet.

14. A water-generating reactor as recited in claim 10, wherein the gas diffusing member comprises a filter having a filter portion only at a peripheral surface portion, wherein the filter is placed opposite the inlet.

15. A water-generating reactor as recited in claim 10, wherein the reactor body is made from heat-resistant metal, and the platinum coating film is 10 Å to 0.5 mm thick and is formed by a method selected from the group consisting of a plating method, a sputtering method, a vapor deposition method, a cladding method, an ion plating method and a hot press method.

16. A water-generating reactor as recited in claim 10, wherein the reactor body is made from heat-resistant metal, and the platinum coated film is a film 10 Å to 0.5 mm thick formed on a barrier film of a non-metal material that is disposed on the surface of the first recess of the reactor body by one of a plating method, a sputtering method, a vapor deposition method, a cladding method, an ion plating method, or a hot press method.

17. A water-generating reactor as recited in claim 16, wherein the barrier film is made of at least one material selected from the group consisting of TiN, TiC, TiCN, and TiAlN.

18. A water-generating reactor as recited in claim 10, wherein when gas is supplied to the reactor body, the gas is an oxygen rich gas having a ratio of oxygen to hydrogen that is <½, or a hydrogen rich gas having a ratio of oxygen is hydrogen that is >½.

19. A water-generating reactor as recited in claim 1, wherein the reactor body is made from heat-resistant metal, and the platinum coating film is 10 Å to 0.5 mm thick and is formed by a method selected from the group consisting of a plating method, a sputtering method, a vapor deposition method, a cladding method, an ion plating method and a hot press method.

20. A water-generating reactor as recited in claim 1, wherein the reactor body is made from heat-resistant metal, and the platinum coating film is a film 10 Å to 0.5 mm thick formed on a barrier film of a non-metal material that is disposed on the surface of the first recess of the reactor body by one of a plating method, a sputtering method, a vapor deposition method, a cladding method, an ion plating method, or a hot press method.

21. A water-generating reactor as recited in claim 20, wherein the barrier film is made of at least one material selected from the group consisting of TiN, TiC, TiCN, and TiAlN.

22. A water-generating reactor as recited in claim 1, wherein when gas is supplied to the reactor body, the gas is an oxygen rich gas having a ratio of oxygen to hydrogen that is <½, or a hydrogen rich gas having a ratio of oxygen to hydrogen that is >½.

23. A water-generating reactor as recited in claim 1, wherein the platinum coating film is disposed only on the surface of the first recess, wherein the first recess is formed in the first reactor body member located at the outlet side of the passage.

\* \* \* \* \*